US012527814B2

(12) United States Patent
Teng et al.

(10) Patent No.: US 12,527,814 B2
(45) Date of Patent: Jan. 20, 2026

(54) TREATMENT OF AN OCULAR INFECTION, COMPOSITION AND METHODS THEREOF

(71) Applicants: THE UNIVERSITY OF HONG KONG, Hong Kong (CN); CITY UNIVERSITY OF HONG KONG, Hong Kong (CN)

(72) Inventors: Lee Lee Teng, Hong Kong (CN); Patrick Chiu Yat Woo, Hong Kong (CN); Ying Tang, Hong Kong (CN); Susanna Kar Pui Lau, Hong Kong (CN); Man Lung Yeung, Hong Kong (CN); Elaine Chan, Hong Kong (CN); Terrence Chi Kong Lau, Hong Kong (CN)

(73) Assignees: THE UNIVERSITY OF HONG KONG, Hong Kong (CN); CITY UNIVERSITY OF HONG KONG, Hong Kong (CN)

( * ) Notice: Subject to any disclaimer, the term of this patent is extended or adjusted under 35 U.S.C. 154(b) by 0 days.

(21) Appl. No.: 17/108,060

(22) Filed: Dec. 1, 2020

(65) Prior Publication Data

US 2021/0169924 A1    Jun. 10, 2021

Related U.S. Application Data

(60) Provisional application No. 62/943,414, filed on Dec. 4, 2019.

(51) Int. Cl.
| | |
|---|---|
| *A61K 31/785* | (2006.01) |
| *A61K 31/16* | (2006.01) |
| *A61K 48/00* | (2006.01) |
| *A61P 27/02* | (2006.01) |
| *C12N 15/85* | (2006.01) |
| *C12N 15/90* | (2006.01) |

(52) U.S. Cl.
CPC ............ *A61K 31/785* (2013.01); *A61K 31/16* (2013.01); *A61K 48/005* (2013.01); *A61P 27/02* (2018.01); *C12N 15/85* (2013.01); *C12N 15/902* (2013.01)

(58) Field of Classification Search
CPC .... A61K 31/785; A61K 31/16; A61K 48/005; A61P 27/02; A61P 31/04; C12N 15/85; C12N 15/902; A01K 2207/12; A01K 2207/30; A01K 2227/107; A01K 2267/03
See application file for complete search history.

(56) References Cited

PUBLICATIONS

Gahoi et al. "Computational screening for new inhibitors of M. tuberculosis mycolyltransferases antigen 85 group of proteins as potential drug targets." Journal of Biomolecular Structure and Dynamics 31.1 (2013): 30-43 (Year: 2013).*
Lucas et al. "Analysis of polyhexamethylene biguanide in multi-purpose contact lens solutions." Talanta 80.2 (2009): 1016-1019 (Year: 2009).*
Das et al. "Clinical trial of 0.02% polyhexamethylene biguanide versus placebo in the treatment of microsporidial keratoconjunctivitis." American journal of ophthalmology 150.1 (2010): 110-115 (Year: 2010).*
Schoff et al. "The effect of contact lens materials on disinfection activity of polyquaternium-1 and myristamidopropyl dimethylamine multipurpose solution against *Staphylococcus aureus*." Eye & contact lens 38.6 (2012): 374-378 (Year: 2012).*
Liu et al. "Clinical characteristics of infections caused by *Tsukamurella* spp. and antimicrobial susceptibilities of the isolates." International journal of antimicrobial agents 38.6 (2011): 534-537 (Year: 2011).*
Shaer, A. J. et al., Tsukamurella peritonitis associated with continuous ambulatory peritoneal dialysis. Clinical nephrology 56, 241-246 (2001).
Rivasi, F. et al. Cytologic diagnosis of Acanthamoeba keratitis. Report of a case with correlative study with indirect immunofluorescence and scanning electron microscopy. Acta cytologica 39, 821-826 (1995).
No Author. Safety and Tolerability of Preservative-free Polyhexamethylene Biguanide (PHMB) Ophthalmic Solution in Healthy Subjects, <https://ClinicalTrials.gov/show/NCT02506257> (2016). 19 pages.
No Author. Polyhexamethylene Biguanide (PHMB) Ophthalmic Solution in Subjects Affected by Acanthamoeba Keratitis, <https://clinicaltrials.gov/ct2/show/NCT03274895> (2017). 10 pages.
Bouza, E. et al. Tsukamurella: a cause of catheter-related bloodstream infections. European journal of clinical microbiology & infectious diseases : official publication of the European Society of Clinical Microbiology 28, 203-210, doi:10.1007/s10096-008-0607-2 (2009).
Schwartz, M. A. et al. Central venous catheter-related bacteremia due to *Tsukamurella* species in the immunocompromised host: a case series and review of the literature. Clinical infectious diseases : an official publication of the Infectious Diseases Society of America 35, e72-77, doi: 10.1086/342561 (2002).
Liu, C. Y. et al. Clinical characteristics of infections caused by *Tsukamurella* spp. and antimicrobial susceptibilities of the isolates. International journal of antimicrobial agents 38, 534-537, doi: 10.1016/j.ijantimicag.2011.07.018 (2011).
Woo, P. C. et al. First report of Tsukamurella keratitis: association between T. tyrosinosolvens and T. pulmonis and ophthalmologic infections. J Clin Microbiol 47, 1953-1956, doi:10.1128/JCM.00424-09 (2009).
Woo, P. C., et al., Tsukamurella conjunctivitis: a novel clinical syndrome. J Clin Microbiol 41, 3368-3371 (2003).

(Continued)

*Primary Examiner* — Fereydoun G Sajjadi
*Assistant Examiner* — Alexander W Nicol
(74) *Attorney, Agent, or Firm* — Leason Ellis LLP

(57) ABSTRACT

The present disclosure relates to a method to reduce virulence of *Tsukamurella* comprising decreasing the expression of the mycolyltransferase C ('tmytC') gene. Also disclosed is a pharmaceutical composition and method of prevention and treatment of infection by inhibition of tmytC.

Figure 1C:
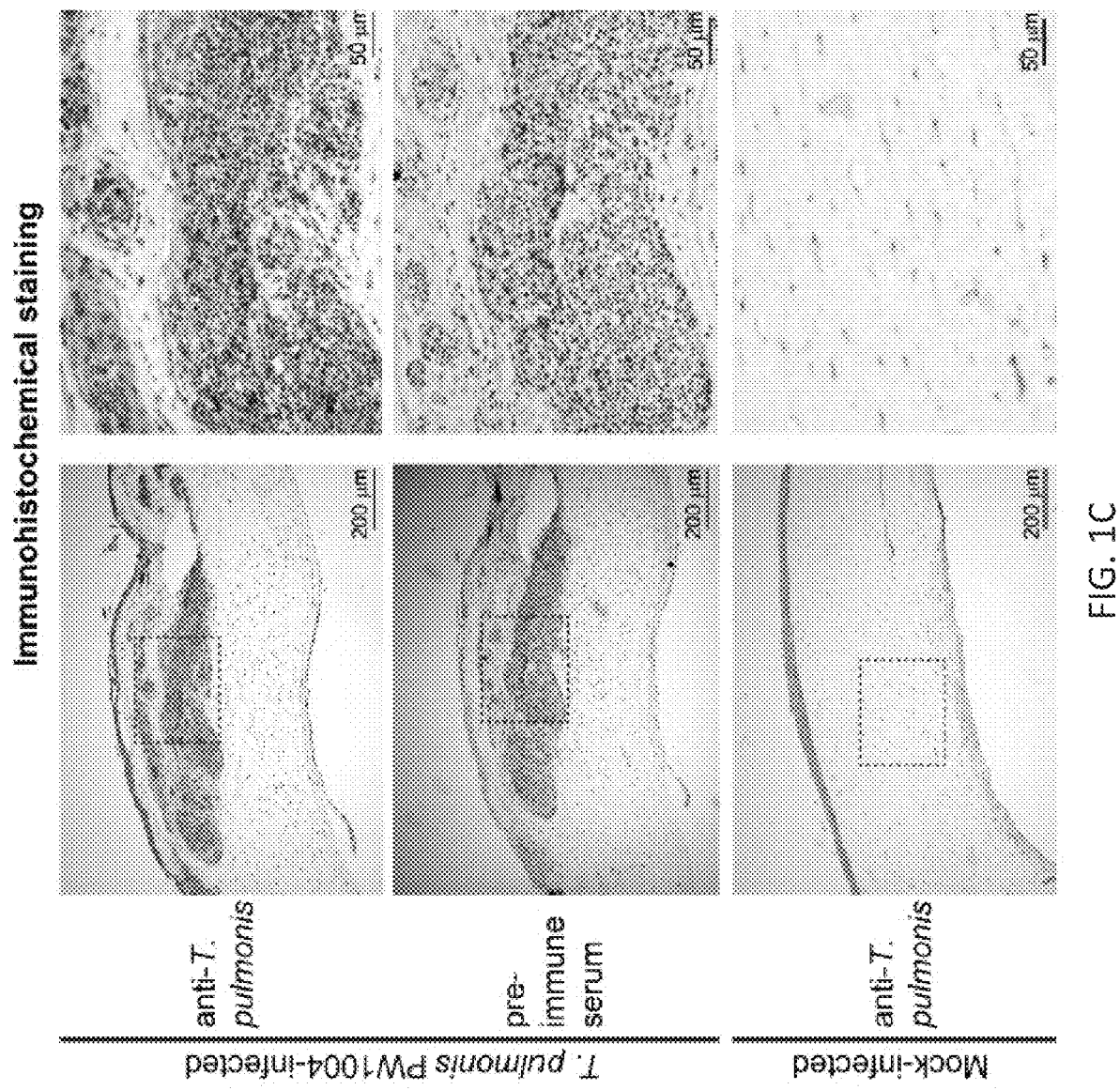

12 Claims, 55 Drawing Sheets
(32 of 55 Drawing Sheet(s) Filed in Color)
Specification includes a Sequence Listing.

(56) References Cited

PUBLICATIONS

Almeida, D. R et al.,: an emerging opportunistic ocular pathogen. Canadian journal of ophthalmology. Journal canadien d'ophtalmologie 45, 290-293, doi:10.3129/109-252 (2010).

Tam, P. M et al.,: an unrecognized mimic of atypical mycobacterial keratitis? The first case report. Cornea 29, 362-364 doi:10.1097/ICO.0b013e3181ae2594 (2010).

Teng, J. L. et al. *Tsukamurella hongkongensis* sp. nov. and *Tsukamurella sinensis* sp. nov., isolated from patients with keratitis, catheter-related bacteraemia and conjunctivitis. International journal of systematic and evolutionary microbiology 66, 391-397, doi: 10.1099/ijsem.0.000733 (2016).

Teng, J. L. L. et al. *Tsukamurella ocularis* sp. nov. and *Tsukamurella hominis* sp. nov., isolated from patients with conjunctivitis in Hong Kong. International journal of systematic and evolutionary microbiology 68, 810-818, doi:10.1099/ijsem.0.002589 (2018).

Teng, J. L. L. et al. MALDI-TOF MS for identification of *Tsukamurella* species: *Tsukamurella tyrosinosolvens* as the predominant species associated with ocular infections. Emerg Microbes Infect 7, 80, doi:10.1038/s41426-018-0083-4 (2018).

Chen, C. H et al., Tsukamurella tyrosinosolvens bacteremia with coinfection of Mycobacterium bovis pneumonia: case report and literature review. SpringerPlus 5, 2033, doi:10.1186/s40064-016-3707-y (2016).

EN ISO 14729: Ophthalmic optics—Contact lens care products—Microbiological requirements and test methods for products and regimens for hygienic management of contact lenses . . . (2001).

Larkin, D. F. et al.,. Treatment of Acanthamoeba keratitis with polyhexamethylene biguanide. Ophthalmology 99, 185-191 (1992).

Lin, J. C. et al., Treatment of Nocardia asteroides keratitis with polyhexamethylene biguanide. Ophthalmology 104, 1306-1311 (1997).

Fiscella, R. G. et al. Polyhexamethylene biguanide (PHMB) in the treatment of experimental Fusarium keratomycosis. Cornea 16, 447-449 (1997).

Kowalski, R. P et al., Topical levofloxacin 1.5% overcomes in vitro resistance in rabbit keratitis models. Acta ophthalmologica 88, e120-125, doi:10.1111/j.1755-3768.2010.01897.x (2010).

Ojha, A. K. et al. Growth of Mycobacterium tuberculosis biofilms containing free mycolic acids and harbouring drug-tolerant bacteria. Molecular microbiology 69, 164-174, doi:10.1111/j.1365-2958.2008.06274.x (2008).

Ojha, A. K et al., Enzymatic hydrolysis of trehalose dimycolate releases free mycolic acids during mycobacterial growth in biofilms. The Journal of biological chemistry 285, 17380-17389, doi:10.1074/jbc.M110.112813 (2010).

Belisle, J. T. et al. Role of the major antigen of Mycobacterium tuberculosis in cell wall biogenesis. Science 276, 1420-1422 (1997).

Puech, V et al., Characterization of the in vivo acceptors of the mycoloyl residues transferred by the corynebacterial PS1 and the related mycobacterial antigens 85. Molecular microbiology 35, 1026-1041 (2000).

Ramulu, H. G et al., Analysis and modeling of mycolyl-transferases in the CMN group. Bioinformation 1, 161-169 (2006).

Marquart, M. E. Animal models of bacterial keratitis. Journal of biomedicine & biotechnology 2011, 680642, doi:10.1155/2011/680642 (2011).

Hildebrandt, C et al., A. In-vitro analysis of the microbicidal activity of 6 contact lens care solutions. BMC infectious diseases 12, 241, doi:10.1186/1471-2334-12-241 (2012).

Kusnetsov, et al., Efficacy of three prevention strategies against legionella in cooling water systems. Journal of applied microbiology 82, 763-768 (1997).

Mallari, P. L et al., Increased incidence of corneal perforation after topical fluoroquinolone treatment for microbial keratitis. American journal of ophthalmology 131, 131-133 (2001).

Reviglio, V. E et al., Effect of topical fluoroquinolones on the expression of matrix metalloproteinases in the cornea. BMC ophthalmology 3, 10, doi:10.1186/1471-2415-3-10 (2003).

Wei, H. K. et al. Levofloxacin increases apoptosis of rat annulus fibrosus cells via the mechanism of upregulating MMP-2 and MMP-13. International journal of clinical and experimental medicine 8, 20198-20207 (2015).

Luo, R. B. et al. SOAPdenovo2: an empirically improved memory-efficient short-read de novo assembler (vol. 1, 18, 2012). Gigascience 4, doi:ARTN 30.

Zerbino, D. R. et al., : Algorithms for de novo short read assembly using de Bruijn graphs. Genome research 18, 821-829, doi:10.1101/gr.074492.107 (2008).

Aziz, R. K. et al. The RAST server: Rapid annotations using subsystems technology. Bmc Genomics 9, doi:Artn 75.

Galperin, M. Y et al., Expanded microbial genome coverage and improved protein family annotation in the COG database. Nucleic acids research 43, D261-269, doi:10.1093/nar/gku1223 (2015).

Stothard, P et al., Circular genome visualization and exploration using CGView. Bioinformatics 21, 537-539, doi:10.1093/bioinformatics/bti054 (2005).

Sanders, M. E et al., 3rd, Shafiee, A. & Marquart, M. E. Efficacy of besifloxacin in a rabbit model of methicillin-resistant *Staphylococcus aureus* keratitis. Cornea 28, 1055-1060, doi:10.1097/ICO.0b013e31819e34cb (2009).

Lau, S. K. et al. Identification of Novel *rosavirus* Species That Infects Diverse Rodent Species and Causes Multisystemic Dissemination in Mouse Model. PLoS pathogens 12, e1005911, doi: 10.1371/journal.ppat.1005911 (2016).

Fischer, A. H et al., Hematoxylin and eosin staining of tissue and cell sections. CSH protocols 2008, pdb prot4986, doi:10.1101/pdb.prot4986 (2008).

Williams, R. N et al., Quantification of ocular inflammation: evaluation of polymorphonuclear leucocyte infiltration by measuring myeloperoxidase activity. Current eye research 2, 465-470 (1982).

Girgis, D. O et al., Phospholipase A2 activity in normal and *Staphylococcus aureus*-infected rabbit eyes. Investigative ophthalmology & visual science 44, 197-202, doi:10.1167/iovs.02-0548 (2003).

Mishra, A. et al. The Actinomyces oris type 2 fimbrial shaft FimA mediates co-aggregation with oral *Streptococci*, adherence to red blood cells and biofilm development. Molecular microbiology 77, 841-854, doi: 10.1111/j.1365-2958.2010.07252.x (2010).

Sharon L Kendall et al., in Mycobacteria Protocols vol. 465 (ed Amanda Claire Brown Tanya Parish) Ch. 20, 297-310 (Humana Press, Totowa, NJ, 2009).

Chiba, K. et al. Construction of a pair of practical Nocardia-*Escherichia coli* shuttle vectors. Japanese journal of Infectious diseases 60, 45-47 (2007).

Mohandas, P. et al. Pleiotropic consequences of gene knockouts in the phthiocerol dimycocerosate and phenolic glycolipid biosynthetic gene cluster of the opportunistic human pathogen Mycobacterium marinum. FEMS Microbiol Lett 363, fnw016, doi:10.1093/femsle/fnw016 (2016).

Wright, C. C. et al. The Mycobacterium tuberculosis MmpL11 Cell Wall Lipid Transporter Is Important for Biofilm Formation, Intracellular Growth, and Nonreplicating Persistence. Infection and immunity 85, doi: 10.1128/IAI.00131-17 (2017).

Ojha, A. et al. GroEL1: a dedicated chaperone involved in mycolic acid biosynthesis during biofilm formation in mycobacteria. Cell 123, 861-873, doi:10.1016/j.cell.2005.09.012 (2005).

Sambandan, D. et al. Keto-mycolic acid-dependent pellicle formation confers tolerance to drug-sensitive Mycobacterium tuberculosis. mBio 4, e00222-00213, doi:10.1128/mBio.00222-13 (2013).

Chen, J. M. et al. Roles of Lsr2 in colony morphology and biofilm formation of Mycobacterium smegmatis. Journal of bacteriology 188, 633-641, doi: 10.1128/JB.188.2.633-641.2006 (2006).

Nam, S. W et al., *Tsukamurella pseudospumae* sp. nov., a novel actinomycete isolated from activated sludge foam. International journal of systematic and evolutionary microbiology 54, 1209-1212, doi:10.1099/ijs.0.02939-0 (2004).

Parish, T et al., Use of a flexible cassette method to generate a double unmarked Mycobacterium tuberculosis tlyA plcABC mutant by gene replacement. Microbiology 146 ( Pt 8), 1969-1975, doi:10.1099/00221287-146-8-1969 (2000).

(56) References Cited

PUBLICATIONS

Kelley, Lawrence A., et al. "The Phyre2 web portal for protein modeling, prediction and analysis." Nature protocols 10.6 (2015): 845-858.
Morris, Garrett M., et al. "AutoDock4 and AutoDockTools4: Automated docking with selective receptor flexibility." Journal of computational chemistry 30.16 (2009): 2785-2791.

* cited by examiner

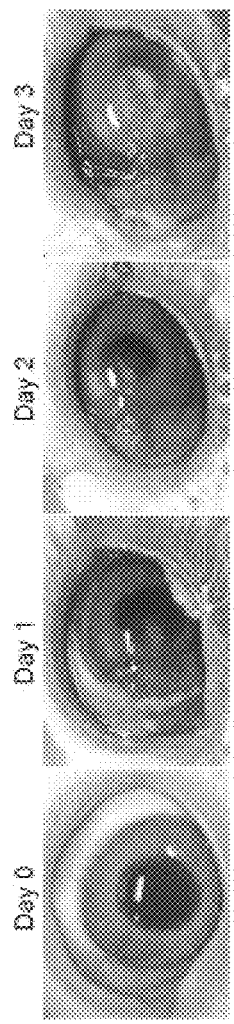
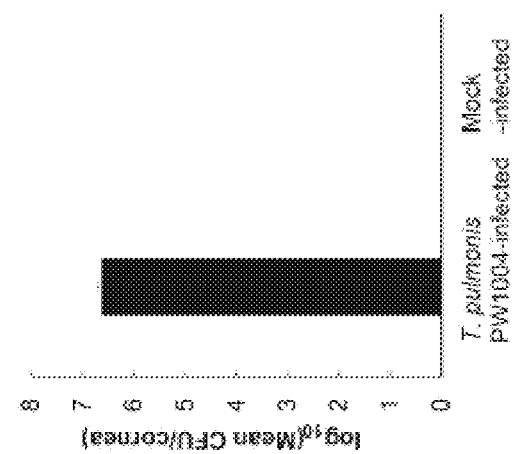
FIG. 1A
FIG. 1B

Tsukamurella PW1004 tmytC docking

- Phosphonate inhibitor 3a structure:

- Docking result: (PW1004 tmytC in blue)

| | |
|---|---|
| Binding Energy: | -5.33 |
| kI : | 123.7uM |
| Intermolecular Energy : | -7.12 |
| Internal Energy : | -0.16 |
| Torsional Energy : | 1.79 |
| Unbound Extended Energy: | -0.16 |
| Cluster RMS: | 0.0 |
| Ref RMS: | 95.99 |

FIG. 14A

- Phosphonate inhibitor 4a structure:

- Docking result: (PW1004 tmytC in blue)

Binding Energy: -6.76
Ki: 11.14uM
Intermolecular Energy: -9.74
Internal Energy: -1.19
Torsional Energy: 2.98
Unbound Extended Energy: -1.19
Cluster RMS: 0.0
Ref RMS: 77.57

- Phosphonate inhibitor 5a structure:

- Docking result: (PW1004 tmytC in blue)

Binding Energy: −7.71
ki: 2.24uM
Intermolecular Energy: −10.09
Internal Energy: −0.46
Torsional Energy: 2.39
Unbound Extended Energy: −0.46
Cluster RMS: 0.0
Ref RMS: 80.48

- Phosphonate inhibitor 6a structure:

- Docking result: (PWI004 tmytC in blue)

Binding Energy: -8.61
ki: 486.76nM
Intermolecular Energy: -11.6
Internal Energy: -0.53
Torsional Energy: 2.98
Unbound Extended Energy: -0.53
Cluster RMS: 0.0
Ref RMS: 79.15

Binding Energy: -3.89
Ki: 1.41mM
Intermolecular Energy: -9.85
Internal Energy: -3.1
Torsional Energy: 5.97
Unbound Extended Energy: -3.1
Cluster RMS: 0.0
Ref RMS: 77.59

- Trehalose structure:

- Docking result: (PW1004 tmytC in blue)

- Trehalose analog 11a structure:

- Docking result: (PW1004 tmytC in blue)

Binding Energy: -5.32
Ki: 126.42uM
Intermolecular Energy: -11.28
Internal Energy: -4.87
Torsional Energy: 5.97
Unbound Extended Energy: -4.87
Cluster RMS: 0.0
Ref RMS: 74.52

- Trehalose analog 15a structure:

- Docking result: (PW1004 tmytC in blue)

Binding Energy: -4.69
Ki: 367.45µM
Intermolecular Energy: -12.44
Internal Energy: -3.59
Torsional Energy: 7.76
Unbound Extended Energy: -3.59
Cluster RMS: 0.0
Ref RMS: 74.2

- Trehalose analog 18a structure:

- Docking result: (PW1004 tmytC in blue)

Binding Energy: -3.81
ki: 1.62mM
Intermolecular Energy: -10.37
Internal Energy: -3.64
Torsional Energy: 6.56
Unbound Extended Energy: -3.64
Cluster RMS: 0.0
Ref RMS: 87.92

- Cyclipostins and cyclophostin analog CyC7β structure:

*Inhibition of Ag85C by cyclipostins and cyclophostin*

374 Da
  Log P 5.00

402 Da
  Log P 5.78

Binding Energy: -6.46
  KI: 18.33uM
  Intermolecular Energy: -10.04
  Internal Energy: -1.0
  Torsional Energy: 3.58
  Unbound Extended Energy: -1.0
  Cluster RMS: 0.0
  Ref RMS: 69.3

- Docking result: (PW1004 tmytC in blue)

FIG. 14J

- Cyclipostins and cyclophostin analog CyC8β structure:
*Inhibition of Ag85C by cyclipostins and cyclophostin*
CyC7β  374 Da  Log P 5.00
CyC8β  402 Da  Log P 5.78
- Docking result: (PW

- Cyclipostins and cyclophostin analog CyC17 structure:
446 Da    CyC₁₇
Log P 6.32
- Docking result: (PW1004 tmytC in blue)
Binding Energy:

>p2NIL-GalK (6074 bp)

AGCTTCACGTGGTCGACGGATCCTATGTATTCTATAGTGTCACCTAAATCGTATGTGTATGATACATAAGGTTATGT
ATTAATTGTAGCCGCGTTCTAACGACAATATGTACAAGCCTAATTGTGTAGCATCTGGCTTACTGAAGCAGACCCT
ATCATCTCTCTCGTAAACTGCCGTCAGAGTCGGTTTGGTTGGACGAACCTTCTGAGTTTCTGGTAACGCCGTCCCGC
ACCCGGAAATGGTCAGCGAACCAATCAGCAGGGTCATCGCTAGAAATCATCCTTAGCGAAAGCTAAGGATTTTTTT
TATCTGAATTGGTACCGCGGCCGCTTAATAGCGGTGAACGACCTTGCACTCGACACTGCCGAGTGCTAGAAACGA
CTTAGCACTCGGATTACGTGAGTGCTAGGTCGAAGAGGTGAGACCGGGCCCTGCGCGCAACCCGCGCAGGTGAC
ACGCCGGGTCGTCCGTCGCGGGCATCGAATCGACCTAGAAGACGTGTCCAAAGTACGGGCCGAACCGGCCCCTAT
CTGGAGGAATCACTTCGCAAAAGGAGGTATCGAATGACGGTGCGCGCCTCCGCCCCGGCCGGGTGAACCTGATC
GGCGAGCACACCGACTACAACGACGGCTTCGCGCTGCCGATGGCCCTGCAGGTGGGCACCGACGCCGAATTCGA
CGCCACCGGTGCCGGTTCCGCGATCATCGTGAGCTCCGCGCAGGAGGAGGACGCCGTCACCGTGCCGCTGGACA
CCATGCCGGGCGACGTCACGGGCTGGGCCGCCTACGTGGCGGGATGCGTGTGGGCGTTGCGCGGGCACGGCGTC
GACGTGCCGGCCGGGACACTGCGACTGCGCTCGGACGTGCCGGTGGGGCGGGACTCTCGTCGTCCGCGGCGCT
CGAGTGCGCGGTGCTGCTGGCGTTGACCGCCTCGTCGGGGGCGCTCGACCGGATCGAGCTCGCCCGGATCGCGC
AGCGCGCCGAGAACGACTACGTCGGGGCGCCGACGGGCCTGCTCGACCAGATGAGCAGCCTGCACGGCGCCGA
GGACACTGCGCTGTTGCTCGACTTCCGCACGCTCGCAGTCGATCCCGTGCCCTGCGGCTCGGCGACGACGTGCTC
CTCGCGATCGATTCGCACACGCCGCACCAGCACGCGGCGGGGGAGTACCGGCGCCGCCGCGAGGCCTGCGAGCG
GGCGGCCGCGGAACTCGGGGTCGATTCCCTGCGTGACGCCGCGGACGACGACTGGAAGCGACTGGCGGACGCC
GAGACGCGGCGTCGGGCCCGGCACGTGCTCACTGAGAATCGGCGTGTGCTCGACGCCGCGGATGCGCTGCGCAG
TGCCGATCACGCCGCCTTCGGCGCGCTGATGAACGACTCGCAGGCGTCGATGCGCGACGACTTCGCGATCACCGT
GCCCGCCATCGACCTGATCGCCGAGACCGCCGTCGCGCTCGGCGCGTACGGCGCGCGGATGACCGGTGGTGGCT
TCGGCGGCACCGTCATCGCCCTGGCGCCGGCCGACGCGGCCCGCAGCATCGTGGAGGAGCTGCCGGCCCGGGTC
GCGGGTGCCGGCCACCCCACCCCGACGGTGACCTCGGTCCGGCCAGGGAGAGGCGCACACGTCATTGTGGATGT
GTGATTAATTAAGGTAAGAATTCCCCTGTAATCCGGGCAGCGCAACGGAACATTCATCAGTGTAAAAATGGAATC
AATAAAGCCCTGCGCAGCGCGCAGGGTCAGCCTGAATACGCGTTTAATGACCAGCACAGTCGTGATGGCAAGGTC
AGAATAGCGCTGAGGTCTGCCTCGTGAAGAAGGTGTTGCTGACTCATACCAGGATTTTGTTAAAATTCGCGTTAAA
TTTTTGTTAAATCAGCTCATTTTTTAACCAATAGGCCGAAATCGGCAAAATCCCTTATAAATCAAAAGAATAGACCG
AGATAGGGTTGAGTGTTGTTCCAGTTTGGAACAAGAGTCCACTATTAAAGAACGTGGACTCCAACGTCAAAGGGC
GAAAAACCGTCTATCAGGGCGATGGCCCACTACGTGAACCATCACCCTAATCAAGTTTTTTGGGGTCGAGGTGCC
GTAAAGCACTAAATCGGAACCCTAAAGGGAGCCCCCGATTTAGAGCTTGACGGGGAAAGCCGGCGAACGTGGCG
AGAAAGGAAGGGAAGAAAGCGAAAGGAGCGGGCGCTAGGGCGCTGGCAAGTGTAGCGGTCACGCTGCGCGTA
ACCACCACACCCGCCGCGCTTAATGCGCCGCTACAGGGCGCGTACTATGGTTGCTTTGACGAGCACGTATAACGTG
CTTTCCTCGTTAGAATCAGAGCGGGAGCTAAACAGGAGGCCGATTAAAGGGATTTTAGACAGGAACGGTACGCCA
GAATCCTGAGAAGTGTTTTTATAATCAGTGAGGCCACCGAGCAAAAGAGTCTGTCCATCACGCAAATTAACCGTTG
TCGCAATACTTCTTTGATTAGTAATAACATCACTTGCCTGAGTAGAAGAACTCAAACTATCGGCCTTGCTGGTAATA
TCCAGAACAATCCTGAATCGCCCCATCATCCAGCCAGAAAGTGAGGGAGCCACGGTTGATGAGAGCTTTGTTGTA
GGTGGACCAGTTGGTGATTTTGAACTTTTGCTTTGCCACGGAACGGTCTGCGTTGTCGGGAAGATGCGTGATCTG
ATCCTTCAACTCAGCAAAAGTTCGATTTATTCAACAAAGCCGCCGTCCCGTCAAGTCAGCGTAATGCTCTGCCAGTG
TTACAACCAATTAACCAATTCTGATTAGAAAAACTCATCGAGCATCAAATGAAACTGCAATTTATTCATATCAGGAT
TATCAATACCATATTTTTGAAAAAGCCGTTTCTGTAATGAAGGAGAAAACTCACCGAGGCAGTTCCATAGGATGGC

FIG. 15B

```
AAGATCCTGGTATCGGTCTGCGATTCCGACTCGTCCAACATCAATACAACCTATTAATTTCCCCTCGTCAAAAATAA
GGTTATCAAGTGAGAAATCACCATGAGTGACGACTGAATCCGGTGAGAATGGCAAAAACTTATGCATTTCTTTCCA
GACTTGTTCAACAGGCCAGCCATTACGCTCGTCATCAAAATCACTCGCATCAACCAAACCGTTATTCATTCGTGATT
GCGCCTGAGCGAGACGAAATACGCGATCGCTGTTAAAAGGACAATTACAAACAGGAATCGAATGCAACCGGCGC
AGGAACACTGCCAGCGCATCAACAATATTTTCACCTGAATCAGGATATTCTTCTAATACCTGGAATGCTGTTTTCCA
GGGGATCGCAGTGGTGAGTAACCATGCATCATCAGGAGTACGGATAAAATGCTTGATGGTCGGAAGAGGCATAA
ATTCCGTCAGCCAGTTTAGTCTGACCATCTCATCTGTAACATCATTGGCAACGCTACCTTTGCCATGTTTCAGAAAC
AACTCTGGCGCATCGGGCTTCCCATACAATCGATAGATTGTCGCACCTGATTGCCCGACATTATCGCGAGCCCATTT
ATACCCATATAAATCAGCATCCATGTTGGAATTTAATCGCGGCCTCGAGCAAGACGTTTCCCGTTGAATATGGCTC
ATAACACCCCTTGTATTACTGTTTATGTAAGCAGACAGTTTTATTGTTCATGATGATATATTTTTATCTTGTGCAATG
TAACATCAGAGATTTTGAGACACAACGTGGCTTTGTTGAATAAATCGAACTTTTGCTGAGTTGAAGGATCAGATCA
CGCATCTTCCCGACAACGCAGACCGTTCCGTGGCAAAGCAAAAGTTCAAAATCACCAACTGGTCCACCTACAACAA
AGCTCTCATCAACCGTGGCTCCCTCACTTTCTGGCTGGATGATGGGGCGATTCAGGCTGCCTCGCGCGTTTCGGTG
ATGACGGTGAAAACCTCTGACACATGCAGCTCCCGGAGACGGTCACAGCTTGTCTGTAAGCGGATGCCGGGAGCA
GACAAGCCCGTCAGGGCGCGTCAGCGGGTGTTGGCGGGTGTCGGGGCGCAGCCATGACCCAGTCACGTAGCGAT
AGCGGAGTGTATACTGGCTTAACTATGCGGCATCAGAGCAGATTGTACTGAGAGTGCACCATATGCGGTGTGAAA
TACCGCACAGATGCGTAAGGAGAAAATACCGCATCAGGCGCTCTTCCGCTTCCTCGCTCACTGACTCGCTGCGCTC
GGTCGTTCGGCTGCGGCGAGCGGTATCAGCTCACTCAAAGGCGGTAATACGGTTATCCACAGAATCAGGGGATAA
CGCAGGAAAGAACATGTGAGCAAAAGGCCAGCAAAAGGCCAGGAACCGTAAAAAGGCCGCGTTGCTGGCGTTTT
TCCATAGGCTCCGCCCCCCTGACGAGCATCACAAAAATCGACGCTCAAGTCAGAGGTGGCGAAACCCGACAGGAC
TATAAAGATACCAGGCGTTTCCCCCTGGAAGCTCCCTCGTGCGCTCTCCTGTTCCGACCCTGCCGCTTACCGGATAC
CTGTCCGCCTTTCTCCCTTCGGGAAGCGTGGCGCTTTCTCAATGCTCACGCTGTAGGTATCTCAGTTCGGTGTAGGT
CGTTCGCTCCAAGCTGGGCTGTGTGCACGAACCCCCCGTTCAGCCCGACCGCTGCGCCTTATCCGGTAACTATCGT
CTTGAGTCCAACCCGGTAAGACACGACTTATCGCCACTGGCAGCAGCCACTGGTAACAGGATTAGCAGAGCGAGG
TATGTAGGCGGTGCTACAGAGTTCTTGAAGTGGTGGCCTAACTACGGCTACACTAGAAGGACAGTATTTGGTATCT
GCGCTCTGCTGAAGCCAGTTACCTTCGGAAAAAGAGTTGGTAGCTCTTGATCCGGCAAACAAACCACCGCTGGTA
GCGGTGGTTTTTTTGTTTGCAAGCAGCAGATTACGCGCAGAAAAAAAGGATCTCAAGAAGATCCTTTGATCTTTTC
TACGGGGTCTGACGCTCAGTGGAACGAAAACTCACGTTAAGGGATTTTGGTCATGAGATTATCAAAAAGGATCTT
CACCTAGATCCTTTTAAATTAAAAATGAAGTTTTAAATCAATCTAAAGTATATATGAGTAAACTTGGTCTGACAGTT
ACCAATGCTTAATCAGTGAGGCACCTATCTCAGCGATCTGTCTATTTCGTTCATCCATAGTTGCCTGACTCCCCGTC
GTGTAGATAACTACGATACGGGAGGGCTTACCATCTGGCCCCAGTGCTGCAATGATACCGCGAGACCCACGCTCA
CCGGCTCCAGATTTATCAGCAATAAACCAGCCAGCCGGAAGGGCCGAGCGCAGAAGTGGTCCTGCAACTTTATCC
GCCTCCATCCAGTCTATTAATTGTTGCCGGGAAGCTAGAGTAAGTAGTTCGCCAGTTAATAGTTTGCGCAACGTTG
TTGCCATTGCTGCAGGCATCGTGGTGTCACGCTCGTCGTTTGGTATGGCTTCATTCAGCTCCGGTTCCCAACGATCA
AGGCGAGTTACATGATCCCCCATGTTGTGCAAAAAAGCGGTTAGCTCCTTCGGTCCTCCGATCGTTGTCAGAAGTA
AGTTGGCCGCAGTGTTATCACTCATGGTTATGGCAGCACTGCATAATTCTCTTACTGTCATGCCATCCGTAAGATGC
TTTTCTGTGACTGGTGAGTACTCAACCAAGTCATTCTGAGAATAGTGTATGCGGCGACCGAGTTGCTCTTGCCCGG
CGTCAACACGGGATAATACCGCGCCACATAGCAGAACTTTAAAAGTGCTCATCATTGGAAAACGTTCTTCGGGGC
GAAAACTCTCAAGGATCTTACCGCTGTTGAGATCCAGTTCGATGTAACCCACTCGTGCACCCAACTGATCTTCAGCA
TCTTTTACTTTCACCAGCGTTTCTGGGTGACGCAGATCCCGCAAGAGGCCCGGCAGTACCGGCATAACCAAGCCTA
TGCCTACAGCATCCAGGGTGACGGTGCCGAGGATGACGATGAGCGCATTGTTAGATTTCATACACGGTGCCTGAC
TGCGTTAGCAATTTAACTGTGATAAACTACCGCATTAA -SEQ ID No.29
```

FIG. 15B Continued

>hsp60 (228 bp)
AGCGGGTGAACGACCTTGCACTCGACACTGCCGAG
TGCTAGAAACGACTTAGCACTCGGATTACGTGAGT
GCTAGGTCGAAGAGGTGAGACCGGGCCCTGCGC
GCAACCCGGCGCAGGTGACACGCCGGGTCGTCCGT
CGGCGGGCATCGAATCGACCTAGAAGACGTGTCCA
AAGTACGGGCCGAACCGGCCCCTATCTGGAGGAA
TCACTTCGCAAAGGAGGTATCGA -SEQ ID No. 30

FIG 15C

>GalK (1093 bp)

ATGACGGTGCGGCCTCCGCCCCCGGGGTGAAACCTGATCGGCGAGCACACCGACTACAACG
ACGGCTTCGCGCTGCGCATGGCCCTGCAGGTGGGCACCGACGCCGAATTCGACGCCACGGTGC
CGGTTCCGCGATCATCGTGAGCTCGGCGCAGGAGGAGGACCGGTCACCGTGCCGCTGGACACC
ATGCCGGGGCGAGCGTCACGGGCTGGGCCGCCTACGTGACGTGGGATGCGTGCCGTGCCGGG
CACGGCGTCGACGTGCCGGCCCGGGACACTGCGCGGCGACTGCGGACTGCCGGTGGGGGGA
CTCTCGTCGTCCGGATCGAGCTCGCCCGGGATCGAGTGCGCGGGTGCTGCTGGCGTTGACCGCTGACTTC
TCGACCGGATCGACCAGATGAGCAGCCTGCCCCGTGCCCTCGGGCTCGAGCGTGCTCCGATCGATTC
GGGCCTGCTGCACGGATGACGCCACCAGCGCCACGACTCCGGGGGAGTACCGGCCGCGGAGGCGGG
GCACACGCCGCACCGCGCACGCCGAGATTCCCGATCCAGCCGATCACCGGTGCCCGCGCGAGCGGGG
CGGCCGCGGGAAACTCGGGCGCGCGGGGTCGCAGTGCGTGCTGCCCGTGACCGTGATGAAGCGACTGG
CGGGATGCGCGAGACGCGCCAGTGCCGATCACGCCGCCTTCGGCGCCTGATGAACGACTCGACGC
TCGATGCGCGACGACTTCGCGCGGGATGACCGGTGGCTTCGGCGCACCGTCATCGCCCTGGCG
GCTCGGCGCGTACGGCCCCAGCATCGTGAGGAGCTGCCGGGGCGGTCCGGGTGCCGGCCAC
CCCACCCGACGGTGACCTCGGTCCGGCCAGGGAGGCGCACGTCATTGGGATGTGTGATT
AATTAAGG - SEQ ID No. 31

FIG 15D

>GalK (1093 bp)

ATGACGGTGCGCGCCTCCGCCCCCGGCTGGGTGAACCTGATCGGGAGCACACCGACTACAACG
ACGGCTTCGCGCTGCGCGATGGCCCTGCAGGTGGGCACCGAATTCGACGCCACCGGTGC
CGGTTCCGCGATCATCGTGAGCGCCGCAGGAGGACGCCGTCACCGTGCCGCTGGACACC
ATGCCGGGGACGTCACGGGCCGCTACGTGGGGATGCGTGGGGCGTTGCGCGGG
CACGGCGTCGACGTGCCGGGACACTGCGCTCGGACTGCGCGACTGCGCCGGTGGGGGCGGGA
CTCTCGTCGTCCGGGCGCTCGAGTCGCCCGGGCGGTTGACCGCCTCGTCGGGGGCGC
TCGACCGGATCGAGCTCGCCGGATGAGCAGCCTGCCCTGCCCGTCTCGAGGACACTCGCTGTTGCTCGACTTC
GCACGCTCGAGTCGATGCACGCCAGTGGCCCCTGCCCTGCGCGACGACGTGCTCCTGCGATCGATTC
GCACACGCCGCACCAGCGGGGGAGTACCGCCGCGGAGGCCTGCGAGCGGG
CGGCCGCGGGAACTCGGGGTCGATTCCCTGACGCGGAGACGACTGGAAGCGACTGG
CGGACGCGAGACGCCTGCCAGTGCCCCGACGTCACGCCCGACGTGTCACTGAGAATCGGCGTGTCGACGC
CGGGATGGCGGCGTCCAGTGCCAGCATCACGCCGCCTTCGCCGCTGATGAACGACTCGCAGGCG
TCGATGCGGACGACTTCGACGCCATCACGTGCCGCCATGACCTGATCGCCGAGACCGCGTCGC
GCTCGGGGCGTACGCGGGATGACCGGTGGCTTCGGCACCGTCATCGCCCTGGCG
CCGGCCGACGCGGCCGACGCATCGTGGAGGAGTGCGCCGGGTCGCGGGTGCCGGCCAC
CCCACCCCGACGGTCCGGACCTGCCCAGGGAGAGGCCACACGTCATTGTGGATGTGTGATT
AATTAAGG

FIG. 15E

>pΔtmytC (7838 bp)

AGCTTCGTCTGCGCGCCACCTGGGACGTCTCGGGCTGGGAGCGCGACTCGAACGTGGCCTTCCTCTCGCAGAAGG
GCATCAACGTCGTGACGCCCGTCGGCGGCACCTCGAGCTGGTACACCGACTGGCAGTCGCCGTCGTCGACCAACC
GTCAGCCCTACCGCTACACCTGGGCCTCGTTCCTGAAGACGAGCCTGCCGCAGTACATCCGCAGCCTCGGCTTCAG
CGACAACGTCTCGCTGGTCGGCCTGTCGATGTCCGGTAGCGCCGCGATCATCAACGCCCTCGAGTCGAACGGCTA
CTACAAGCGCGCCGCGTCGCTCTCGGGCCTGACCAACATCTCGGCCCCCGGCGTCCCGATCGCCGTCGGCATCGCC
TCGCTCGATTCGGGCGGCTACAACGCCGGCCTCGACATGTGGGGCGGCCCGTTCGACTCCCGCTGGGCGAAGAAC
GACCCGACCGTGCAGGTGAACCGACTCAAGGGCATGCCGCTGTGGATCTCCGCCGGTAACGGCGTCTTCGGCAAG
TACACCCCGAACCCGGGCCCGGCCGATGTCGTCCAGGGCGTGCCGCTCGAGTGGCTCGCGCTGTCGCAGGCGCGC
TCCTTCGAGGGTGCCGCCAAGCGCGCCGGCCTGAGCAAGGCCCACTTCGACTTCCCGCCGGCCGGCACCCACACC
TGGGGCTACTGGCAGGATCAGGTGTGGCAGATGCAGCGCACCGGTTGGTTCTCGAAGTAATCCGCTGCGGTTGTA
CGAACAGATCACACGACAGGCGGCCTCGTTCGGACGGACGGGGTCGCTTGTCGTATTGTGAGGTGGATGACTTTC
CTGAGGAAACCGGGAGTGTCTGTAACGCCTGAGCCTGTGATTTCGATGAGATCCAGGGAGAGTGTCACACATGTG
ACTGATGTGAATCATGTGACATATGTGACGACCGATGTTAGAGTGACGGCTGTGACAAGGCTGGTCGATCCCGAC
CACCGGTCCCGTCCACAAGCTATTGCGCGGAGACGCCGCGTGACAAAGGAGAGGTCAGCACACTGCGTTCGTGAT
CGCAAGGAAGGCCCCGGGCTGTTGCCCGGGGCCTTCCGGCGTATCGGTACTCTTTCAGCGAATCCGCCCGACAGA
CTCGAGGTTGCAGCCCAGATGAACCAGCCCCCACGACCGACGTCGACGAGCCCCTCGGTTTCCGGATCGATCCC
GTGCTCGCCCGCAGTTGGCTGCTGGTCAACGCCGCGCAGCCCGAGCGCTTCGACGCCGCGGCCCGCTCCCGCGCC
GACATCGTGGTGCTCGACATCGAGGACGCCGTCGCGCCCAAGGACAAGACGGCTGCGCGCGACAACGTGGTCGA
CTGGCTGAACCGCGAGCTCGACGGTCGGCCCAACGACGGCTGGGTCCGGGTCAACGGCTTCGGCACCCAGTGGT
GGGCCGACGACCTGGAGGCGCTGCGCGGGGCGAAGCACCTCGGCGGCGTGATGCTGGCGATGGTCGAATCGAT
GGACCACGTCACGGAGACCGCCAAGCGGCTGCCGGACACGCTCATCGTCGCGCTGGTCGAGACCGCGCGCGGCC
TCGAGCGGATCAGCGAGATCGCCTCCGCGAAGGGCACCTTCCGCCTGGCCTTCGGCATCGGCGACTTCGCCGCG
ACACCGGCTTCGGCGGCGACCCGACGACGCTGGCCTACGCCCGCTCGCGGTTCACCATCGCCGCGAAGGCGGCCC
ACCTGCCGGGCGCGATCGACGGGCCGACCGTCGGATCCAAGGGCCTGCACGTGGTCGACGGATCCTATGTATTCT
ATAGTGTCACCTAAATCGTATGTGTATGATACATAAGGTTATGTATTAATTGTAGCCGCGTTCTAACGACAATATGT
ACAAGCCTAATTGTGTAGCATCTGGCTTACTGAAGCAGACCCTATCATCTCTCGTAAACTGCCGTCAGAGTCGGT
TTGGTTGGACGAACCTTCTGAGTTTCTGGTAACGCCGTCCGCACCCGGAAATGGTCAGCGAACCAATCAGCAGG
GTCATCGCTAGAAATCATCCTTAGCGAAAGCTAAGGATTTTTTTTATCTGAATTGGTACCGCGGCCGCTTAATAGCG
GTGAACGACCTTGCACTCGACACTGCCGAGTGCTAGAAACGACTTAGCACTCGGATTACGTGAGTGCTAGGTCGA
AGAGGTGAGACCGGGCCCTGCGCGCAACCCGCGCAGGTGACACGCCGGGTCGTCCGTCGCGGGCATCGAATCGA
CCTAGAAGACGTGTCCAAAGTACGGGCCGAACCGGCCCCTATCTGGAGGAATCACTTCGCAAAAGGAGGTATCGA
ATGACGGTGCGCGCCTCCGCCCCGGCCGGGTGAACCTGATCGGCGAGCACACCGACTACAACGACGGCTTCGCG
CTGCCGATGGCCCTGCAGGTGGGCACCGACGCCGAATTCGACGCCACCGGTGCCGGTTCCGCGATCATCGTGAGC
TCCGCGCAGGAGGAGGACGCCGTCACCGTGCCGCTGGACACCATGCCGGGCGACGTCACGGGCTGGGCCGCCTA
CGTGGCGGGATGCGTGTGGGCGTTGCGCGGGCACGGCGTCGACGTGCCGGCCGGGACACTGCGACTGCGCTCG
GACGTGCCGGTGGGGGCGGGACTCTCGTCGTCCGGCGGCTCGAGTGCGCGGTGCTGCTGGCGTTGACCGCCTC
GTCGGGGGCGCTCGACCGGATCGAGCTCGCCCGGATCGCGCAGCGCGCCGAGAACGACTACGTCGGGGCGCCG
ACGGGCCTGCTCGACCAGATGAGCAGCCTGCACGGCGCCGAGGACACTGCGCTGTTGCTCGACTTCCGCACGCTC
GCAGTCGATCCCGTGCCCCTGCGGCTCGGCGACGACGTGCTCCTCGCGATCGATTCGCACACGCCGCACCAGCAC

FIG. 16B

```
GCGGCGGGGGAGTACCGGCGCCGCCGCGAGGCCTGCGAGCGGGCGGCCGCGGAACTCGGGGTCGATTCCCTGC
GTGACGCCGCGGACGACGACTGGAAGCGACTGGCGGACGCCGAGACGCGGCGTCGGGCCCGGCACGTGCTCAC
TGAGAATCGGCGTGTGCTCGACGCCGCGGATGCGCTGCGCAGTGCCGATCACGCCGCCTTCGGCGCGCTGATGAA
CGACTCGCAGGCGTCGATGCGCGACGACTTCGCGATCACCGTGCCCGCCATCGACCTGATCGCCGAGACCGCCGT
CGCGCTCGGCGCGTACGGCGCGCGGATGACCGGTGGTGGCTTCGGCGGCACCGTCATCGCCCTGGCGCCGGCCG
ACGCGGCCCGCAGCATCGTGGAGGAGCTGCCGGCCCGGGTCGCGGGTGCCGGCCACCCCACCCCGACGGTGACC
TCGGTCCGGCCAGGGAGAGGCGCACACGTCATTGTGGATGTGTGATTAATTAAGGTAAGAATTCCCTGTAATCC
GGGCAGCGCAACGGAACATTCATCAGTGTAAAAATGGAATCAATAAAGCCCTGCGCAGCGCGCAGGGTCAGCCT
GAATACGCGTTTAATGACCAGCACAGTCGTGATGGCAAGGTCAGAATAGCGCTGAGGTCTGCCTCGTGAAGAAG
GTGTTGCTGACTCATACCAGGATTTTGTTAAAATTCGCGTTAAATTTTTGTTAAATCAGCTCATTTTTTAACCAATAG
GCCGAAATCGGCAAAATCCCTTATAAATCAAAAGAATAGACCGAGATAGGGTTGAGTGTTGTTCCAGTTTGGAAC
AAGAGTCCACTATTAAAGAACGTGGACTCCAACGTCAAAGGGCGAAAAACCGTCTATCAGGGCGATGGCCCACTA
CGTGAACCATCACCCTAATCAAGTTTTTTGGGGTCGAGGTGCCGTAAAGCACTAAATCGGAACCCTAAAGGGAGC
CCCCGATTTAGAGCTTGACGGGGAAAGCCGGCGAACGTGGCGAGAAAGGAAGGGAAGAAAGCGAAAGGAGCG
GGCGCTAGGGCGCTGGCAAGTGTAGCGGTCACGCTGCGCGTAACCACCACACCCGCCGCGCTTAATGCGCCGCTA
CAGGGCGCGTACTATGGTTGCTTTGACGAGCACGTATAACGTGCTTTCCTCGTTAGAATCAGAGCGGGAGCTAAA
CAGGAGGCCGATTAAAGGGATTTTAGACAGGAACGGTACGCCAGAATCCTGAGAAGTGTTTTTATAATCAGTGAG
GCCACCGAGCAAAAGAGTCTGTCCATCACGCAAATTAACCGTTGTCGCAATACTTCTTTGATTAGTAATAACATCAC
TTGCCTGAGTAGAAGAACTCAAACTATCGGCCTTGCTGGTAATATCCAGAACAATCCTGAATCGCCCCATCATCCA
GCCAGAAAGTGAGGGAGCCACGGTTGATGAGAGCTTTGTTGTAGGTGGACCAGTTGGTGATTTTGAACTTTTGCT
TTGCCACGGAACGGTCTGCGTTGTCGGGAAGATGCGTGATCTGATCCTTCAACTCAGCAAAAGTTCGATTTATTCA
ACAAAGCCGCCGTCCCGTCAAGTCAGCGTAATGCTCTGCCAGTGTTACAACCAATTAACCAATTCTGATTAGAAAA
ACTCATCGAGCATCAAATGAAACTGCAATTTATTCATATCAGGATTATCAATACCATATTTTTGAAAAGCCGTTTC
TGTAATGAAGGAGAAAACTCACCGAGGCAGTTCCATAGGATGGCAAGATCCTGGTATCGGTCTGCGATTCCGACT
CGTCCAACATCAATACAACCTATTAATTTCCCCTCGTCAAAAATAAGGTTATCAAGTGAGAAATCACCATGAGTGAC
GACTGAATCCGGTGAGAATGGCAAAAACTTATGCATTTCTTTCCAGACTTGTTCAACAGGCCAGCCATTACGCTCG
TCATCAAAATCACTCGCATCAACCAAACCGTTATTCATTCGTGATTGCGCCTGAGCGAGACGAAATACGCGATCGC
TGTTAAAAGGACAATTACAAACAGGAATCGAATGCAACCGGCGCAGGAACACTGCCAGCGCATCAACAATATTTT
CACCTGAATCAGGATATTCTTCTAATACCTGGAATGCTGTTTTCCAGGGGATCGCAGTGGTGAGTAACCATGCATC
ATCAGGAGTACGGATAAAATGCTTGATGGTCGGAAGAGGCATAAATTCCGTCAGCCAGTTTAGTCTGACCATCTC
ATCTGTAACATCATTGGCAACGCTACCTTTGCCATGTTTCAGAAACAACTCTGGCGCATCGGGCTTCCCATACAATC
GATAGATTGTCGCACCTGATTGCCCGACATTATCGCGAGCCCATTTATACCCATATAAATCAGCATCCATGTTGGAA
TTTAATCGCGGCCTCGAGCAAGACGTTTCCCGTTGAATATGGCTCATAACACCCCTTGTATTACTGTTTATGTAAGC
AGACAGTTTTATTGTTCATGATGATATATTTTTATCTTGTGCAATGTAACATCAGAGATTTTGAGACACAACGTGGC
TTTGTTGAATAAATCGAACTTTTGCTGAGTTGAAGGATCAGATCACGCATCTTCCCGACAACGCAGACCGTTCCGT
GGCAAAGCAAAAGTTCAAAATCACCAACTGGTCCACCTACAACAAAGCTCTCATCAACCGTGGCTCCCTCACTTTCT
GGCTGGATGATGGGGCGATTCAGGCTGCCTCGCGCGTTTCGGTGATGACGGTGAAAACCTCTGACACATGCAGCT
CCCGGAGACGGTCACAGCTTGTCTGTAAGCGGATGCCGGGAGCAGACAAGCCCGTCAGGGCGCGTCAGCGGGTG
TTGGCGGGTGTCGGGGCGCAGCCATGACCCAGTCACGTAGCGATAGCGGAGTGTATACTGGCTTAACTATGCGGC
ATCAGAGCAGATTGTACTGAGAGTGCACCATATGCGGTGTGAAATACCGCACAGATGCGTAAGGAGAAAATACC
GCATCAGGCGCTCTTCCGCTTCCTCGCTCACTGACTCGCTGCGCTCGGTCGTTCGGCTGCGGCGAGCGGTATCAGC
```

FIG 16B Continued

```
TCACTCAAAGGCGGTAATACGGTTATCCACAGAATCAGGGGATAACGCAGGAAAGAACATGTGAGCAAAAGGCC
AGCAAAAGGCCAGGAACCGTAAAAAGGCCGCGTTGCTGGCGTTTTTCCATAGGCTCCGCCCCCCTGACGAGCATC
ACAAAAATCGACGCTCAAGTCAGAGGTGGCGAAACCCGACAGGACTATAAAGATACCAGGCGTTTCCCCCTGGAA
GCTCCCTCGTGCGCTCTCCTGTTCCGACCCTGCCGCTTACCGGATACCTGTCCGCCTTTCTCCCTTCGGGAAGCGTG
GCGCTTTCTCAATGCTCACGCTGTAGGTATCTCAGTTCGGTGTAGGTCGTTCGCTCCAAGCTGGGCTGTGTGCACG
AACCCCCCGTTCAGCCCGACCGCTGCGCCTTATCCGGTAACTATCGTCTTGAGTCCAACCCGGTAAGACACGACTT
ATCGCCACTGGCAGCAGCCACTGGTAACAGGATTAGCAGAGCGAGGTATGTAGGCGGTGCTACAGAGTTCTTGA
AGTGGTGGCCTAACTACGGCTACACTAGAAGGACAGTATTTGGTATCTGCGCTCTGCTGAAGCCAGTTACCTTCGG
AAAAAGAGTTGGTAGCTCTTGATCCGGCAAACAAACCACCGCTGGTAGCGGTGGTTTTTTTGTTTGCAAGCAGCA
GATTACGCGCAGAAAAAAAGGATCTCAAGAAGATCCTTTGATCTTTTCTACGGGGTCTGACGCTCAGTGGAACGA
AAACTCACGTTAAGGGATTTTGGTCATGAGATTATCAAAAGGATCTTCACCTAGATCCTTTTAAATTAAAAATGAA
GTTTTAAATCAATCTAAAGTATATATGAGTAAACTTGGTCTGACAGTTACCAATGCTTAATCAGTGAGGCACCTATC
TCAGCGATCTGTCTATTTCGTTCATCCATAGTTGCCTGACTCCCCGTCGTGTAGATAACTACGATACGGGAGGGCTT
ACCATCTGGCCCCAGTGCTGCAATGATACCGCGAGACCCACGCTCACCGGCTCCAGATTTATCAGCAATAAACCAG
CCAGCCGGAAGGGCCGAGCGCAGAAGTGGTCCTGCAACTTTATCCGCCTCCATCCAGTCTATTAATTGTTGCCGGG
AAGCTAGAGTAAGTAGTTCGCCAGTTAATAGTTTGCGCAACGTTGTTGCCATTGCTGCAGGCATCGTGGTGTCACG
CTCGTCGTTTGGTATGGCTTCATTCAGCTCCGGTTCCCAACGATCAAGGCGAGTTACATGATCCCCATGTTGTGCA
AAAAAGCGGTTAGCTCCTTCGGTCCTCCGATCGTTGTCAGAAGTAAGTTGGCCGCAGTGTTATCACTCATGGTTAT
GGCAGCACTGCATAATTCTCTTACTGTCATGCCATCCGTAAGATGCTTTTCTGTGACTGGTGAGTACTCAACCAAGT
CATTCTGAGAATAGTGTATGCGGCGACCGAGTTGCTCTTGCCCGGCGTCAACACGGGATAATACCGCGCCACATA
GCAGAACTTTAAAAGTGCTCATCATTGGAAAACGTTCTTCGGGGCGAAAACTCTCAAGGATCTTACCGCTGTTGAG
ATCCAGTTCGATGTAACCCACTCGTGCACCCAACTGATCTTCAGCATCTTTTACTTTCACCAGCGTTTCTGGGTGAC
GCAGATCCCGCAAGAGGCCCGGCAGTACCGGCATAACCAAGCCTATGCCTACAGCATCCAGGGTGACGGTGCCG
AGGATGACGATGAGCGCATTGTTAGATTTCATACACGGTGCCTGACTGCGTTAGCAATTTAACTGTGATAAACTAC
CGCATTAA
``` - SEQ ID No. 32

FIG. 16B Continued

```
GCGGCGGGGGAGTACCGGCGCCGCCGCGAGGCCTGCGAGCGGGCGGCCGCGGAACTCGGGGTCGATTCCCTGC
GTGACGCCGCGGACGACGACTGGAAGCGACTGGCGGACGCCGAGACGCGGCGTCGGGCCCGGCACGTGCTCAC
TGAGAATCGGCGTGTGCTCGACGCCGCGGATGCGCTGCGCAGTGCCGATCACGCCGCCTTCGGCGCGCTGATGAA
CGACTCGCAGGCGTCGATGCGCGACGACTTCGCGATCACCGTGCCCGCCATCGACCTGATCGCCGAGACCGCCGT
CGCGCTCGGCGCGTACGGCGCGCGGATGACCGGTGGTGGCTTCGGCGGCACCGTCATCGCCCTGGCGCCGGCCG
ACGCGGCCCGCAGCATCGTGGAGGAGCTGCCGGCCCGGGTCGCGGGTGCCGGCCACCCCACCCCGACGGTGACC
TCGGTCCGGCCAGGGAGAGGCGCACACGTCATTGTGGATGTGTGATTAATTAAGGTAAGAATTCCCCTGTAATCC
GGGCAGCGCAACGGAACATTCATCAGTGTAAAAATGGAATCAATAAAGCCCTGCGCAGCGCGCAGGGTCAGCCT
GAATACGCGTTTAATGACCAGCACAGTCGTGATGGCAAGGTCAGAATAGCGCTGAGGTCTGCCTCGTGAAGAAG
GTGTTGCTGACTCATACCAGGATTTTGTTAAAATTCGCGTTAAATTTTTGTTAAATCAGCTCATTTTTTAACCAATAG
GCCGAAATCGGCAAAATCCCTTATAAATCAAAAGAATAGACCGAGATAGGGTTGAGTGTTGTTCCAGTTTGGAAC
AAGAGTCCACTATTAAAGAACGTGGACTCCAACGTCAAAGGGCGAAAAACCGTCTATCAGGGCGATGGCCCACTA
CGTGAACCATCACCCTAATCAAGTTTTTTGGGGTCGAGGTGCCGTAAAGCACTAAATCGGAACCCTAAAGGGAGC
CCCCGATTTAGAGCTTGACGGGGAAAGCCGGCGAACGTGGCGAGAAAGGAAGGGAAGAAAGCGAAAGGAGCG
GGCGCTAGGGCGCTGGCAAGTGTAGCGGTCACGCTGCGCGTAACCACCACACCCGCCGCGCTTAATGCGCCGCTA
CAGGGCGCGTACTATGGTTGCTTTGACGAGCACGTATAACGTGCTTTCCTCGTTAGAATCAGAGCGGGAGCTAAA
CAGGAGGCCGATTAAAGGGATTTTAGACAGGAACGGTACGCCAGAATCCTGAGAAGTGTTTTTATAATCAGTGAG
GCCACCGAGCAAAAGAGTCTGTCCATCACGCAAATTAACCGTTGTCGCAATACTTCTTTGATTAGTAATAACATCAC
TTGCCTGAGTAGAAGAACTCAAACTATCGGCCTTGCTGGTAATATCCAGAACAATCCTGAATCGCCCCATCATCCA
GCCAGAAAGTGAGGGAGCCACGGTTGATGAGAGCTTTGTTGTAGGTGGACCAGTTGGTGATTTGAACTTTTGCT
TTGCCACGGAACGGTCTGCGTTGTCGGGAAGATGCGTGATCTGATCCTTCAACTCAGCAAAAGTTCGATTTATTCA
ACAAAGCCGCCGTCCCGTCAAGTCAGCGTAATGCTCTGCCAGTGTTACAACCAATTAACCAATTCTGATTAGAAAA
ACTCATCGAGCATCAAATGAAACTGCAATTTATTCATATCAGGATTATCAATACCATATTTTGAAAAGCCGTTTC
TGTAATGAAGGAGAAAACTCACCGAGGCAGTTCCATAGGATGGCAAGATCCTGGTATCGGTCTGCGATTCCGACT
CGTCCAACATCAATACAACCTATTAATTTCCCCTCGTCAAAAATAAGGTTATCAAGTGAGAAATCACCATGAGTGAC
GACTGAATCCGGTGAGAATGGCAAAAACTTATGCATTTCTTTCCAGACTTGTTCAACAGGCCAGCCATTACGCTCG
TCATCAAAATCACTCGCATCAACCAAACCGTTATTCATTCGTGATTGCGCCTGAGCGAGACGAAATACGCGATCGC
TGTTAAAAGGACAATTACAAACAGGAATCGAATGCAACCGGCGCAGGAACACTGCCAGCGCATCAACAATATTTT
CACCTGAATCAGGATATTCTTCTAATACCTGGAATGCTGTTTTCCAGGGGATCGCAGTGGTGAGTAACCATGCATC
ATCAGGAGTACGGATAAAATGCTTGATGGTCGGAAGAGGCATAAATTCCGTCAGCCAGTTTAGTCTGACCATCTC
ATCTGTAACATCATTGGCAACGCTACCTTTGCCATGTTTCAGAAACAACTCTGGCGCATCGGGCTTCCCATACAATC
GATAGATTGTCGCACCTGATTGCCCGACATTATCGCGAGCCCATTTATACCCATATAAATCAGCATCCATGTTGGAA
TTTAATCGCGGCCTCGAGCAAGACGTTTCCCGTTGAATATGGCTCATAACACCCCTTGTATTACTGTTTATGTAAGC
AGACAGTTTTATTGTTCATGATGATATATTTTTATCTTGTGCAATGTAACATCAGAGATTTTGAGACACAACGTGGC
TTTGTTGAATAAATCGAACTTTTGCTGAGTTGAAGGATCAGATCACGCATCTTCCCGACAACGCAGACCGTTCCGT
GGCAAAGCAAAAGTTCAAAATCACCAACTGGTCCACCTACAACAAAGCTCTCATCAACCGTGGCTCCCTCACTTTCT
GGCTGGATGATGGGGCGATTCAGGCTGCCTCGCGCGTTTCGGTGATGACGGTGAAAACCTCTGACACATGCAGCT
CCCGGAGACGGTCACAGCTTGTCTGTAAGCGGATGCCGGGAGCAGACAAGCCCGTCAGGGCGCGTCAGCGGGTG
TTGGCGGGTGTCGGGGCGCAGCCATGACCCAGTCACGTAGCGATAGCGGAGTGTATACTGGCTTAACTATGCGGC
ATCAGAGCAGATTGTACTGAGAGTGCACCATATGCGGTGTGAAATACCGCACAGATGCGTAAGGAGAAAATACC
GCATCAGGCGCTCTTCCGCTTCCTCGCTCACTGACTCGCTGCGCTCGGTCGTTCGGCTGCGGCGAGCGGTATCAGC
```

FIG. 16C

```
TCACTCAAAGGCGGTAATACGGTTATCCACAGAATCAGGGGATAACGCAGGAAAGAACATGTGAGCAAAAGGCC
AGCAAAAGGCCAGGAACCGTAAAAAGGCCGCGTTGCTGGCGTTTTTCCATAGGCTCCGCCCCCCTGACGAGCATC
ACAAAAATCGACGCTCAAGTCAGAGGTGGCGAAACCCGACAGGACTATAAAGATACCAGGCGTTTCCCCCTGGAA
GCTCCCTCGTGCGCTCTCCTGTTCCGACCCTGCCGCTTACCGGATACCTGTCCGCCTTTCTCCCTTCGGGAAGCGTG
GCGCTTTCTCAATGCTCACGCTGTAGGTATCTCAGTTCGGTGTAGGTCGTTCGCTCCAAGCTGGGCTGTGTGCACG
AACCCCCCGTTCAGCCCGACCGCTGCGCCTTATCCGGTAACTATCGTCTTGAGTCCAACCCGGTAAGACACGACTT
ATCGCCACTGGCAGCAGCCACTGGTAACAGGATTAGCAGAGCGAGGTATGTAGGCGGTGCTACAGAGTTCTTGA
AGTGGTGGCCTAACTACGGCTACACTAGAAGGACAGTATTTGGTATCTGCGCTCTGCTGAAGCCAGTTACCTTCGG
AAAAAGAGTTGGTAGCTCTTGATCCGGCAAACAAACCACCGCTGGTAGCGGTGGTTTTTTTGTTTGCAAGCAGCA
GATTACGCGCAGAAAAAAAGGATCTCAAGAAGATCCTTTGATCTTTTCTACGGGGTCTGACGCTCAGTGGAACGA
AAACTCACGTTAAGGGATTTTGGTCATGAGATTATCAAAAAGGATCTTCACCTAGATCCTTTTAAATTAAAAATGAA
GTTTTAAATCAATCTAAAGTATATATGAGTAAACTTGGTCTGACAGTTACCAATGCTTAATCAGTGAGGCACCTATC
TCAGCGATCTGTCTATTTCGTTCATCCATAGTTGCCTGACTCCCCGTCGTGTAGATAACTACGATACGGGAGGGCTT
ACCATCTGGCCCCAGTGCTGCAATGATACCGCGAGACCCACGCTCACCGGCTCCAGATTTATCAGCAATAAACCAG
CCAGCCGGAAGGGCCGAGCGCAGAAGTGGTCCTGCAACTTTATCCGCCTCCATCCAGTCTATTAATTGTTGCCGGG
AAGCTAGAGTAAGTAGTTCGCCAGTTAATAGTTTGCGCAACGTTGTTGCCATTGCTGCAGGCATCGTGGTGTCACG
CTCGTCGTTTGGTATGGCTTCATTCAGCTCCGGTTCCCAACGATCAAGGCGAGTTACATGATCCCCCATGTTGTGCA
AAAAAGCGGTTAGCTCCTTCGGTCCTCCGATCGTTGTCAGAAGTAAGTTGGCCGCAGTGTTATCACTCATGGTTAT
GGCAGCACTGCATAATTCTCTTACTGTCATGCCATCCGTAAGATGCTTTTCTGTGACTGGTGAGTACTCAACCAAGT
CATTCTGAGAATAGTGTATGCGGCGACCGAGTTGCTCTTGCCCGGCGTCAACACGGGATAATACCGCGCCACATA
GCAGAACTTTAAAAGTGCTCATCATTGGAAAACGTTCTTCGGGGCGAAAACTCTCAAGGATCTTACCGCTGTTGAG
ATCCAGTTCGATGTAACCCACTCGTGCACCCAACTGATCTTCAGCATCTTTTACTTTCACCAGCGTTTCTGGGTGAC
GCAGATCCCGCAAGAGGCCCGGCAGTACCGGCATAACCAAGCCTATGCCTACAGCATCCAGGGTGACGGTGCCG
AGGATGACGATGAGCGCATTGTTAGATTTCATACACGGTGCCTGACTGCGTTAGCAATTTAACTGTGATAAACTAC
CGCATTAA
```

FIG. 16D

>tmytC upstream (1031 bp)
GTCTGCGCGCCACCTGGGACGTCTCGGGACTGGGAGCGGACTCGAACGTGGCCTTCCTCGCAG
AAGGGCATCAACGTCGTGACGCCCGTCGGGCCACCTCGAGTCGGTACACCGACTGGCAGTCGCC
GTCGTGACCAACCGTCAGCCCTACCGCTGGGCCTCGTTCCTGAAGAGAGCCTGCCGCA
GTACATCCGCAGCCTGGTTCAGCGACAAGTCGTCGTTCGCTGGTCGGCCTGTCGATGTCGGGTAGGC
CGGATCATCAAGCCCTCGAGTCGAACGGCTACTACAAGGCGCCGGTCGCTCTCGGGCTGAC
CAACATTCGGCCCCCGGGGTCCGAGTCGGCATGCCGTCGGCGATTCGGCGGGGGCTACAA
CGCCCGGCCTCGACATGTGGGGGCCCGCCGTTCGACTCCCGCGGGGCGAAGAACGACCGGTGC
AGGTGAACCGACTCAAGGGCATGCCCGGTAACGCGTCTTCGGCAAGTAC
ACCCGAACCCGGCGCCCGGCGATGTCGTCCAGGGCGCGTCGAGTGGCTCGCTGTCGCA
GGCGCGGCTCCTTCGAGGGTGCCCGCCAAGCCCTGAGCAGGCCCACTTCGACTTCCCGC
CGGCCGGCCACCACACCTGGGCTACTGGCAGGATCAGGTGTGGCAGATCAGGCACCGGTTG
GTTCTCGAAGTAATCCGCGGTTGTACGAACAGATGACTTTCCTGAGGAAACCGGAGTGTCTGTAACGC
ACGGGGTCGTTGTCGTATTGTGAGGTGGATGATCATTGACTGACTGTCACACATGTGAATCATGTGAC
CTGAGCCTGTGATTTCGATGAGATCCAGGAGAGTGTCACAAGGCTGGTGCAATCCGACCATGTGAC
ATATGTGACGACCGATGTTAGAGTGAGGGTGTGACAAGGAGAGGTCAGCA - SEQ ID No. 33
TCCACAAGCTATTGCGGGAGACGCCGTGACAAAGGAGAGGTCAGCA - SEQ ID No. 33

FIG. 17A

>tmytC upstream (1200 bp)

GCCGGCACGGGGCGCGCGAACGTGGGCGTGGGGCCAAGAACGCCAAGAACCCCGAAGGGCTTCAA
GCAGGCCTTCGTCAACGGTGCCGGGCATGCCGAACGTGAAGGTCCGTAGTGGCCTCCACCACCC
GATCCCAAGAAGGCCCCACCGTCGTCGTCGACGGTTCGCGCCACTGGGAGGTCTCGGGCT
GGGAGGCGGACTCGGAACGGCCTTCCTCGCAGAAGGCATCAACGTGTGACGCCGGCG
GCACCTCGAGTGGTACACGACTGGAGTGCGCCGTCGTCGACCATCAGCCGTACCGTACAC
CTGGGCCTCGTTCCTGAAGACGATGTGTCGGTAGCGCGGTAGCCCTCGAGTCGAACGGTACTA
TCGCTGGTGGCCGCGCTCGATTCGGGGCGACTACAACGCCCGGCTACAACATCGGCCCCGATCATCATCGGCCTGGTCGGTCCGATCGCCGTCGGC
AAGCGCGAACGACCCGAACGTGCAGGTGAACCGACTCAAGGCATGTGGGCGCCGTTCGACTCCC
ATGCCTCGCTCGAGAAGACGTCTTCGGCGGCTACAAGGTACACACCGGAACCGACTGGATCCCG
GCTGGGGCGAAGAACGACCGGAGTGGCTCGCAGGTGAACCGACTCAAGGCATGCCGGTCCAGGCGTGC
CCGGTAACGGCGTCTTCGGCAAGTACACCCGAAGGCGGTGCCAAGCGCCGGCCGGCCTGA
CGCTCGAGTGGCTCGCGCGTGTCGCAGGTGTGCCGGGCTCCTTCGAGGTCGCCAAGGATCAGGTGT
GCAAGGCCCACTTCGACTTCGAGGCGGCTACAACGGTCGTGTACGAACAGATCACACGAC
AGGCGGAGATGCAGGACGGTTGGTTCTCGAAGTAATCGCTGTTGTGAGGTGGACTTCCTGAGGAA
ACCGGGAGTGTCGTAACGCCTGAGCGCTGATTTCGATGAGATCCAGGAGAGTGTCACACATGTG
ACTGATGTGAATCATGTGACATATGCCGATGTTAGAGTGTGACAAGGTGGTCGA
TCCGACCACCGTCCCGTCCACAAGCTATTGCGGAGACGCCGGTGACAAAGGAGAGGTCAGC

A - SEQ ID No. 34

FIG. 17B

\>tmytC downstream (733 bp)

CACTGCGTTCGTGATCGCAAGGAAGGCCCGGGCTGTTGCCGGGCCTTCCGGGTATCG
GTACTCTTTCAGGAGAATCCGGACAGACTCGAGGTTGCAGCCCAGATGAACCAGCCCCC
ACGACCGACGAGAGCCCGGTTTCCGGATCGATCCGCTCCGCGCAGTTGGCT
GCTGGTCAACGCGGACGAGCCCGAGCGCTTCGACCCGCTTCGACCCGCGACATC
GTGGTGCTCGACATCGAGACGGACACAAGACAAGACGGCGCGGACAAC
GTGGTCGACTGGTCGAACCAGTGGGCCGAGCTCGGCCCAAGACGGCTGGGTCCGGGTCA
ACGGCTTCGGACACCAGTGGTGGGATGTCGAATCGATGACCCGGAAGCACC
TCGGGCGGGGTGATGCTGCCGGTCATCGTGGCTTCCGCCTGGTCGAGACCGCTCGAGCGGATCAGC
GCTGCCGGACACGTCATCGTGCCGAAGGCACCTTCCGCCATGGGGACTTCCGCGGA
GAGATCGCCTCCGGGACACCGACGACTGGCCTACGCCCGCTCGGGTTCACCATCGCCG
CACCCGGCTTCGAGCCCGCACCTGCCGGGCCGATCGACGGCCGTGACCGTCGGATCCAAGGCCTGC
CGAAGGGCTTCGGGGCCCACCTGC

- SEQ ID No. 35

FIG. 18A

>tmytC downstream (1200 bp)

CACTGCGTTGCTGATCGCAAGGAAGGCCCCGGGGTGTTGCCGGGCCTTCCGGGTATCG
GTACTCTTTCAGCGAATCCGCCGACAGACTCGAGGTTGCAGCCCAGATGAACCAGCCCCC
ACGACCGAGTCGACGAGCCCCTCGGTTTCCGGATCCCGGCCGCCGTCGCCGCAGTTGGCT
GCTGGTCAACGCGGCAGCGAGCGCTTCGACGCGGGGACAAGAGGTGCGGGCGACATC
GTGGTGTCGACATCGAGGACGAGCGTCGGCGGTCGGCCCAAGGACAAGAGACGGTGCGGCGACAAC
GTGGTCGACTGGCTGAACCGTGAAGCTCGAGCTCGGCCCAACGGTCGGGTCCGGTC
AACGGCTTCGGCACCCAGTGGTGGGCCGAGACCTGGAGGCGTGCGGGGGAAGCAC
CTCGGGCGGTGATGCTGGCGGACGTCGAATCGATGGAGACCACGTCACGAGACCGCAAGC
GGCTGCCGGACACGTCATCGCGGGTCGTGGTCGAGAGGCCCTTCGGCATCCGGGATCAG
CGAGATCGCCTCCGGAAGGCTTCGGCGACCTGCCGAGCACTCCGCCATCCGCCGGTTCACCATCGC
ACACCGGGCTTCGGGCGGGCCCACCTGCCGGGGCGATCGACGCCGACCGTCGGATCCAAGGCCT
CGGCGAAGGCGGGCCACCTGCCGGGCGGTCTCCTCCGAGTTCGGCATGACCGCAAGATCTGCCTCA
GCCCGATCAGTGCGAGCCCACCCGGTCAACGAGGCCTGACGCGGCCCGTGCGCGAGGACATCCGGTG
GTCGCGGAGTTCTTCGAGGCGACTTCGCGACTTCGCCCAAGATCCTGACCGCAACGGTCGGAC
CTGCCGCGCATCGCCGCACGCGACCGCCAAGATCCGGCCGGACGCCCGGGTACGGATCGTGT
GCCCGACGGCGGAGGCCGGAGCAGGCACCCCGCAGCCGGTGACACGTTCCACTGACCCC
GAGCAGGACGAAGCCCTCGATCGAGGGGCTTCGTGTCGTGGGGATCAG
GCCTGGGCGCAGGCCTCATCGGAGGCGTGAGGGTGATCTTGTCGCCGATCACCTTGCCGC
CGGTCTCGAGCGGCATGTCGATGGAGATGCCGAAGTCCTGG – SEQ ID No. 36

FIG. 18B

SEQUENCE LISTING

<160> NUMBER OF SEQ ID NOS: 36

<210> SEQ ID NO 1
<211> LENGTH: 17
<212> TYPE: DNA

```
<213> ORGANISM: Artificial Sequence
<220> FEATURE:
<223> OTHER INFORMATION: tmytA-UF-1

<400> SEQUENCE: 1
gtgcccggcg ccgctga                                                    17

<210> SEQ ID NO 2
<211> LENGTH: 21
<212> TYPE: DNA
<213> ORGANISM: Artificial Sequence
<220> FEATURE:
<223> OTHER INFORMATION: tmytA-DR-1

<400> SEQUENCE: 2
tgatctgcgc gaccgaccgg t                                               21

<210> SEQ ID NO 3
<211> LENGTH: 26
<212> TYPE: DNA
<213> ORGANISM: Artificial Sequence
<220> FEATURE:
<223> OTHER INFORMATION: tmytA-UF

<400> SEQUENCE: 3
cccaagcttg tgcccggcgc cgctga                                          26

<210> SEQ ID NO 4
<211> LENGTH: 34
<212> TYPE: DNA
<213> ORGANISM: Artificial Sequence
<220> FEATURE:
<223> OTHER INFORMATION: tmytA-UR

<400> SEQUENCE: 4
cccaagcttc atgggaacag tgttacacgg gtgt                                 34

<210> SEQ ID NO 5
<211> LENGTH: 27
<212> TYPE: DNA
<213> ORGANISM: Artificial Sequence
<220> FEATURE:
<223> OTHER INFORMATION: tmytA-DF

<400> SEQUENCE: 5
cgcggatccg acgaccggcc gggggtt                                         27

<210> SEQ ID NO 6
<211> LENGTH: 30
<212> TYPE: DNA
<213> ORGANISM: Artificial Sequence
<220> FEATURE:
<223> OTHER INFORMATION: tmytA-DR

<400> SEQUENCE: 6
cgcggatcct gatctgcgcg accgaccggt                                      30

<210> SEQ ID NO 7
<211> LENGTH: 17
<212> TYPE: DNA
<213> ORGANISM: Artificial Sequence
<220> FEATURE:
<223> OTHER INFORMATION: Inner- tmytA-F

<400> SEQUENCE: 7
gcgagcgcga gcccgtg                                                    17
```

<210> SEQ ID NO 8
<211> LENGTH: 17
<212> TYPE: DNA
<213> ORGANISM: Artificial Sequence
<220> FEATURE:
<223> OTHER INFORMATION: Inner- tmytA-R

<400> SEQUENCE: 8
gtggccggca gcgacgt                                                    17

<210> SEQ ID NO 9
<211> LENGTH: 21
<212> TYPE: DNA
<213> ORGANISM: Artificial Sequence
<220> FEATURE:
<223> OTHER INFORMATION: tmytB-UF-1

<400> SEQUENCE: 9
ggcggcgatg gtgcgaagag a                                               21

<210> SEQ ID NO 10
<211> LENGTH: 24
<212> TYPE: DNA
<213> ORGANISM: Artificial Sequence
<220> FEATURE:
<223> OTHER INFORMATION: tmytB-DR-1

<400> SEQUENCE: 10
tgtgggtgcc caccgacgag aagt                                            24

<210> SEQ ID NO 11
<211> LENGTH: 30
<212> TYPE: DNA
<213> ORGANISM: Artificial Sequence
<220> FEATURE:
<223> OTHER INFORMATION: tmytB-UF

<400> SEQUENCE: 11
cccaagcttg gcggcgatgg tgcgaagaga                                      30

<210> SEQ ID NO 12
<211> LENGTH: 31
<212> TYPE: DNA
<213> ORGANISM: Artificial Sequence
<220> FEATURE:
<223> OTHER INFORMATION: tmytB-UR

<400> SEQUENCE: 12
cccaagcttt cttggcccag ccgttgcgca t                                    31

<210> SEQ ID NO 13
<211> LENGTH: 29
<212> TYPE: DNA
<213> ORGANISM: Artificial Sequence
<220> FEATURE:
<223> OTHER INFORMATION: tmytB-DF

<400> SEQUENCE: 13
cgcggatcct ggggctactg gcaggatca                                       29

<210> SEQ ID NO 14
<211> LENGTH: 29
<212> TYPE: DNA
<213> ORGANISM: Artificial Sequence
<220> FEATURE:

<223> OTHER INFORMATION: tmytB-DR

<400> SEQUENCE: 14
cgcggatccg gtgcccaccg acgagaagt                                29

<210> SEQ ID NO 15
<211> LENGTH: 26
<212> TYPE: DNA
<213> ORGANISM: Artificial Sequence
<220> FEATURE:
<223> OTHER INFORMATION: Inner- tmytB-F

<400> SEQUENCE: 15
attcggacgg aaaagcacct gctgta                                   26

<210> SEQ ID NO 16
<211> LENGTH: 23
<212> TYPE: DNA
<213> ORGANISM: Artificial Sequence
<220> FEATURE:
<223> OTHER INFORMATION: Inner- tmytB-R

<400> SEQUENCE: 16
agccttgtca cagccgtcac tct                                      23

<210> SEQ ID NO 17
<211> LENGTH: 19
<212> TYPE: DNA
<213> ORGANISM: Artificial Sequence
<220> FEATURE:
<223> OTHER INFORMATION: tmytC-UF-1

<400> SEQUENCE: 17
gtctgcgcgc cacctggga                                           19

<210> SEQ ID NO 18
<211> LENGTH: 22
<212> TYPE: DNA
<213> ORGANISM: Artificial Sequence
<220> FEATURE:
<223> OTHER INFORMATION: tmytC-DR-1

<400> SEQUENCE: 18
gcaggccctt ggatccgacg gt                                       22

<210> SEQ ID NO 19
<211> LENGTH: 30
<212> TYPE: DNA
<213> ORGANISM: Artificial Sequence
<220> FEATURE:
<223> OTHER INFORMATION: tmytC-UF

<400> SEQUENCE: 19
cccaagcttg tctcgctggt cggcctgtcg                               30

<210> SEQ ID NO 20
<211> LENGTH: 29
<212> TYPE: DNA
<213> ORGANISM: Artificial Sequence
<220> FEATURE:
<223> OTHER INFORMATION: tmytC-UR

<400> SEQUENCE: 20
ggtcgctccc ccaggctgct cgcattgct                                29

```
<210> SEQ ID NO 21
<211> LENGTH: 33
<212> TYPE: DNA
<213> ORGANISM: Artificial Sequence
<220> FEATURE:
<223> OTHER INFORMATION: tmytC-DF

<400> SEQUENCE: 21
gcagcctggg ggagcgacca ggtctggcag atg                          33

<210> SEQ ID NO 22
<211> LENGTH: 30
<212> TYPE: DNA
<213> ORGANISM: Artificial Sequence
<220> FEATURE:
<223> OTHER INFORMATION: tmytC-DR

<400> SEQUENCE: 22
cccaagcttc aggcccttgg atccgacggt                              30

<210> SEQ ID NO 23
<211> LENGTH: 25
<212> TYPE: DNA
<213> ORGANISM: Artificial Sequence
<220> FEATURE:
<223> OTHER INFORMATION: Inner- tmytC-F

<400> SEQUENCE: 23
aggaaaccgg gagtgtctgt aacgc                                   25

<210> SEQ ID NO 24
<211> LENGTH: 20
<212> TYPE: DNA
<213> ORGANISM: Artificial Sequence
<220> FEATURE:
<223> OTHER INFORMATION: Inner- tmytC-R

<400> SEQUENCE: 24
aggggctcgt cgacgtcggt                                         20

<210> SEQ ID NO 25
<211> LENGTH: 32
<212> TYPE: DNA
<213> ORGANISM: Artificial Sequence
<220> FEATURE:
<223> OTHER INFORMATION: hsp60-F

<400> SEQUENCE: 25
ccaagcttac gctcgactcc aatacgggg tt                            32

<210> SEQ ID NO 26
<211> LENGTH: 41
<212> TYPE: DNA
<213> ORGANISM: Artificial Sequence
<220> FEATURE:
<223> OTHER INFORMATION: hsp60-R

<400> SEQUENCE: 26
ggctgctcgc attcgatacc tccttttgcg aagtgattcc t                 41

<210> SEQ ID NO 27
<211> LENGTH: 33
<212> TYPE: DNA
<213> ORGANISM: Artificial Sequence
<220> FEATURE:
<223> OTHER INFORMATION: tmytC-F
```

```
<400> SEQUENCE: 27
ggaggtatcg aatgcgagca gcctggggta agc                                    33

<210> SEQ ID NO 28
<211> LENGTH: 32
<212> TYPE: DNA
<213> ORGANISM: Artificial Sequence
<220> FEATURE:
<223> OTHER INFORMATION: tmytC-R

<400> SEQUENCE: 28
ctagtctaga tcagctgttg aaccagccgg tg                                     32

<210> SEQ ID NO 29
<211> LENGTH: 6074
<212> TYPE: DNA
<213> ORGANISM: Artificial Sequence
<220> FEATURE:
<223> OTHER INFORMATION: p2NIL-GalK

<400> SEQUENCE: 29
agcttcacgt ggtcgacgga tcctatgtat tctatagtgt cacctaaatc gtatgtgtat       60
gatacataag gttatgtatt aattgtagcc gcgttctaac gacaatatgt acaagcctaa      120
ttgtgtagca tctggcttac tgaagcagac cctatcatct ctctcgtaaa ctgccgtcag      180
agtcggtttg gttggacgaa ccttctgagt ttctggtaac gccgtcccgc acccggaaat      240
ggtcagcgaa ccaatcagca gggtcatcgc tagaaatcat ccttagcgaa agctaaggat      300 ttttttttatc tgaattggta ccgcggccgc ttaatagcgg tgaacgacct tgcactcgac      360
actgccgagt gctagaaacg acttagcact cggattacgt gagtgctagg tcgaagaggt      420
gagaccgggc cctgcgcgca acccgcgcag gtgacacgcc gggtcgtccg tcgcgggcat      480
cgaatcgacc tagaagacgt gtccaaagta cgggccgaac cggcccctat ctggaggaat      540
cacttcgcaa aaggaggtat cgaatgacgg tgcgcgcctc cgcccccggc cgggtgaacc      600
tgatcggcga gcacaccgac tacaacgacg gcttcgcgct gccgatggcc ctgcaggtgg      660
gcaccgacgc cgaattcgac gccaccggtg ccggttccgc gatcatcgtg agctccgcgc      720
aggaggagga cgccgtcacc gtgccgctgg acaccatgcc gggcgacgtc acgggctggg      780
ccgcctacgt ggcgggatgc gtgtgggcgt tgcgcgggca cggcgtcgac gtgccggccg      840
ggacactgcg actgcgctcg gacgtgccgg tgggggcggg actctcgtcg tccgcggcgc      900
tcgagtgcgc ggtgctgctg gcgttgaccg cctcgtcggg ggcgctcgac cggatcgagc      960
tcgcccggat cgcgcagcgc gccgagaacg actacgtcgg ggcgccgacg ggcctgctcg     1020
accagatgag cagcctgcac ggcgccgagg acactgcgct gttgctcgac ttccgcacgc     1080
tcgcagtcga tcccgtgccc ctgcggctcg gcgacgacgt gctcctcgcg atcgattcgc     1140
acacgccgca ccagcacgcg gcgggggagt accggcgccg ccgcgaggcc tgcgagcggg     1200
cggccgcgga actcggggtc gattccctgc gtgacgccgc ggacgacgac tggaagcgac     1260
tggcggacgc cgagacgcgg cgtcgggccc ggcacgtgct cactgagaat cggcgtgtgc     1320
tcgacgccgc ggatgcgctg cgcagtgccg atcacgccgc cttcggcgcg ctgatgaacg     1380
actcgcaggc gtcgatgcgc gacgacttcg cgatcaccgt gcccgccatc gacctgatcg     1440
ccgagaccgc cgtcgcgctc ggccgtacgg gcgcgcggat gaccggtggt ggcttcggcg     1500
gcaccgtcat cgccctggcg ccggccgacg cggcccgcag catcgtggag gagctgccgg     1560
cccgggtcgc gggtgccggc cacccccaccc cgacggtgac ctcggtccgg ccagggagag     1620
```

```
gcgcacacgt cattgtggat gtgtgattaa ttaaggtaag aattcccctg taatccgggc   1680
agcgcaacgg aacattcatc agtgtaaaaa tggaatcaat aaagccctgc gcagcgcgca   1740
gggtcagcct gaatacgcgt ttaatgacca gcacagtcgt gatggcaagg tcagaatagc   1800
gctgaggtct gcctcgtgaa gaaggtgttg ctgactcata ccaggatttt gttaaaattc   1860
gcgttaaatt tttgttaaat cagctcattt tttaaccaat aggccgaaat cggcaaaatc   1920
ccttataaat caaagaaata gaccgagata gggttgagtg ttgttccagt ttggaacaag   1980
agtccactat taaagaacgt ggactccaac gtcaaagggc gaaaaaccgt ctatcagggc   2040
gatgccccac tacgtgaacc atcaccctaa tcaagttttt tggggtcgag gtgccgtaaa   2100
gcactaaatc ggaaccctaa agggagcccc cgatttagag cttgacgggg aaagccggcg   2160
aacgtggcga aaaggaagg gaagaaagcg aaaggagcgg gcgctagggc gctggcaagt   2220
gtagcggtca cgctgcgcgt aaccaccaca cccgccgcgc ttaatgcgcc gctacagggc   2280
gcgtactatg gttgctttga cgagcacgta taacgtgctt tcctcgttag aatcagagcg   2340
ggagctaaac aggaggccga ttaaagggat tttagacagg aacggtacgc cagaatcctg   2400
agaagtgttt ttataatcag tgaggccacc gagcaaaaga gtctgtccat cacgcaaatt   2460
aaccgttgtc gcaatacttc tttgattagt aataacatca cttgcctgag tagaagaact   2520
caaactatcg gccttgctgg taatatccag aacaatcctg aatcgcccca tcatccagcc   2580
agaaagtgag ggagccacgg ttgatgagag ctttgttgta ggtggaccag ttggtgattt   2640
tgaacttttg ctttgccacg gaacggtctg cgttgtcggg aagatgcgtg atctgatcct   2700
tcaactcagc aaaagttcga tttattcaac aaagccgccg tcccgtcaag tcagcgtaat   2760
gctctgccag tgttacaacc aattaaccaa ttctgattag aaaaactcat cgagcatcaa   2820
atgaaactgc aatttattca tatcaggatt atcaatacca tattttgaa aaagccgttt   2880 ctgtaatgaa ggagaaaact caccgaggca gttccatagg atggcaagat cctggtatcg   2940
gtctgcgatt ccgactcgtc aacatcaat acaacctatt aatttcccct cgtcaaaaat   3000
aaggttatca agtgagaaat caccatgagt gacgactgaa tccggtgaga atggcaaaaa   3060
cttatgcatt tctttccaga cttgttcaac aggccagcca ttacgctcgt catcaaaatc   3120
actcgcatca accaaaccgt tattcattcg tgattgcgcc tgagcgagac gaaatacgcg   3180
atcgctgtta aaaggacaat tacaaacagg aatcgaatgc aaccggcgca ggaacactgc   3240
cagcgcatca acaatatttt cacctgaatc aggatattct tctaatacct ggaatgctgt   3300
tttccagggg atcgcagtgg tgagtaacca tgcatcatca ggagtacgga taaaatgctt   3360
gatggtcgga agaggcataa attccgtcag ccagtttagt ctgaccatct catctgtaac   3420
atcattggca acgctacctt tgccatgttt cagaaacaac tctggcgcat cgggcttccc   3480
atacaatcga tagattgtcg cacctgattg cccgacatta tcgcgagccc atttataccc   3540
atataaatca gcatccatgt tggaatttaa tcgcggcctc gagcaagacg tttcccgttg   3600
aatatggctc ataacacccc ttgtattact gtttatgtaa gcagacagtt ttattgttca   3660
tgatgatata ttttttatctt gtgcaatgta acatcagaga ttttgagaca caacgtggct   3720
ttgttgaata aatcgaactt tgctgagtt gaaggatcag atcacgcatc ttcccgacaa   3780
cgcagaccgt tccgtggcaa agcaaaagtt caaaatcacc aactggtcca cctacaacaa   3840
agctctcatc aaccgtggct ccctcacttt ctggctggat gatggggcga ttcaggctgc   3900
ctcgcgcgtt tcggtgatga cggtgaaaac ctctgacaca tgcagctccc ggagacggtc   3960
```

-continued

```
acagcttgtc tgtaagcgga tgccgggagc agacaagccc gtcagggcgc gtcagcgggt    4020
gttggcgggt gtcggggcgc agccatgacc cagtcacgta gcgatagcgg agtgtatact    4080
ggcttaacta tgcggcatca gagcagattg tactgagagt gcaccatatg cggtgtgaaa    4140
taccgcacag atgcgtaagg agaaaatacc gcatcaggcg ctcttccgct tcctcgctca    4200
ctgactcgct gcgctcggtc gttcggctgc ggcgagcggt atcagctcac tcaaaggcgg    4260
taatacggtt atccacagaa tcaggggata cgcaggaaa gaacatgtga gcaaaaggcc    4320
agcaaaaggc caggaaccgt aaaaaggccg cgttgctggc gttttttccat aggctccgcc    4380 cccctgacga gcatcacaaa aatcgacgct caagtcagag gtggcgaaac ccgacaggac    4440
tataaagata ccaggcgttt ccccctggaa gctccctcgt gcgctctcct gttccgaccc    4500
tgccgcttac cggatacctg tccgcctttc tcccttcggg aagcgtggcg ctttctcaat    4560
gctcacgctg taggtatctc agttcggtgt aggtcgttcg ctccaagctg ggctgtgtgc    4620
acgaaccccc cgttcagccc gaccgctgcg ccttatccgg taactatcgt cttgagtcca    4680
acccggtaag acacgactta tcgccactgg cagcagccac tggtaacagg attagcagag    4740
cgaggtatgt aggcggtgct acagagttct tgaagtggtg gcctaactac ggctacacta    4800
gaaggacagt atttggtatc tgcgctctgc tgaagccagt taccttcgga aaaagagttg    4860
gtagctcttg atccggcaaa caaaccaccg ctggtagcgg tggttttttt gtttgcaagc    4920
agcagattac gcgcagaaaa aaggatctca agaagatcc tttgatcttt tctacggggt    4980
ctgacgctca gtggaacgaa aactcacgtt aagggatttt ggtcatgaga ttatcaaaaa    5040
ggatcttcac ctagatcctt ttaaattaaa aatgaagttt taaatcaatc taagtatat    5100 atgagtaaac ttggtctgac agttaccaat gcttaatcag tgaggcacct atctcagcga    5160
tctgtctatt tcgttcatcc atagttgcct gactccccgt cgtgtagata actacgatac    5220
gggagggctt accatctggc cccagtgctg caatgatacc gcgagaccca cgctcaccgg    5280
ctccagattt atcagcaata aaccagccag ccggaagggc cgagcgcaga agtggtcctg    5340
caactttatc cgcctccatc cagtctatta attgttgccg ggaagctaga gtaagtagtt    5400
cgccagttaa tagtttgcgc aacgttgttg ccattgctgc aggcatcgtg gtgtcacgct    5460
cgtcgtttgg tatggcttca ttcagctccg gttcccaacg atcaaggcga gttacatgat    5520
cccccatgtt gtgcaaaaaa gcggttagct ccttcggtcc tccgatcgtt gtcagaagta    5580
agttggccgc agtgttatca ctcatggtta tggcagcact gcataattct cttactgtca    5640
tgccatccgt aagatgcttt tctgtgactg gtgagtactc aaccaagtca ttctgagaat    5700
agtgtatgcg gcgaccgagt tgctcttgcc cggcgtcaac acgggataat accgcgccac    5760
atagcagaac tttaaaagtg ctcatcattg gaaaacgttc ttcggggcga aaactctcaa    5820
ggatcttacc gctgttgaga tccagttcga tgtaacccac tcgtgcaccc aactgatctt    5880
cagcatcttt tactttcacc agcgtttctg ggtgacgcag atcccgcaag aggcccggca    5940
gtaccggcat aaccaagcct atgcctacag catccagggt gacggtgccg aggatgacga    6000
tgagcgcatt gttagatttc atacacggtg cctgactgcg ttagcaattt aactgtgata    6060
aactaccgca ttaa                                                     6074
```

<210> SEQ ID NO 30
<211> LENGTH: 228
<212> TYPE: DNA
<213> ORGANISM: Artificial Sequence
<220> FEATURE:
<223> OTHER INFORMATION: hsp60

```
<400> SEQUENCE: 30
agcggtgaac gaccttgcac tcgacactgc cgagtgctag aaacgactta gcactcggat      60
tacgtgagtg ctaggtcgaa gaggtgagac cgggccctgc gcgcaacccg cgcaggtgac     120
acgccgggtc gtccgtcgcg ggcatcgaat cgacctagaa gacgtgtcca agtacgggc     180 cgaaccggcc cctatctgga ggaatcactt cgcaaaagga ggtatcga                  228

<210> SEQ ID NO 31
<211> LENGTH: 1093
<212> TYPE: DNA
<213> ORGANISM: Artificial Sequence
<220> FEATURE:
<223> OTHER INFORMATION: GalK

<400> SEQUENCE: 31
atgacggtgc gcgcctccgc ccccggccgg gtgaacctga tcggcgagca caccgactac      60
aacgacggct cgcgctgccc gatggccctg caggtgggca ccgacgccga attcgacgcc     120
accggtgccg gttccgcgat catcgtgagc tccgcgcagg aggaggacgc cgtcaccgtg     180
ccgctggaca ccatgccggg cgacgtcacg ggctgggccg cctacgtggc gggatgcgtg     240
tgggcgttgc gcgggcacgg cgtcgacgtg ccggccggga cactgcgact gcgctcggac     300
gtgccggtgg gggcgggact ctcgtcgtcc gcggcgctcg agtgcgcggt gctgctggcg     360
ttgaccgcct cgtcggggc gctcgaccgg atcgagctcg cccggatcgc gcagcgcgcc     420
gagaacgact acgtcgggc gccgacgggc ctgctcgacc agatgagcag cctgcacggc     480
gccgaggaca ctgcgctgtt gctcgacttc cgcacgctcg cagtcgatcc cgtgcccctg     540
cggctcggcg acgacgtgct cctcgcgatc gattcgcaca cgccgcacca gcacgcggcg     600
ggggagtacc ggcgccgccg cgaggcctgc gagcgggcgg ccgcggaact cggggtcgat     660
tccctgcgtg acgccgcgga cgacgactgg aagcgactgg cggacgccga gacgcggcgt     720
cgggcccggc acgtgctcac tgagaatcgg cgtgtgctcg acgccgcgga tgcgctgcgc     780
agtgccgatc acgccgcctt cggcgcgctg atgaacgact cgcaggcgtc gatgcgcgac     840
gacttcgcga tcaccgtgcc cgccatcgac ctgatcgccg agaccgccgt cgcgctcggc     900
gcgtacggcg cgcggatgac cggtggtggc ttcggcggca ccgtcatcgc cctggcgccg     960
gccgacgcgc cccgcagcat cgtggaggag ctgccggccc gggtcgcggg tgccggccac    1020
cccaccccga cggtgacctc ggtccggcca gggagaggcg cacacgtcat tgtggatgtg    1080
tgattaatta agg                                                       1093

<210> SEQ ID NO 32
<211> LENGTH: 7838
<212> TYPE: DNA
<213> ORGANISM: Artificial Sequence
<220> FEATURE:
<223> OTHER INFORMATION: ptmytC

<400> SEQUENCE: 32
agcttcgtct gcgcgccacc tgggacgtct cgggctggga gcgcgactcg aacgtggcct      60
tcctctcgca gaagggcatc aacgtcgtga cgcccgtcgg cggcacctcg agctggtaca     120
ccgactggca gtcgccgtcg tcgaccaacc gtcagcccta ccgctacacc tgggcctcgt     180
tcctgaagac gagcctgccg cagtacatcc gcagcgtcgg cttcagcgac aacgtctcgc     240
tggtcggcct gtccgatgtcc ggtagcgccg cgatcatcaa cgccctcgag tcgaacggct     300
```

```
actacaagcg cgccgcgtcg ctctcgggcc tgaccaacat ctcggccccc ggcgtcccga    360
tcgccgtcgg catcgcctcg ctcgattcgg gcggctacaa cgccggcctc gacatgtggg    420
gcggcccgtt cgactcccgc tgggcgaaga acgacccgac cgtgcaggtg aaccgactca    480
agggcatgcc gctgtggatc tccgccggta acggcgtctt cggcaagtac accccgaacc    540
cgggcccggc cgatgtcgtc cagggcgtgc cgctcgagtg gctcgcgctg tcgcaggcgc    600
gctccttcga gggtgccgcc aagcgcgccg gcctgagcaa ggcccacttc gacttcccgc    660
cggccggcac ccacacctgg ggctactggc aggatcaggt gtggcagatg cagcgcaccg    720
gttggttctc gaagtaatcc gctgcggttg tacgaacaga tcacacgaca ggcggcctcg    780
ttcggacgga cggggtcgct tgtcgtattg tgaggtggat gactttcctg aggaaaccgg    840
gagtgtctgt aacgcctgag cctgtgattt cgatgagatc cagggagagt gtcacacatg    900
tgactgatgt gaatcatgtg acatatgtga cgaccgatgt tagagtgacg gctgtgacaa    960
ggctggtcga tcccgaccac cggtcccgtc acaagctat tgcgcggaga cgccgcgtga    1020
caaaggagag gtcagcacac tgcgttcgtg atcgcaagga aggcccccggg ctgttgcccg    1080
gggccttccg gcgtatcggt actctttcag cgaatccgcc cgacagactc gaggttgcag    1140
cccagatgaa ccagcccccc acgaccgacg tcgacgagcc cctcggtttc cggatcgatc    1200
ccgtgctcgc ccgcagttgg ctgctggtca acgccgcgca gcccgagcgc ttcgacgccg    1260
cggcccgctc ccgcgccgac atcgtggtgc tcgacatcga ggacgccgtc gcgcccaagg    1320
acaagacggc tgcgcgcgac aacgtggtcg actggctgaa ccgcgagctc gacggtcggc    1380
ccaacgacgg ctgggtccgg gtcaacggct tcggcaccca gtggtgggcc gacgacctgg    1440
aggcgctgcg cggggcgaag cacctcggcg gcgtgatgct ggcgatggtc gaatcgatgg    1500
accacgtcac ggagaccgcc aagcggctgc cggacacgct catcgtcgcg ctggtcgaga    1560
ccgcgcgcgg cctcgagcgg atcagcgaga tcgcctccgc gaagggcacc ttccgcctgg    1620
ccttcggcat cggcgacttc cgccgcgaca ccggcttcgg cggcgacccg acgacgctgg    1680
cctacgcccg ctcgcggttc accatcgccg cgaaggcggc ccacctgccg ggcgcgatcg    1740
acgggccgac cgtcggatcc aagggcctgc acgtggtcga cggatcctat gtattctata    1800
gtgtcaccta aatcgtatgt gtatgataca taaggttatg tattaattgt agccgcgttc    1860
taacgacaat atgtacaagc ctaattgtgt agcatctggc ttactgaagc agaccctatc    1920
atctctctcg taaactgccg tcagagtcgg tttggttgga cgaaccttct gagtttctgg    1980
taacgccgtc ccgcacccgg aaatggtcag cgaaccaatc agcagggtca tcgctagaaa    2040
tcatccttag cgaaagctaa ggattttttt tatctgaatt ggtaccgcgg ccgcttaata    2100
gcggtgaacg accttgcact cgacactgcc gagtgctaga aacgacttag cactcggatt    2160
acgtgagtgc taggtcgaag aggtgagacc gggccctgcg cgcaacccgc gcaggtgaca    2220
cgccgggtcg tccgtcgcgg gcatcgaatc gacctagaag acgtgtccaa agtacgggcc    2280
gaaccggccc ctatctggag gaatcacttc gcaaaaggag gtatcgaatg acggtgcgcg    2340
cctccgcccc cggccgggtg aacctgatcg gcgagcacac cgactacaac gacggcttcg    2400
cgctgccgat ggccctgcag gtgggcaccg acgccgaatt cgacgccacc ggtgccggtt    2460
ccgcgatcat cgtgagctcc gcgcaggagg aggacgccgt caccgtgccg ctggacacca    2520
tgccggggcga cgtcacgggc tgggccgcct acgtggcggg atgcgtgtgg gcgttgcgcg    2580
ggcacggcgt cgacgtgccg gccggacaca tgcgactgcg ctcggacgtg ccggtggggg    2640
cgggactctc gtcgtccgcg gcgctcgagt gcgcggtgct gctggcgttg accgcctcgt    2700
```

```
cgggggcgct cgaccggatc gagctcgccc ggatcgcgca gcgcgccgag aacgactacg    2760
tcggggcgcc gacgggcctg ctcgaccaga tgagcagcct gcacggcgcc gaggacactg    2820
cgctgttgct cgacttccgc acgctcgcag tcgatcccgt gccctgcgg ctcggcgacg     2880 acgtgctcct cgcgatcgat tcgcacacgc cgcaccagca cgcggcgggg gagtaccggc    2940
gccgccgcga ggcctgcgag cgggcggccg cggaactcgg ggtcgattcc ctgcgtgacg    3000
ccgcggacga cgactggaag cgactggcgg acgccgagac gcggcgtcgg gcccggcacg    3060
tgctcactga gaatcggcgt gtgctcgacg ccgcggatgc gctgcgcagt gccgatcacg    3120
ccgccttcgg cgcgctgatg aacgactcgc aggcgtcgat gcgcgacgac ttcgcgatca    3180
ccgtgcccgc catcgacctg atcgccgaga ccgccgtcgc gctcggcgcg tacggcgcgc    3240
ggatgaccgg tggtggcttc ggcggcaccg tcatcgccct ggcgccggcc gacgcggccc    3300
gcagcatcgt ggaggagctg ccggcccggg tcgcgggtgc cggccacccc accccgacgg    3360
tgacctcggt ccggccaggg agaggcgcac acgtcattgt ggatgtgtga ttaattaagg    3420
taagaattcc cctgtaatcc gggcagcgca acggaacatt catcagtgta aaaatggaat    3480
caataaagcc ctgcgcagcg cgcagggtca gcctgaatac gcgtttaatg accagcacag    3540
tcgtgatggc aaggtcagaa tagcgctgag gtctgcctcg tgaagaaggt gttgctgact    3600
cataccagga ttttgttaaa attgcgtta aattttgtt aaatcagctc attttttaac      3660
caataggccg aaatcggcaa aatcccttat aaatcaaaag aatagaccga gatagggttg    3720
agtgttgttc cagtttggaa caagagtcca ctattaaaga acgtggactc caacgtcaaa    3780
gggcgaaaaa ccgtctatca gggcgatggc ccactacgtg aaccatcacc ctaatcaagt    3840 tttttgggt cgaggtgccg taaagcacta atcggaacc ctaaagggag cccccgattt       3900
agagcttgac ggggaaagcc ggcgaacgtg gcgagaaagg aagggaagaa agcgaaagga    3960
gcgggcgcta gggcgctggc aagtgtagcg gtcacgctgc gcgtaaccac cacacccgcc    4020
gcgcttaatg cgccgctaca gggcgcgtac tatggttgct ttgacgagca cgtataacgt    4080
gctttcctcg ttagaatcag agcgggagct aaacaggagg ccgattaaag ggattttaga    4140
caggaacggt acgccagaat cctgagaagt gtttttataa tcagtgaggc caccgagcaa    4200
aagagtctgt ccatcacgca aattaaccgt tgtcgcaata cttctttgat tagtaataac    4260
atcacttgcc tgagtagaag aactcaaact atcggccttg ctggtaatat ccagaacaat    4320
cctgaatcgc cccatcatcc agccagaaag tgagggagcc acggttgatg agagctttgt    4380
tgtaggtgga ccagttggtg attttgaact tttgctttgc cacggaacgg tctgcgttgt    4440
cgggaagatg cgtgatctga tccttcaact cagcaaaagt tcgatttatt caacaaagcc    4500
gccgtcccgt caagtcagcg taatgctctg ccagtgttac aaccaattaa ccaattctga    4560
ttagaaaaac tcatcgagca tcaaatgaaa ctgcaattta ttcatatcag gattatcaat    4620
accatatttt tgaaaagcc gtttctgtaa tgaaggagaa aactcaccga ggcagttcca    4680
taggatggca agatcctggt atcggtctgc gattccgact cgtccaacat caatacaacc    4740
tattaatttc ccctcgtcaa aaataaggtt atcaagtgag aaatcaccat gagtgacgac    4800
tgaatccggt gagaatggca aaaacttatg catttctttc cagacttgtt caacaggcca    4860
gccattacgc tcgtcatcaa aatcactcgc atcaaccaaa ccgttattca ttcgtgattg    4920
cgcctgagcg agacgaaata cgcgatcgct gttaaaagga caattacaaa caggaatcga    4980
atgcaaccgg cgcaggaaca ctgccagcgc atcaacaata ttttcacctg aatcaggata    5040
```

```
ttcttctaat acctggaatg ctgttttcca ggggatcgca gtggtgagta accatgcatc    5100
atcaggagta cggataaaat gcttgatggt cggaagaggc ataaattccg tcagccagtt    5160
tagtctgacc atctcatctg taacatcatt ggcaacgcta cctttgccat gtttcagaaa    5220
caactctggc gcatcgggct tcccatacaa tcgatagatt gtcgcacctg attgcccgac    5280
attatcgcga gcccatttat acccatataa atcagcatcc atgttggaat taatcgcgg     5340
cctcgagcaa gacgtttccc gttgaatatg gctcataaca ccccttgtat tactgtttat    5400
gtaagcagac agttttattg ttcatgatga tatatttta tcttgtgcaa tgtaacatca     5460
gagattttga gacacaacgt ggctttgttg aataaatcga acttttgctg agttgaagga    5520
tcagatcacg catcttcccg acaacgcaga ccgttccgtg gcaaagcaaa agttcaaaat    5580
caccaactgg tccacctaca acaaagctct catcaaccgt ggctccctca ctttctggct    5640
ggatgatggg gcgattcagg ctgcctcgcg cgtttcggtg atgacggtga aaacctctga    5700
cacatgcagc tcccggagac ggtcacagct tgtctgtaag cggatgccgg gagcagacaa    5760
gcccgtcagg gcgcgtcagc gggtgttggc gggtgtcggg gcgcagccat gacccagtca    5820
cgtagcgata gcggagtgta tactggctta actatgcggc atcagagcag attgtactga    5880
gagtgcacca tatgcggtgt gaaataccgc acagatgcgt aaggagaaaa taccgcatca    5940
ggcgctcttc cgcttcctcg ctcactgact cgctgcgctc ggtcgttcgg ctgcggcgag    6000
cggtatcagc tcactcaaag gcggtaatac ggttatccac agaatcaggg gataacgcag    6060
gaaagaacat gtgagcaaaa ggccagcaaa aggccaggaa ccgtaaaaag gccgcgttgc    6120
tggcgttttt ccataggctc cgcccccctg acgagcatca caaaaatcga cgctcaagtc    6180
agaggtggcg aaacccgaca ggactataaa gataccaggc gtttccccct ggaagctccc    6240
tcgtgcgctc tcctgttccg accctgccgc ttaccggata cctgtccgcc tttctccctt    6300
cgggaagcgt ggcgctttct caatgctcac gctgtaggta tctcagttcg gtgtaggtcg    6360
ttcgctccaa gctgggctgt gtgcacgaac ccccgttca gcccgaccgc tgcgccttat      6420
ccggtaacta tcgtcttgag tccaacccgg taagacacga cttatcgcca ctggcagcag    6480
ccactggtaa caggattagc agagcgaggt atgtaggcgg tgctacagag ttcttgaagt    6540
ggtggcctaa ctacggctac actagaagga cagtatttgg tatctgcgct ctgctgaagc    6600
cagttacctt cggaaaaaga gttggtagct cttgatccgg caaacaaacc accgctggta    6660
gcggtggttt ttttgtttgc aagcagcaga ttacgcgcag aaaaaaagga tctcaagaag    6720
atcctttgat cttttctacg gggtctgacg ctcagtggaa cgaaaactca cgttaaggga    6780
ttttggtcat gagattatca aaaaggatct tcacctagat ccttttaaat taaaaatgaa    6840
gttttaaatc aatctaaagt atatatgagt aaacttggtc tgacagttac caatgcttaa    6900
tcagtgaggc acctatctca gcgatctgtc tatttcgttc atccatagtt gcctgactcc    6960
ccgtcgtgta gataactacg atacgggagg gcttaccatc tggccccagt gctgcaatga    7020
taccgcgaga cccacgctca ccggctccag atttatcagc aataaaccag ccagccggaa    7080
gggccgagcg cagaagtggt cctgcaactt tatccgcctc catccagtct attaattgtt    7140
gccgggaagc tagagtaagt agttcgccag ttaatagttt cgcaacgtt gttgccattg     7200
ctgcaggcat cgtggtgtca cgctcgtcgt ttggtatggc ttcattcagc tccggttccc    7260
aacgatcaag gcgagttaca tgatccccca tgttgtgcaa aaaagcggtt agctccttcg    7320
gtcctccgat cgttgtcaga agtaagttgg ccgcagtgtt atcactcatg gttatggcag    7380
cactgcataa ttctcttact gtcatgccat ccgtaagatg cttttctgtg actggtgagt    7440
```

```
actcaaccaa gtcattctga gaatagtgta tgcggcgacc gagttgctct tgcccggcgt    7500
caacacggga taataccgcg ccacatagca gaactttaaa agtgctcatc attggaaaac    7560
gttcttcggg gcgaaaactc tcaaggatct taccgctgtt gagatccagt tcgatgtaac    7620
ccactcgtgc acccaactga tcttcagcat cttttacttt caccagcgtt tctgggtgac    7680
gcagatcccg caagaggccc ggcagtaccg gcataaccaa gcctatgcct acagcatcca    7740
gggtgacggt gccgaggatg acgatgagcg cattgttaga tttcatacac ggtgcctgac    7800
tgcgttagca atttaactgt gataaactac cgcattaa                            7838
```

<210> SEQ ID NO 33
<211> LENGTH: 1031
<212> TYPE: DNA
<213> ORGANISM: Artificial Sequence
<220> FEATURE:
<223> OTHER INFORMATION: tmytC upstream

<400> SEQUENCE: 33

```
gtctgcgcgc cacctgggac gtctcgggct gggagcgcga ctcgaacgtg gccttcctct     60
cgcagaaggg catcaacgtc gtgacgcccg tcggcggcac ctcgagctgg tacaccgact    120
ggcagtcgcc gtcgtcgacc aaccgtcagc cctaccgcta cacctgggcc tcgttcctga    180
agacgagcct gccgcagtac atccgcagcc tcggcttcag cgacaacgtc tcgctggtcg    240
gcctgtcgat gtccggtagc gccgcgatca tcaacgccct cgagtcgaac ggctactaca    300
agcgcgccgc gtcgctctcg ggcctgacca acatctcggc cccggcgtc ccgatcgccg     360 tcggcatcgc ctcgctcgat tcgggcggct acaacgccgg cctcgacatg tggggcggcc    420
cgttcgactc ccgctgggcg aagaacgacc cgaccgtgca ggtgaaccga ctcaagggca    480
tgccgctgtg gatctccgcc ggtaacggcg tcttcggcaa gtacaccccg aacccgggcc    540
cggccgatgt cgtccagggc gtgccgctcg agtggctcgc gctgtcgcag gcgcgctcct    600
tcgagggtgc cgccaagcgc gccggcctga gcaaggccca cttcgacttc cgccggccg     660 gcacccacac ctggggctac tggcaggatc aggtgtggca gatgcagcgc accggttggt    720
tctcgaagta atccgctgcg gttgtacgaa cagatcacac gacaggcggc ctcgttcgga    780
cggacggggt cgcttgtcgt attgtgaggt ggatgacttt cctgaggaaa ccggagtgt     840 ctgtaacgcc tgagcctgtg atttcgatga gatccaggga gagtgtcaca catgtgactg    900
atgtgaatca tgtgacatat gtgacgaccg atgttagagt gacggctgtg acaaggctgg    960
tcgatcccga ccaccggtcc cgtccacaag ctattgcgcg gagacgccgc gtgacaaagg   1020
agaggtcagc a                                                        1031
```

<210> SEQ ID NO 34
<211> LENGTH: 1200
<212> TYPE: DNA
<213> ORGANISM: Artificial Sequence
<220> FEATURE:
<223> OTHER INFORMATION: tmytC upstream

<400> SEQUENCE: 34

```
gccggcacgg gcgccgcgaa cgcgtggggc ccgggcaacg ccaagaaccc cccgaagggc     60
ttcaagcagg ccttcgtcaa cggtgccggc atgccgaacg tgaaggtccg tagctgggcc    120
tccaccacca ccgatcccaa gaaggccccc accgtcgtgc tgctcgacgg tctgcgcgcc    180
acctgggacg tctcgggctg ggagcgcgac tcgaacgtgg ccttcctctc gcagaagggc    240
```

```
atcaacgtcg tgacgcccgt cggcggcacc tcgagctggt acaccgactg gcagtcgccg    300
tcgtcgacca accgtcagcc ctaccgctac acctgggcct cgttcctgaa gacgagcctg    360
ccgcagtaca tccgcagcct cggcttcagc gacaacgtct cgctggtcgg cctgtcgatg    420
tccggtagcg ccgcgatcat caacgccctc gagtcgaacg gctactacaa gcgcgccgcg    480
tcgctctcgg gcctgaccaa catctcggcc cccggcgtcc cgatcgccgt cggcatcgcc    540
tcgctcgatt cgggcggcta caacgccggc ctcgacatgt ggggcggccc gttcgactcc    600
cgctgggcga agaacgaccc gaccgtgcag gtgaaccgac tcaagggcat gccgctgtgg    660
atctccgccg gtaacggcgt cttcggcaag tacaccccga acccgggccc ggccgatgtc    720
gtccagggcg tgccgctcga gtggctcgcg ctgtcgcagg cgcgctcctt cgagggtgcc    780
gccaagcgcg ccggcctgag caaggcccac ttcgacttcc cgccggccgg cacccacacc    840
tggggctact ggcaggatca ggtgtggcag atgcagcgca ccggttggtt ctcgaagtaa    900
tccgctgcgg ttgtacgaac agatcacacg acaggcggcc tcgttcggac ggacggggtc    960
gcttgtcgta ttgtgaggtg gatgactttc ctgaggaaac cgggagtgtc tgtaacgcct   1020
gagcctgtga tttcgatgag atccagggag agtgtcacac atgtgactga tgtgaatcat   1080
gtgacatatg tgacgaccga tgttagagtg acggctgtga caaggctggt cgatcccgac   1140
caccggtccc gtccacaagc tattgcgcgg agacgccgcg tgacaaagga gaggtcagca   1200
```

<210> SEQ ID NO 35
<211> LENGTH: 733
<212> TYPE: DNA
<213> ORGANISM: Artificial Sequence
<220> FEATURE:
<223> OTHER INFORMATION: tmytC downstream

<400> SEQUENCE: 35

```
cactgcgttc gtgatcgcaa ggaaggcccc gggctgttgc ccggggcctt ccggcgtatc     60
ggtactcttt cagcgaatcc gcccgacaga ctcgaggttg cagcccagat gaaccagccc    120
cccacgaccg acgtcgacga gccctcggt ttccggatcg atcccgtgct cgcccgcagt    180
tggctgctgg tcaacgccgc gcagcccgag cgcttcgacg ccgcggcccg ctcccgcgcc    240
gacatcgtgg tgctcgacat cgaggacgcc gtcgcgccca aggacaagac ggctgcgcgc    300
gacaacgtgg tcgactggct gaaccgcgag ctcgacggtc ggcccaacga cggctgggtc    360
cgggtcaacg gcttcggcac ccagtggtgg gccgacgacc tggaggcgct gcgcggggcg    420
aagcacctcg gcgcgtgat gctggcgatg gtcgaatcga tggaccacgt cacgagacc    480 gccaagcggc tgccggacac gctcatcgtc gcgctggtcg agaccgcgcg cggcctcgag    540
cggatcagcg agatcgcctc cgcgaagggc accttccgcc tggccttcgg catcggcgac    600
ttccgccgcg acaccggctt cggcggcgac ccgacgacgc tggcctacgc ccgctcgcgg    660
ttcaccatcg ccgcgaaggc ggcccacctg ccgggcgcga tcgacgggcc gaccgtcgga    720
tccaagggcc tgc                                                       733
```

<210> SEQ ID NO 36
<211> LENGTH: 1200
<212> TYPE: DNA
<213> ORGANISM: Artificial Sequence
<220> FEATURE:
<223> OTHER INFORMATION: tmytC downstream

<400> SEQUENCE: 36

```
cactgcgttc gtgatcgcaa ggaaggcccc gggctgttgc ccggggcctt ccggcgtatc     60
```

```
ggtactcttt cagcgaatcc gcccgacaga ctcgaggttg cagcccagat gaaccagccc    120
cccacgaccg acgtcgacga gcccctcggt ttccggatcg atcccgtgct cgcccgcagt    180
tggctgctgg tcaacgccgc gcagcccgag cgcttcgacg ccgcggcccg ctcccgcgcc    240
gacatcgtgg tgctcgacat cgaggacgcc gtcgcgccca aggacaagac ggctgcgcgc    300
gacaacgtgg tcgactggct gaaccgcgag ctcgacggtc ggcccaacga cggctgggtc    360
cgggtcaacg gcttcggcac ccagtggtgg gccgacgacc tggaggcgct gcgcggggcg    420
aagcacctcg gcggcgtgat gctggcgatg gtcgaatcga tggaccacgt cacggagacc    480
gccaagcggc tgccggacac gctcatcgtc gcgctggtcg agaccgcgcg cggcctcgag    540
cggatcagcg agatcgcctc cgcgaagggc accttccgcc tggccttcgg catcggcgac    600
ttccgccgcg acaccggctt cggcggcgac ccgacgacgc tggcctacgc ccgctcgcgg    660
ttcaccatcg ccgcgaaggc ggcccacctg ccgggcgcga tcgacgggcc gaccgtcgga    720
tccaagggcc tgctgctgac cgaggccacc gcggtctcct ccgagttcgg catgaccggc    780
aagatctgcc tcacgcccga tcagtgccac ccggtcaacg agggcctgag cccgtcgccc    840
gaggacatcc gctggtcgcg cgagttcttc gccgacttcg accgcgacgg cggcgagatc    900
cgcaacggct cggacctgcc gcgcatcgca cgcgccacca agatcctcga cctggcccgg    960
gcgtacggga tcgtcgtgcc cgacgggctc gagggcgagc acgccccggc accgtcggac   1020
acgttccact actgacccga gcacgacgaa gcccccgcac cgcagccggt gacgggggct   1080
tcgtcgtgcg gggatcaggc ctggcgcagg gcctcgatgt cgagggtgag ggtgatcttg   1140
tcgccgatca ccttgccgcc ggtctcgagc ggcatgtcga tggagatgcc gaagtcctgg   1200
```

TREATMENT OF AN OCULAR INFECTION, COMPOSITION AND METHODS THEREOF

CROSS-REFERENCE TO RELATED PATENT APPLICATIONS

This application claims priority to U.S. Provisional Application No. 62/943,414 filed Dec. 4, 2019, which is incorporated by reference in its entirety.

1. FIELD

The present disclosure relates to a pharmaceutical composition and method of prevention and treatment of ocular infection.

SEQUENCE LISTING

The instant application contains a Sequence Listing which has been submitted electronically in ASCII format and is hereby incorporated by reference in its entirety. Said ASCII copy, created on Nov. 10, 2022, is named UPDATED SEQUENCE LISTING—AS FILED—10030_008239-US1_ST25.txt and is 30,571 bytes in size.

2. BACKGROUND

Keratitis, inflammation of the cornea, is caused by both infectious and non-infectious agents. Infective keratitis, an ophthalmologic emergency that requires prompt diagnosis and expedient treatment so as to prevent visual loss, can be caused by bacteria, viruses, fungi, or parasites. Among the infectious agents, bacterial pathogens are responsible for the majority of microbial keratitis. Bacterial keratitis is often associated with wearing contact lenses or other microtrauma, such as trichiasis, to the epithelial surface of the cornea. Among the cases of bacterial keratitis of which an etiology can be identified, most are caused by *Staphylococcus aureus* and *Streptococcus pneumoniae*.

*Tsukamurella* are Gram-positive, aerobic and partially acid-fast bacteria. Traditionally, the most commonly reported *Tsukamurella* infections in human are indwelling device-related infections, such as catheter-related bacteremia and peritonitis associated with continuous ambulatory peritoneal dialysis[1-4].

The optimal treatment and pathogenesis of *Tsukamurella* keratitis is largely unknown. Common contact lens disinfecting solutions were ineffective against *Tsukamurella*. There is a need to develop a disinfection and treatment strategy against *Tsukamurella*.

3. SUMMARY

Provided herein are compositions for the treating or preventing an ocular infection, for example, bacterial conjunctivitis caused by an antibiotic-resistant bacterium. A further feature of the present disclosure is to provide a composition that can provide an easy and non-toxic way to treat an ocular infection and/or the source of the ocular infection. In one embodiment, the infection is bacterial conjunctivitis. In one embodiment, the infection is bacterial keratitis. Provided herein is a method to reduce virulence of *Tsukamurella* comprising a step of decreasing the expression of tmytC gene wherein the reduction of the virulence is characterized by at least one of: (i) reduced biofilm formation; (ii) reduced adherence property; (iii) reduced polymorphonuclear leukocyte ("PMN") infiltration; (iv) reduced epithelial damage; and (v) reduced corneal bacterial loads. In one embodiment, the expression of tmytC gene is decreased by knock-out of the tmytC gene.

In one embodiment, the expression of tmytC gene is decreased by introducing a homologous recombination construct comprising: (i) a vector comprising a promoter expressing a marker; (ii) a 5' flanking region of the tmytC gene; (iii) and a 3' flanking region of the tmytC gene.

Provided herein is a homologous recombination construct comprising: (i) a vector comprising a promoter expressing a marker; (ii) a 5' flanking region of the tmytC gene; (iii) and a 3' flanking region of the tmytC gene.

Provided herein is a host cell comprising the homologous recombination construct comprising: (i) a vector comprising a promoter expressing a marker; (ii) a 5' flanking region of the tmytC gene; (iii) and a 3' flanking region of the tmytC gene.

Provided herein is a modified *Tsukamurella* that has a reduced expression of tmytC. In one embodiment, the modified *Tsukamurella* does not express tmytC.

Provided herein is a method of treating an ocular bacterial infection in a subject, said method comprises a step of administering to the subject a homologous recombination construct comprising: (i) a vector comprising a promoter expressing a marker; (ii) a 5' flanking region of the tmytC gene; and (iii) a 3' flanking region of the tmytC gene.

Provided herein is a method of treating or preventing ocular bacterial infection in a subject comprising a step of administering to the subject a composition comprising one or more *Tsukamurella* tmytC inhibitors.

In one embodiment, the ocular bacterial infection is treated or prevented as characterized by at least one of: (i) reduced biofilm formation; (ii) reduced adherence property of the bacteria; (iii) reduced PMN infiltration; (iii) reduced epithelial damage; and (iv) reduced corneal bacterial loads.

Provided herein is a method of preventing and treating ocular infection comprising a step of treating contact lens prior to wearing the contact lens by a subject with a composition comprising one or more tmytC inhibitors.

Also provided is an eye drop dispensing bottle comprising a composition for use in the treatment of prophylaxis of an ocular infection.

4. BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1D:
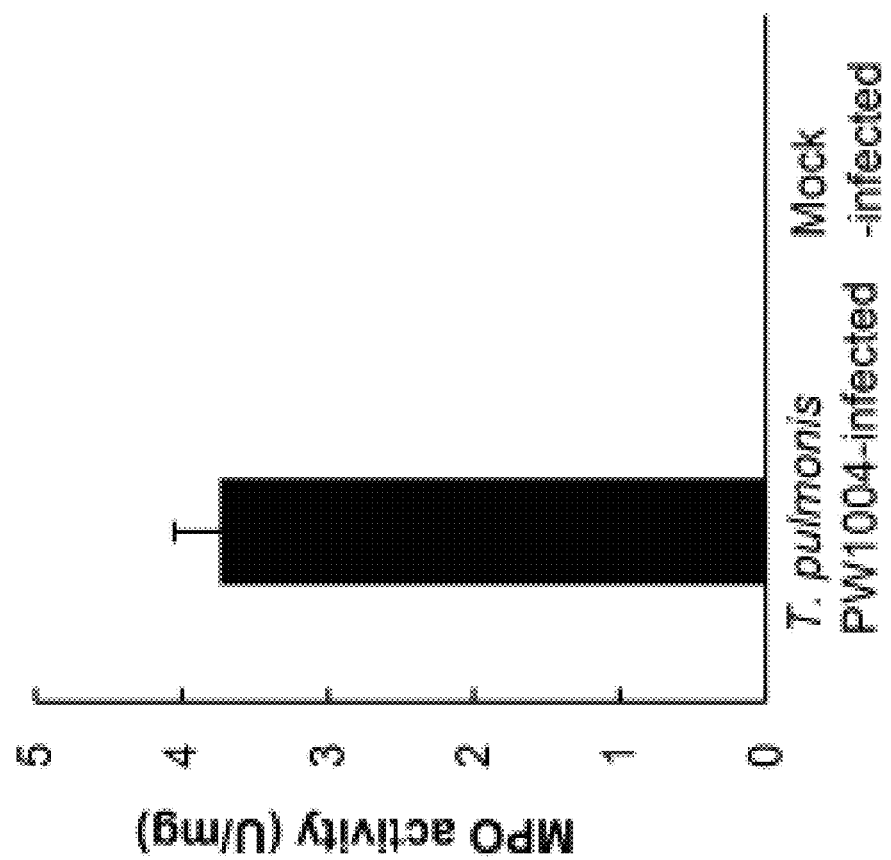

FIGS. 1A-D Experimentally induced keratitis in NZW rabbits after intrastromal injection of *T. pulmonis*-PW1004. FIG. 1A: Gross appearance of the rabbit eyes after *Tsukamurella* infection. FIG. 1B: Mean bacterial load recovered from the cornea of rabbits infected with *T. pulmonis*-PW1004 and those of control rabbits at 24 h PI. Error bars indicated mean CFU/cornea±SEM of 3 independent experiments. FIG. 1C: Immunohistochemical staining of corneal sections using mouse anti-*T. pulmonis*-PW1004 serum. The boxed area is further enlarged and shown in the right-hand panel of the corresponding image. Strong positive staining in brown color against *T. pulmonis* could be detected in corneal sections from rabbits infected with *T. pulmonis*-PW1004 (top) but not from the mock-infected control rabbits (bottom). The middle panel shows corneal sections from the infected rabbits stained with pre-immune control serum; corneal sections of infected rabbits showing large amount of inflammatory cell infiltration with hematoxylin counterstain (top and middle). FIG. 1D: MPO activity (U/mg) of the corneal tissues harvested from rabbits. Error bars indicate mean±SEM of 3 independent experiments.

Figure 2A:
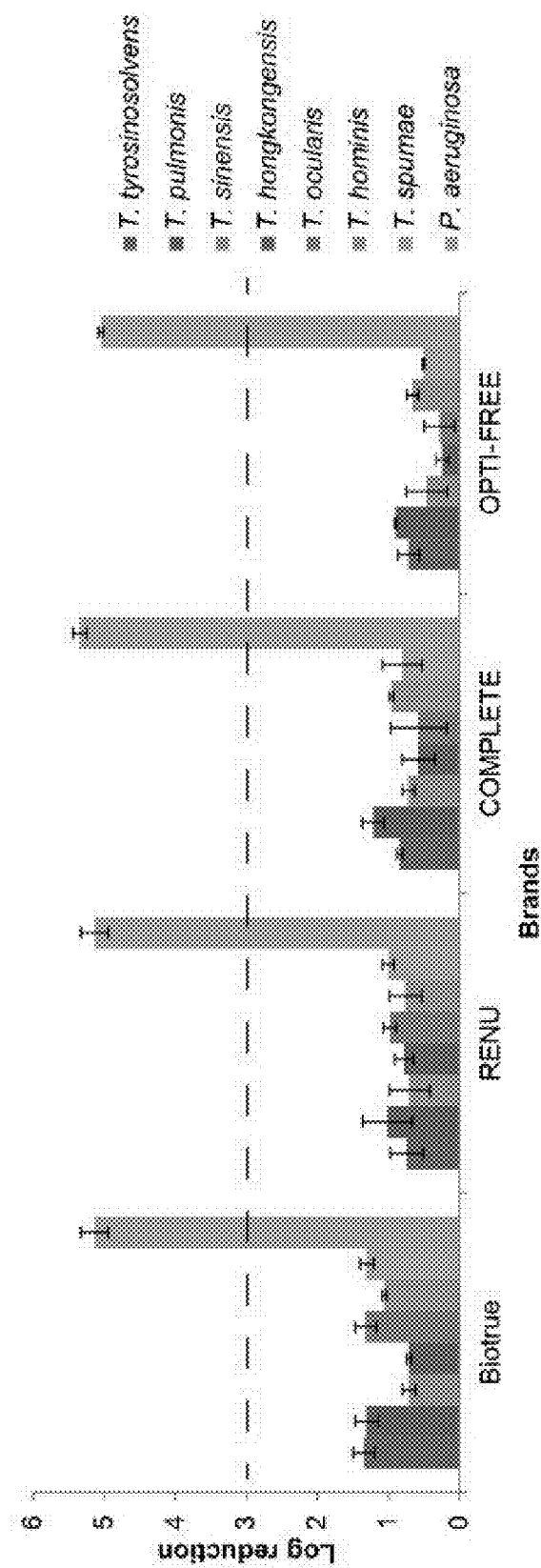
Figure 2B:
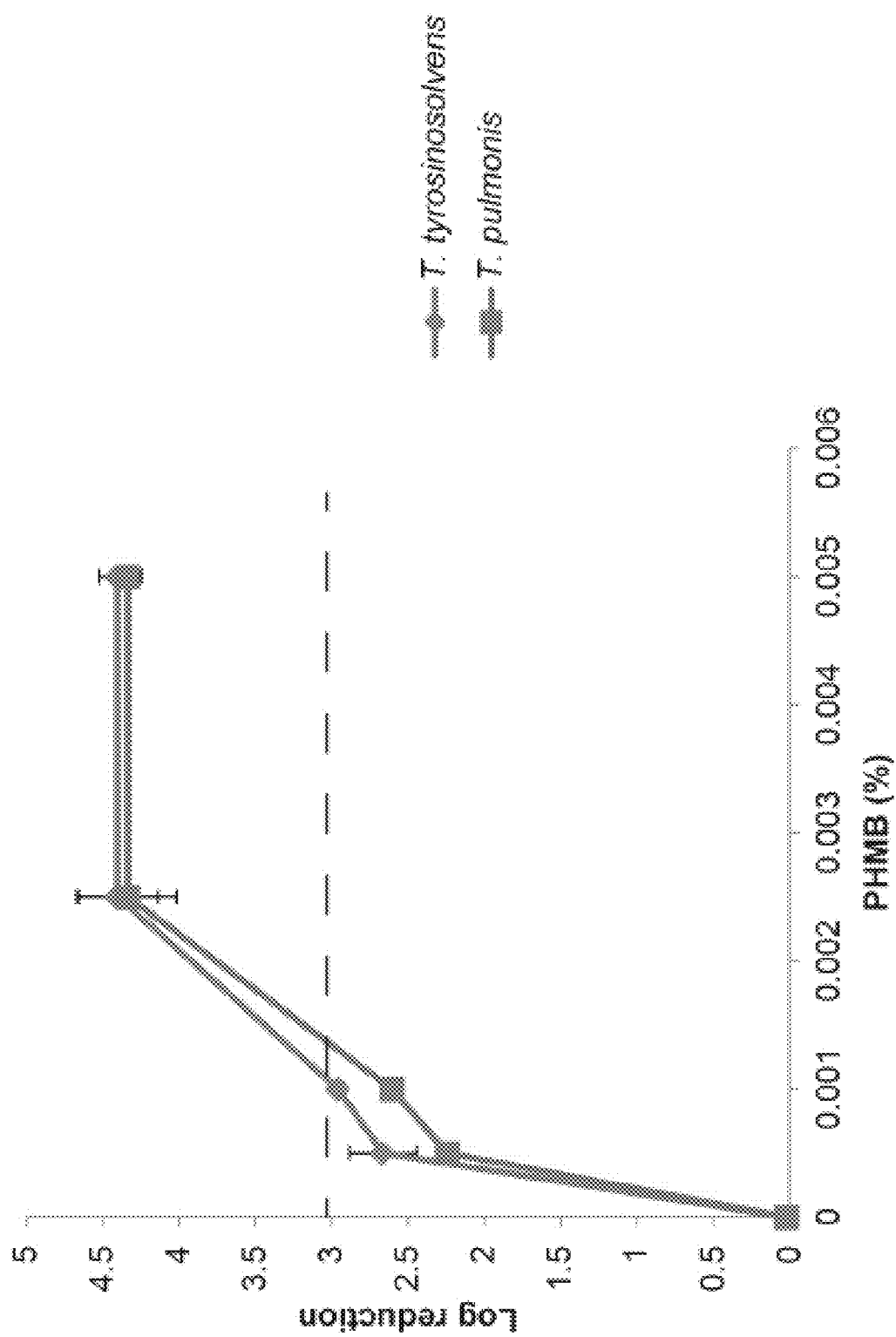
Figure 2C:
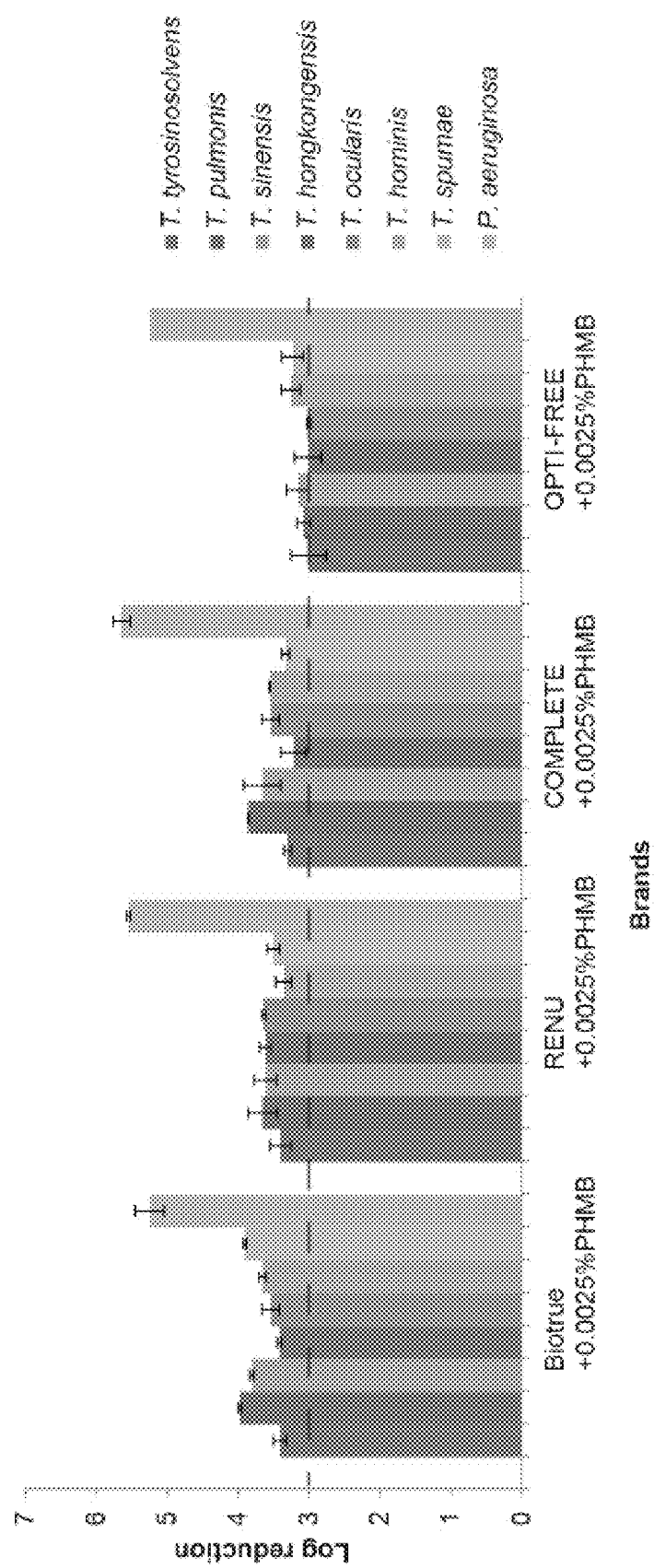

FIGS. 2A-C Antimicrobial efficacies of commercially available contact lens solutions against *Tsukamurella*. FIG. 2A: Mean log reduction of 7 different *Tsukamurella* species and control strain *P. aeruginosa* after the minimum disinfecting time recommended by the corresponding manufacturer according to the test procedures described in the ISO14729 guideline. FIG. 2B: Antimicrobial efficacies of various concentrations of PHMB (0, 0.0005, 0.001, 0.0025, and 0.005%) against *T. tyrosinosolvens* and *T. pulmonis*. FIG. 2C: Comparison of antimicrobial efficacies of the contact lens solutions of original and modified compositions with addition of PHMB to a final concentration of 0.0025% against 7 different *Tsukamurella* species and control strain *P. aeruginosa*, respectively; The horizontal dashed line indicates 3-log reduction of bacteria, suggesting the antimicrobial efficacy of the contact lens solution is considered satisfactory according to the ISO14729 guideline. Error bars indicate means±SEM of 3 independent experiments.

Figure 3A:
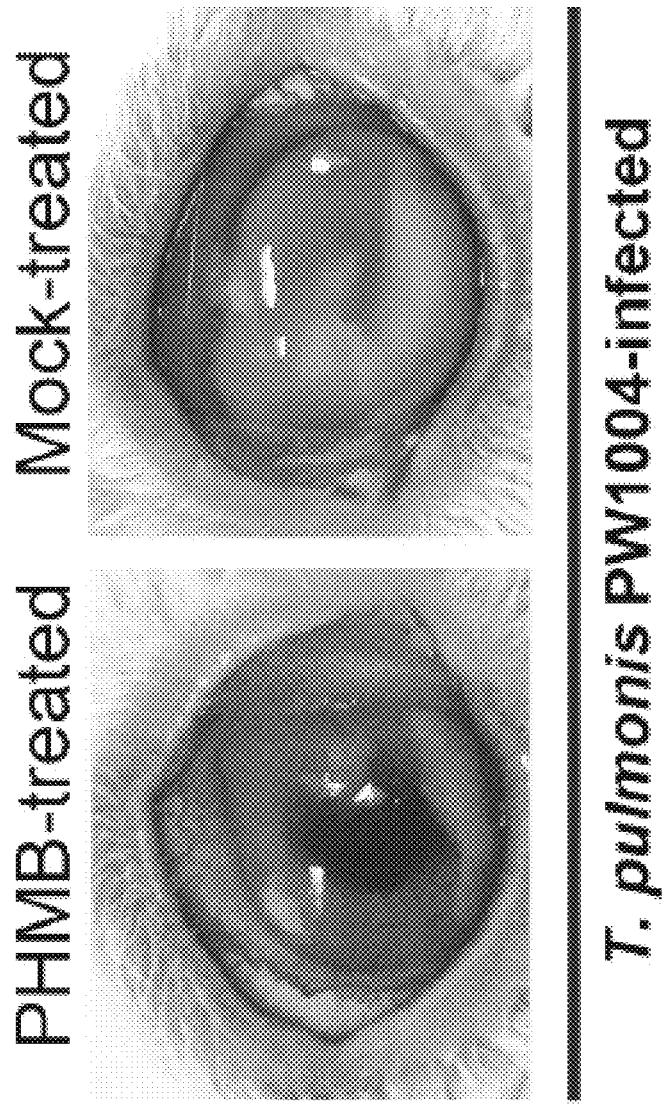
Figure 3B:
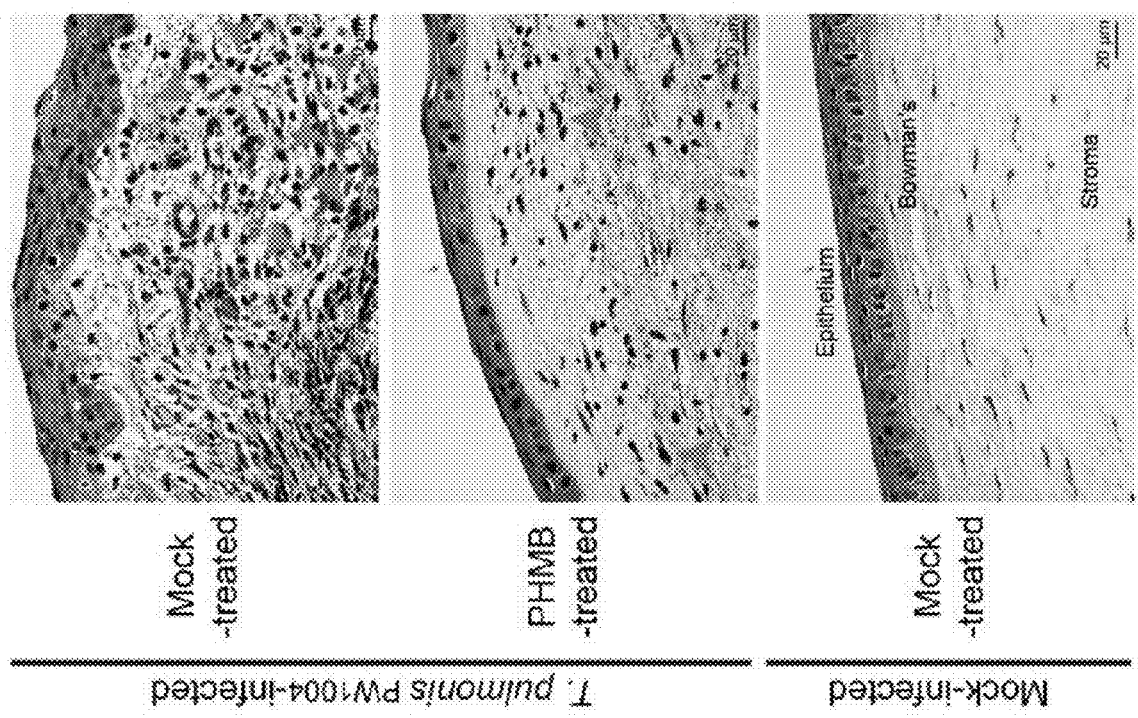
Figure 3C:
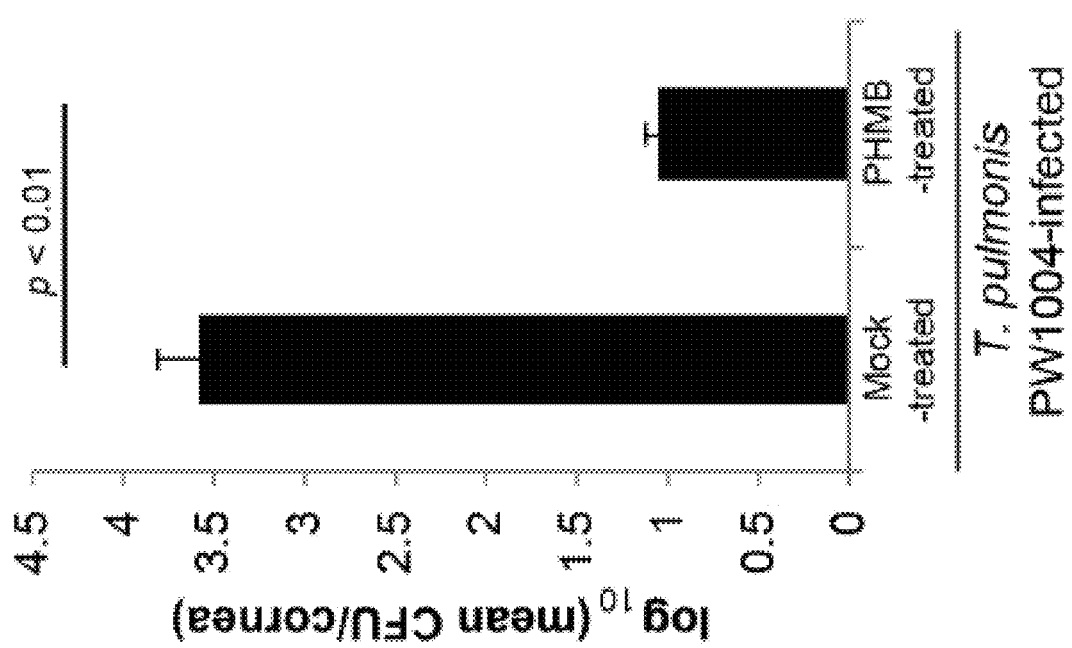

FIGS. 3A-C Treatment efficacy of PHMB in experimentally induced *Tsukamurella* keratitis in rabbits. FIG. 3A: Representative photos showing the gross appearance of the rabbit eyes inoculated with *T. pulmonis*-PW1004 for 1 day followed by the treatment with 0.02% of PHMB (left) and sterile saline (right) for 3 days, respectively. Rabbit eyes treated with PHMB showed a lower degree of corneal neovascularization and opacity compared with the control rabbits treated with sterile saline. FIG. 3B: Histological changes of corneal tissues harvested from rabbits treated with sterile saline (top) and PHMB (middle). PMN (shown in blue arrows) infiltration was less pronounced in the PHMB-treated group compared to the mock (saline)-treated group, where the former showed a lower number of neutrophils and capillary formation in the corneal stroma and the corneal epithelium. Corneal sections from rabbits (i.e., mock-infected and mock-treated) included for comparison (bottom). FIG. 3C: Mean bacterial load recovered from the cornea of *T. pulmonis*-PW1004-infected rabbits treated with sterile saline and PHMB, respectively. Error bars indicate mean CFU/cornea±SEM of 3 independent experiments.

Figure 4:
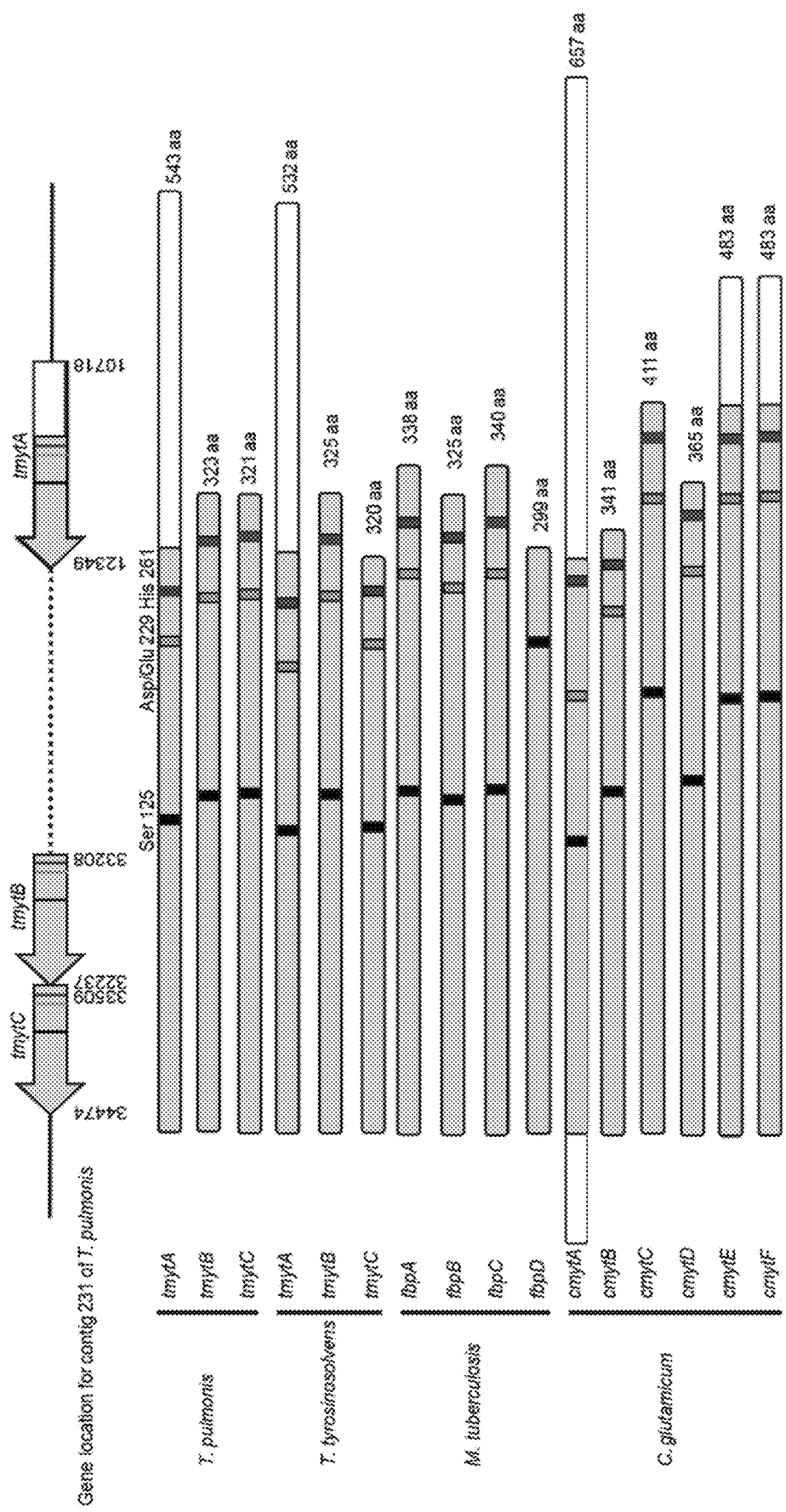

FIG. 4 Characterization of the 3 tmyt homologs in *Tsukamurella*. Locations of the tmytA, tmytB, and tmytC gene in the genome of *T. pulmonis*-PW1004 are indicated. Alignment of the tmyt homologs identified in *T. pulmonis*-PW1004, *T. tyrosinosolvens*-PW899, *M. tuberculosis* (GenBank accession numbers NP_218321, NP_216402, YP_177694 and YP_178017) and *C. glutamicum* (GenBank accession numbers AAAP23202-AAAP232007). The catalytic triad formed by functional residues Ser125, Asp/Glu229, and His261, which are important for mycolyltransferase activity, are indicated by black, gray, and dark gray boxes, respectively.

Figure 5A:
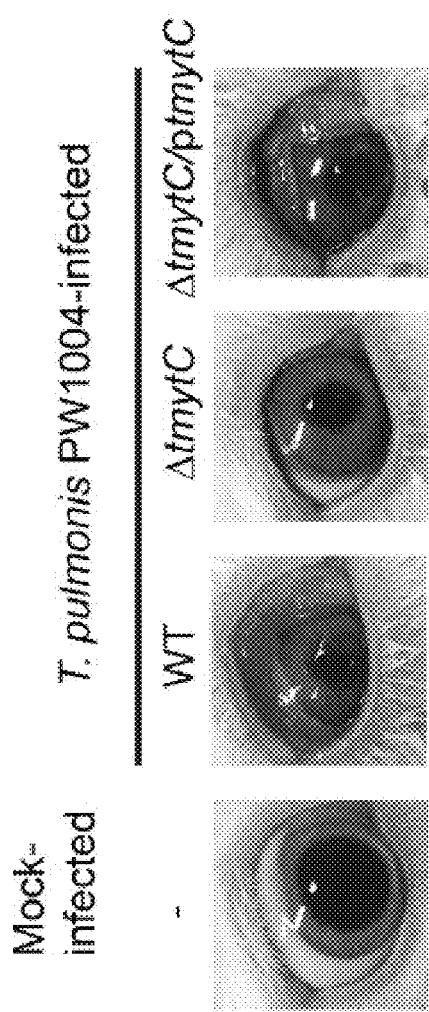
Figure 5B:
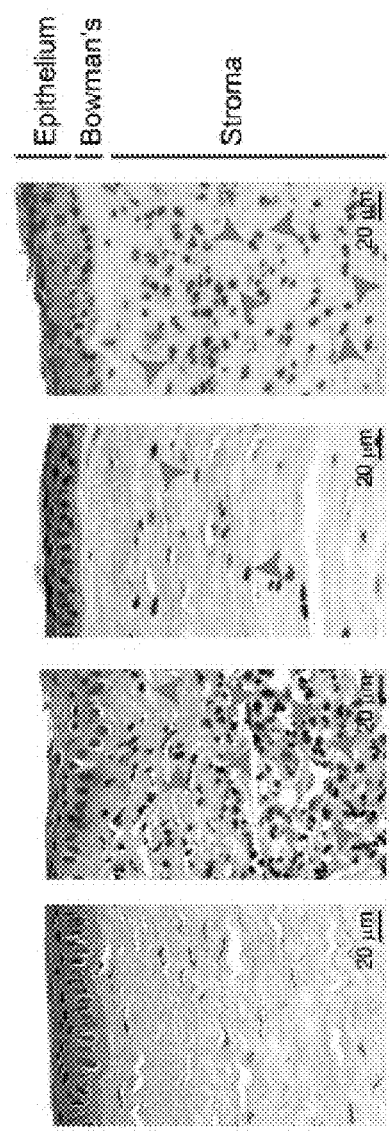
Figure 5C:
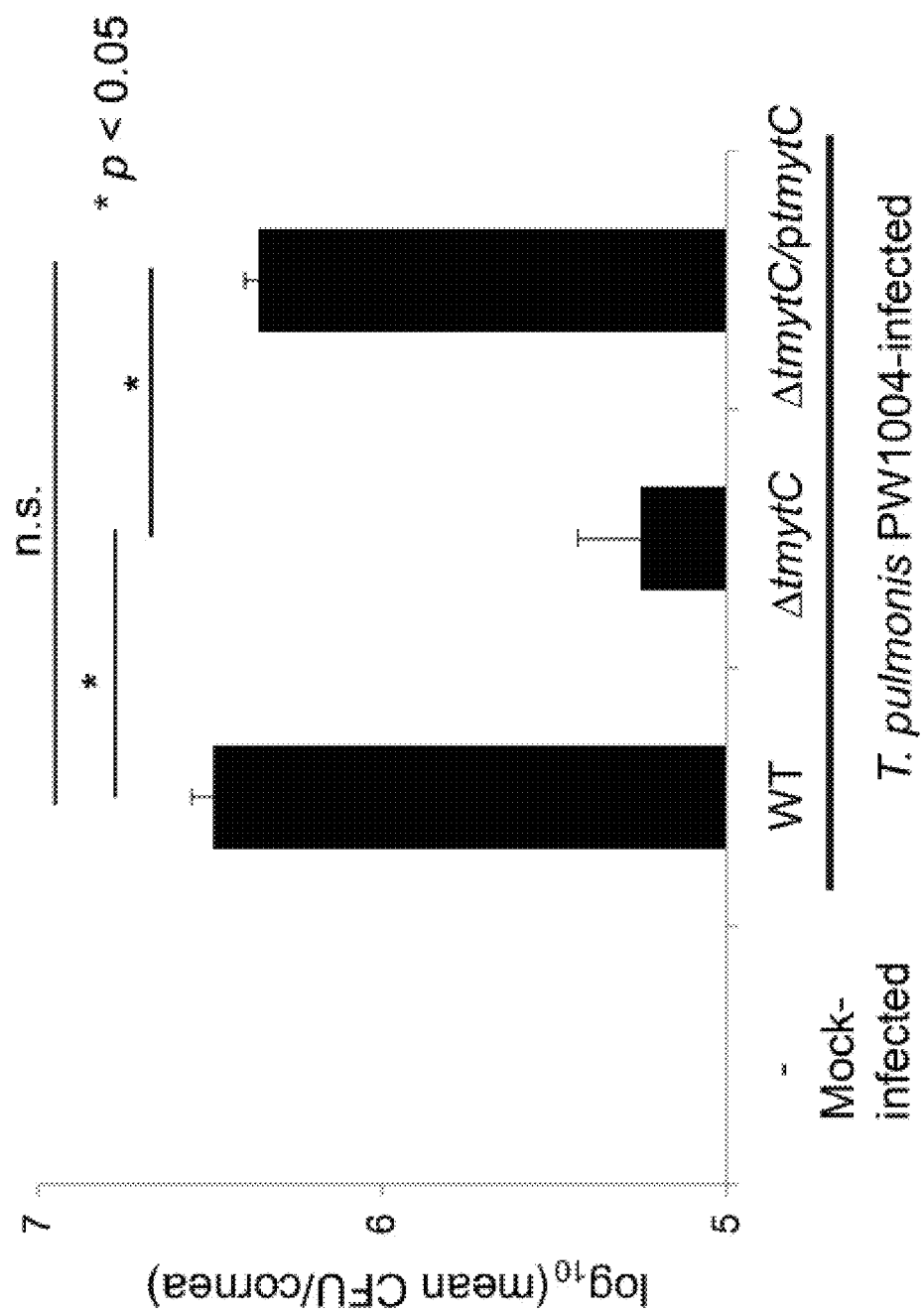

FIGS. 5A-C TmytC is a virulence factor of *T. pulmonis*. FIG. 5A: Gross appearance of the rabbit eyes after intrastromal injection of the PW1004-WT and its derivative mutants. The symptoms of keratitis in rabbits infected with PW1004ΔtmytC appeared less severe with fewer purulent discharges compared to those infected with the PW1004-WT and PW1004ΔtmytC/ptmytC mutant. FIG. 5B: Representative images of H&E staining of corneal sections of infected rabbits. PMN (shown in blue arrows) infiltration in corneal stroma and stromal edema was less prominent in PW1004ΔtmytC compared to the PW1004-WT and PW1004ΔtmytC/ptmytC mutants, showing the disorderly arranged epithelial layer. FIG. 5C: Mean bacterial load in cornea inoculated with the PW1004-WT, PW1004ΔtmytC, and PW1004ΔtmytC/ptmytC at day 2 PI. Error bars indicate means±SEM of 3 independent experiments.

Figures 6A, 6B, 6C, 6D:
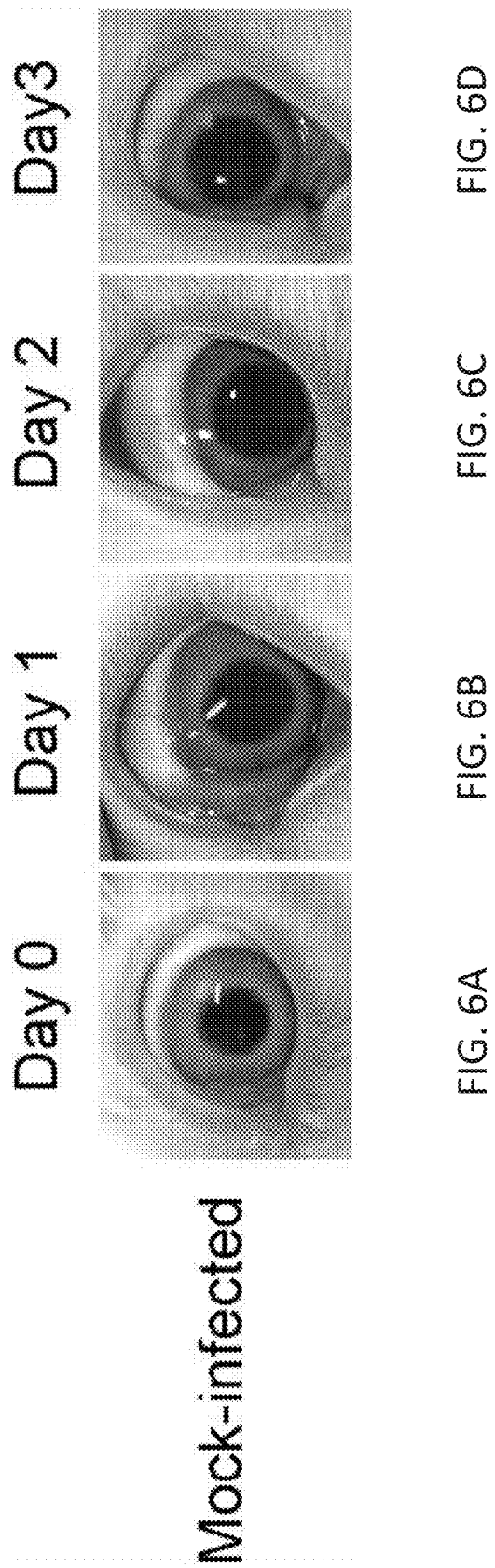

FIGS. 6A-D Gross of appearance of rabbits from mock-infected group (i.e., inoculated with plain culture medium). No pathological sign was observed in rabbits inoculated with plain culture medium up to day 3 PI. FIG. 6A: Day 0. FIG. 6B: Day 1. FIG. 6C: Day 2. FIG. 6D: Day 3.

Figure 7A:
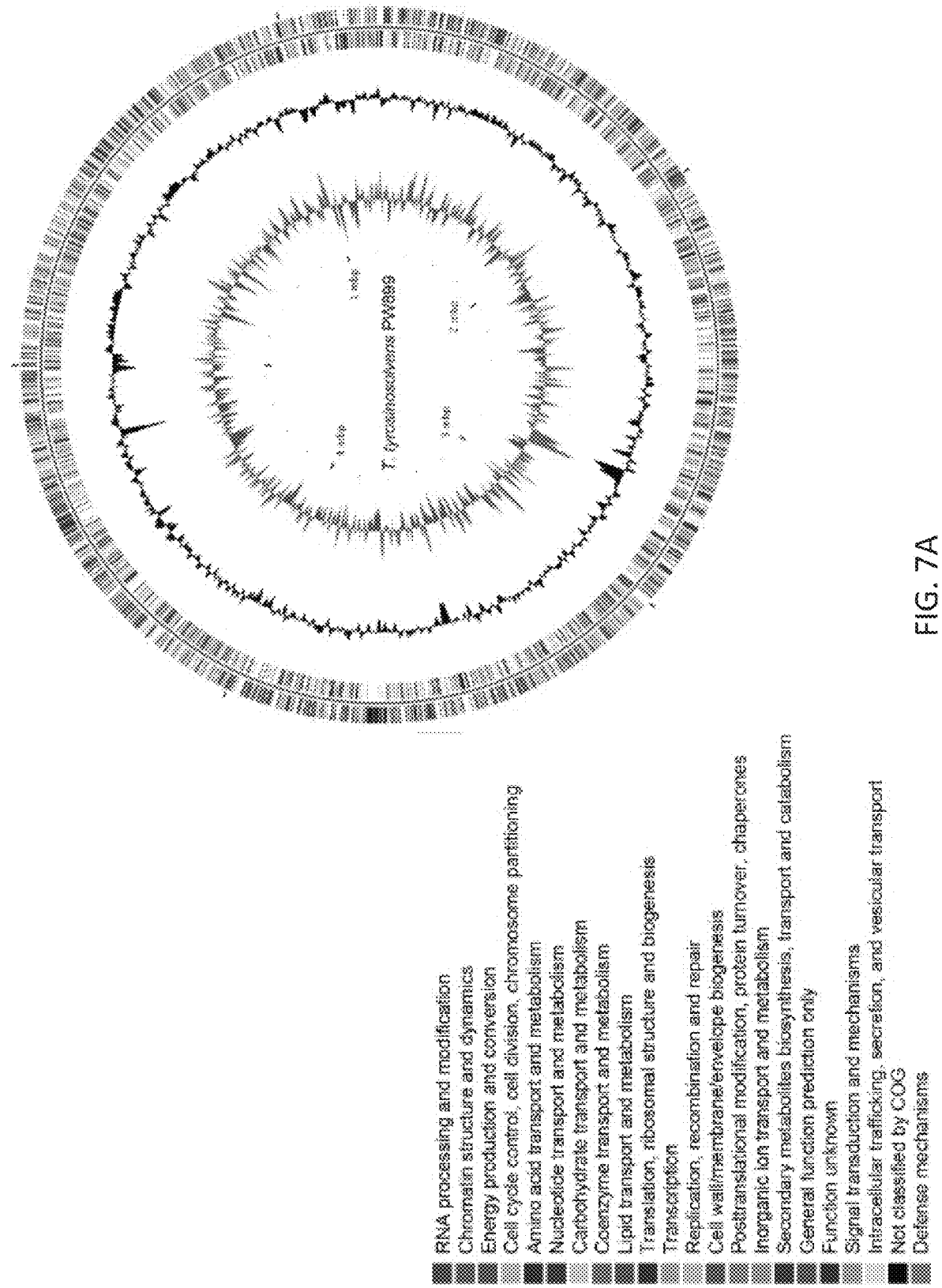
Figure 7B:
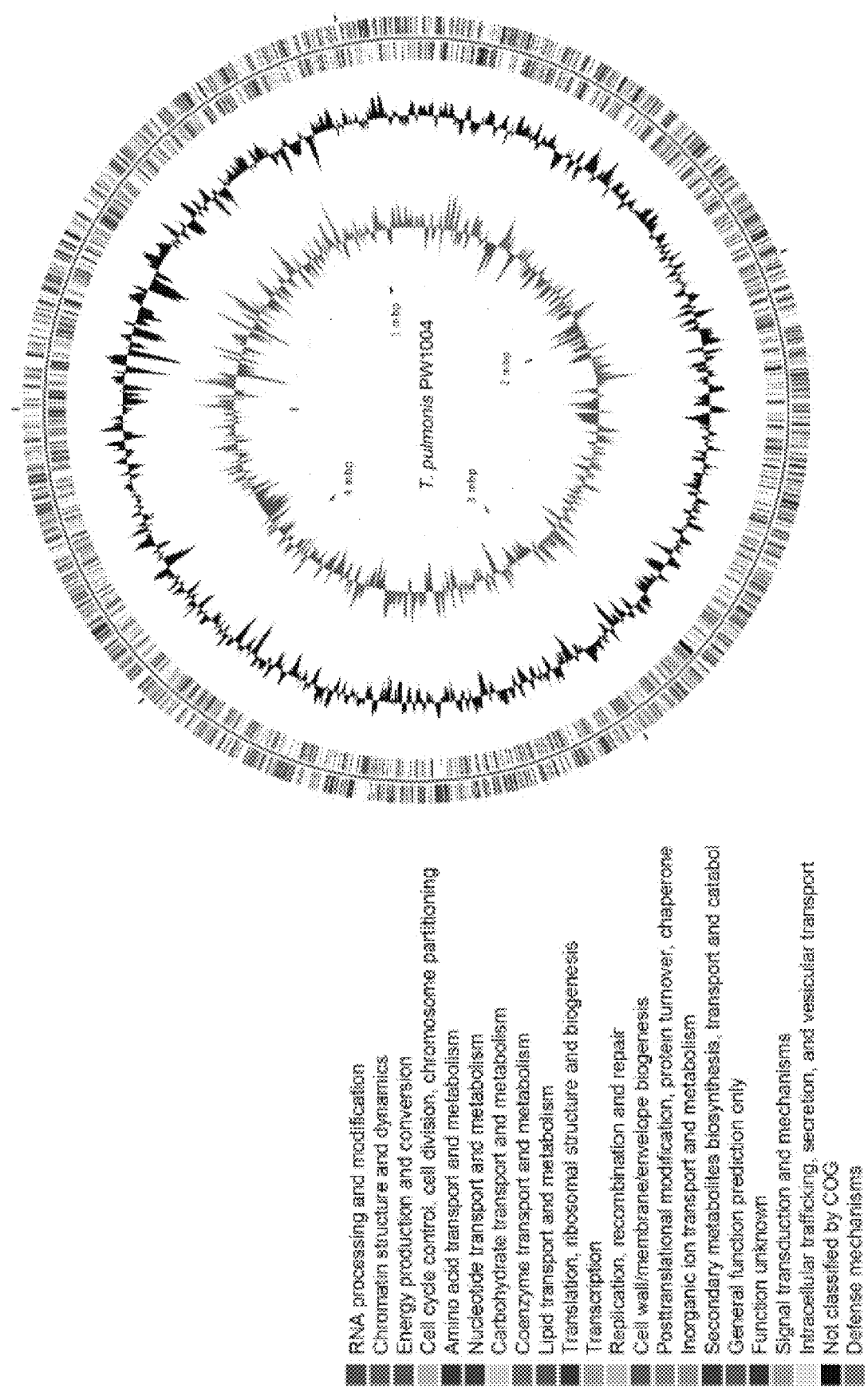
Figure 7C:
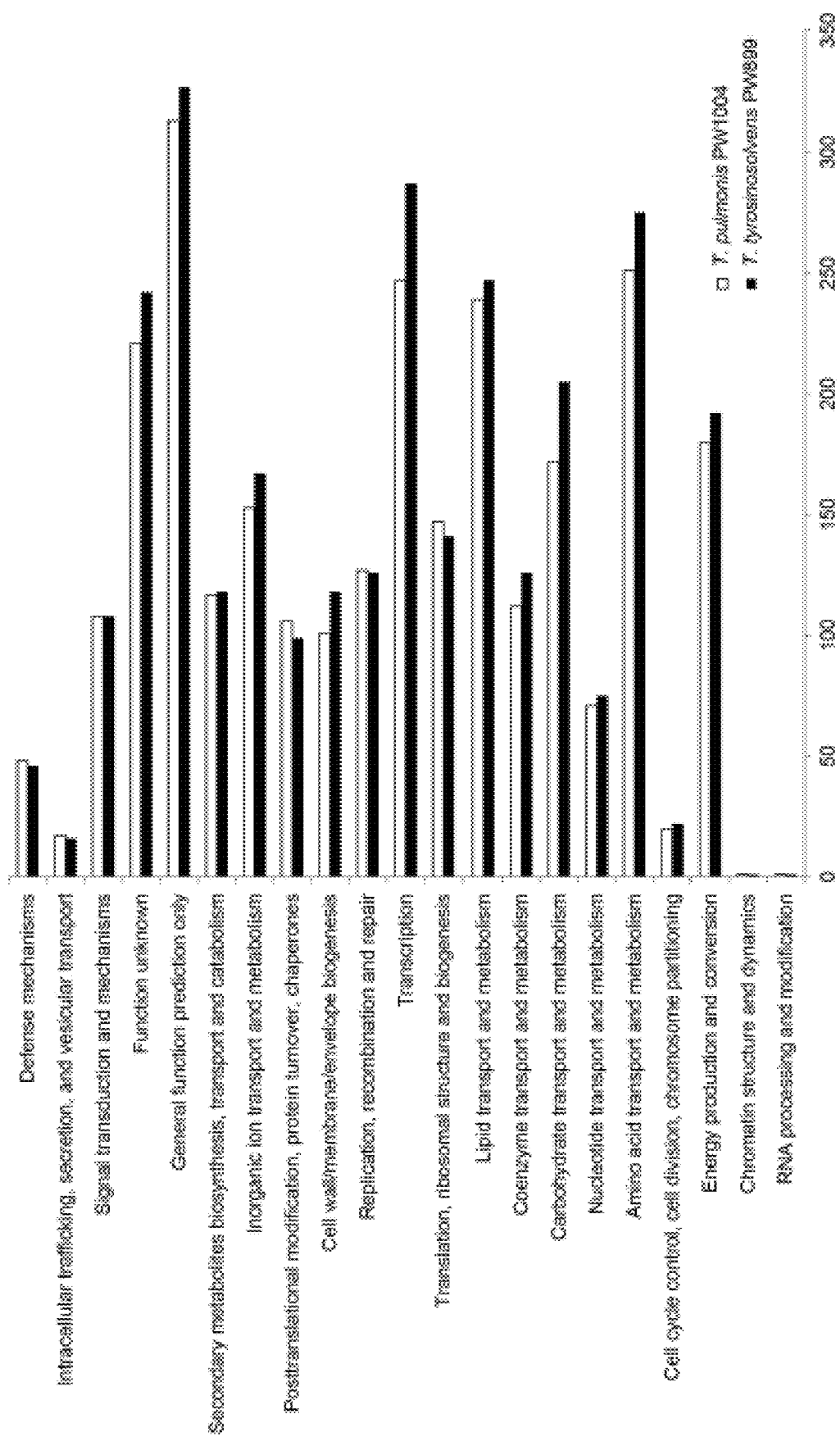
Figure 7D:
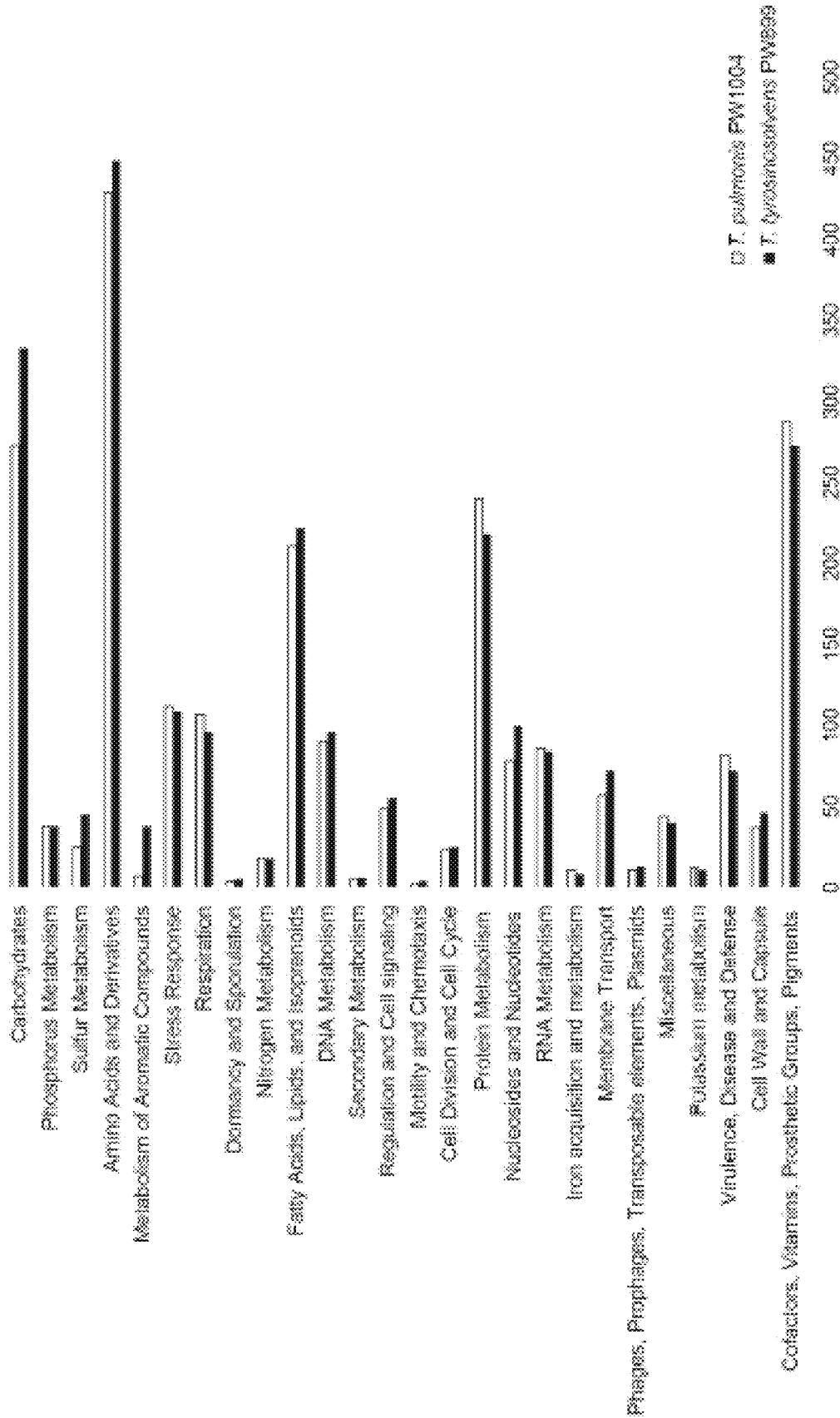

FIGS. 7A-D Graphical circular maps of the genomes and the distributions of predicted coding sequence function according to COG and SEED subsystems. FIG. 7A: *T. tyrosinosolvens*-PW899. FIG. 7B: *T. pulmonis*-PW1004. From outside to centre, ring 1 and 2 show protein coding genes on both the forward and reverse strand (colored by COG categories, respectively); ring 3 shows G+C % content plot, and ring 4 shows GC skew, purple indicating negative values and green, positive values; The columns indicate the number of proteins in different FIG. 7C: COG and FIG. 7D: SEED subsystems.

Figure 8:
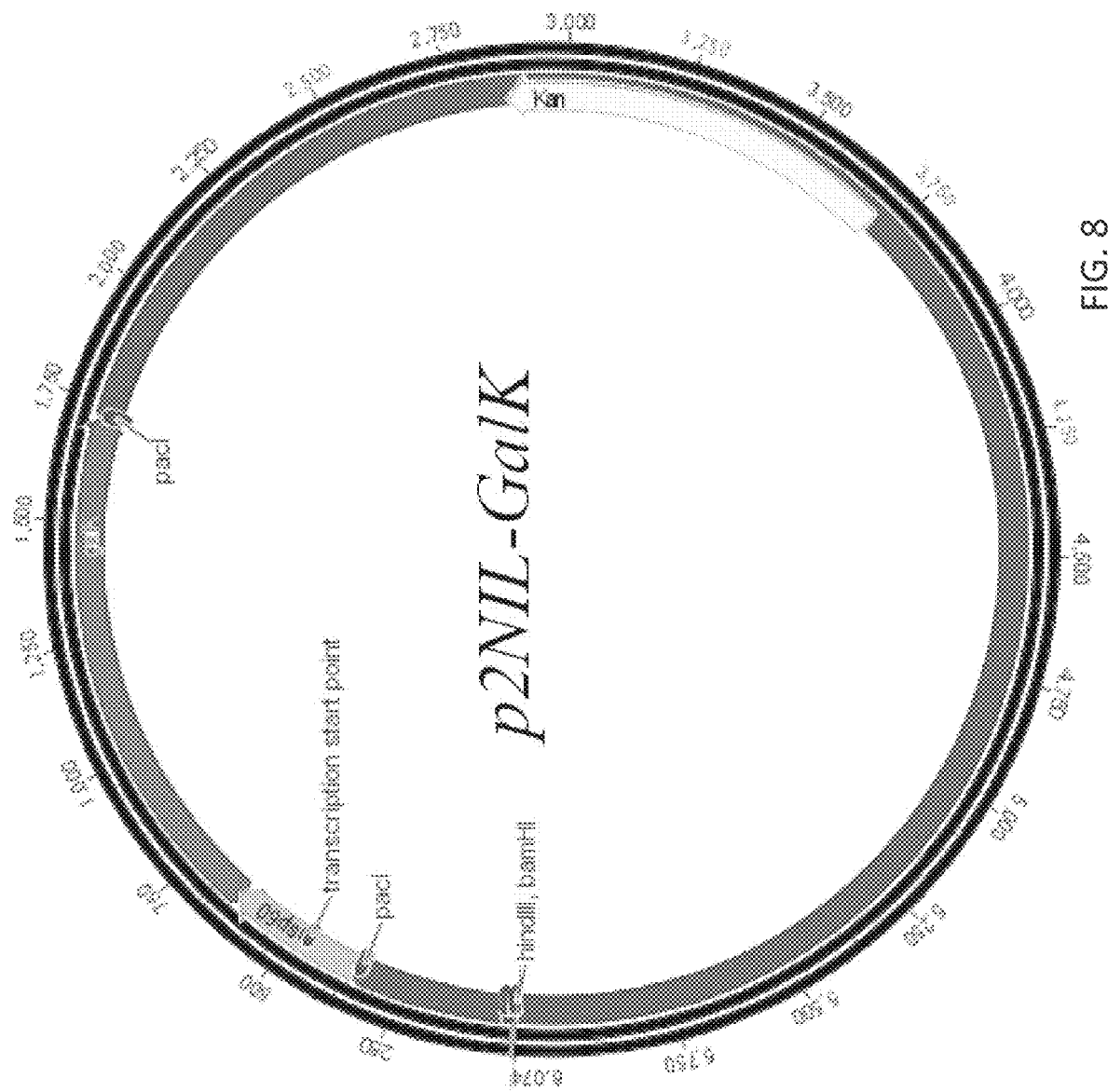

FIG. 8 Map of p2NIL-GalK

Figure 9:
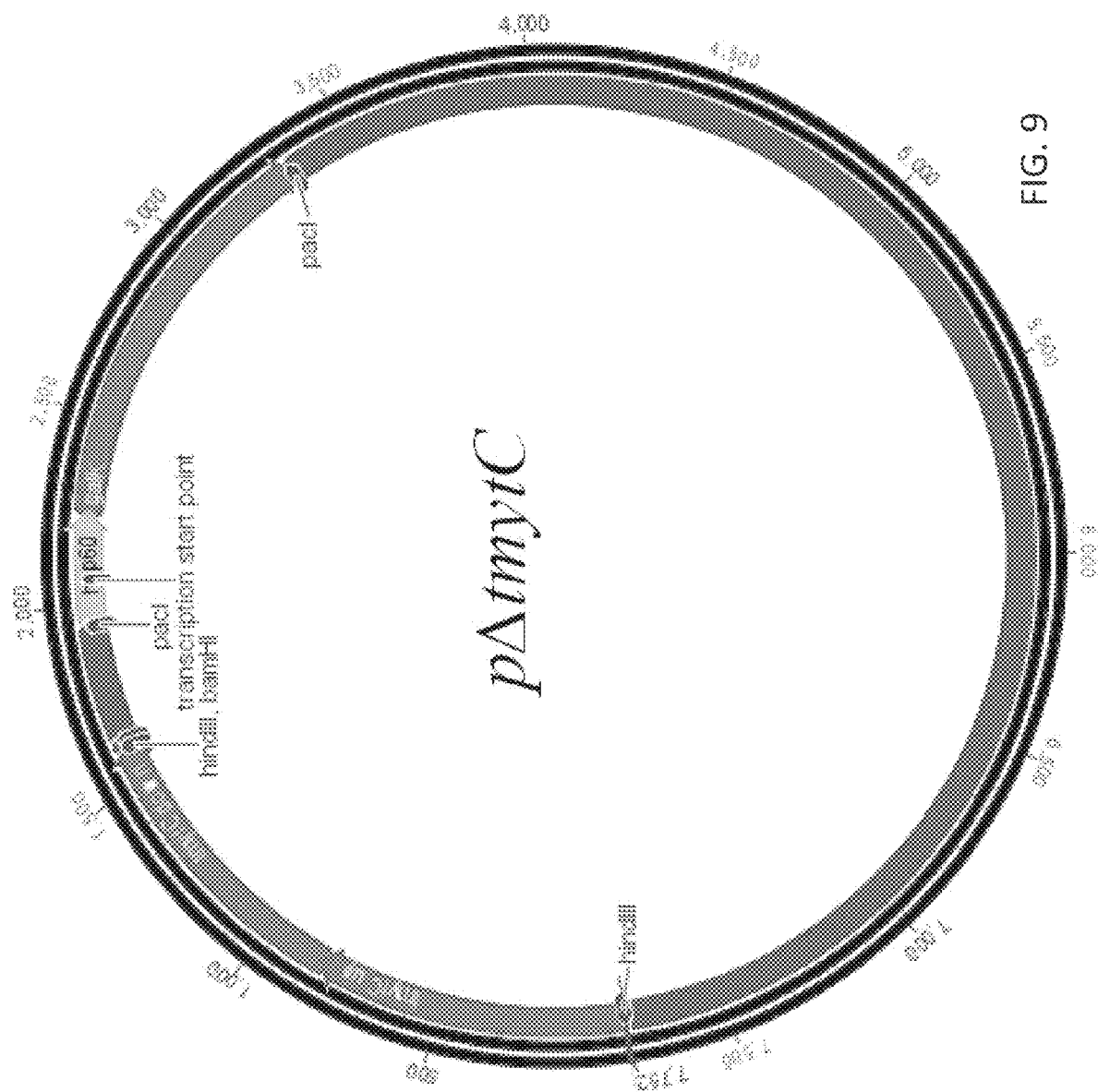

FIG. 9 Map of pΔtmytC

Figure 10:
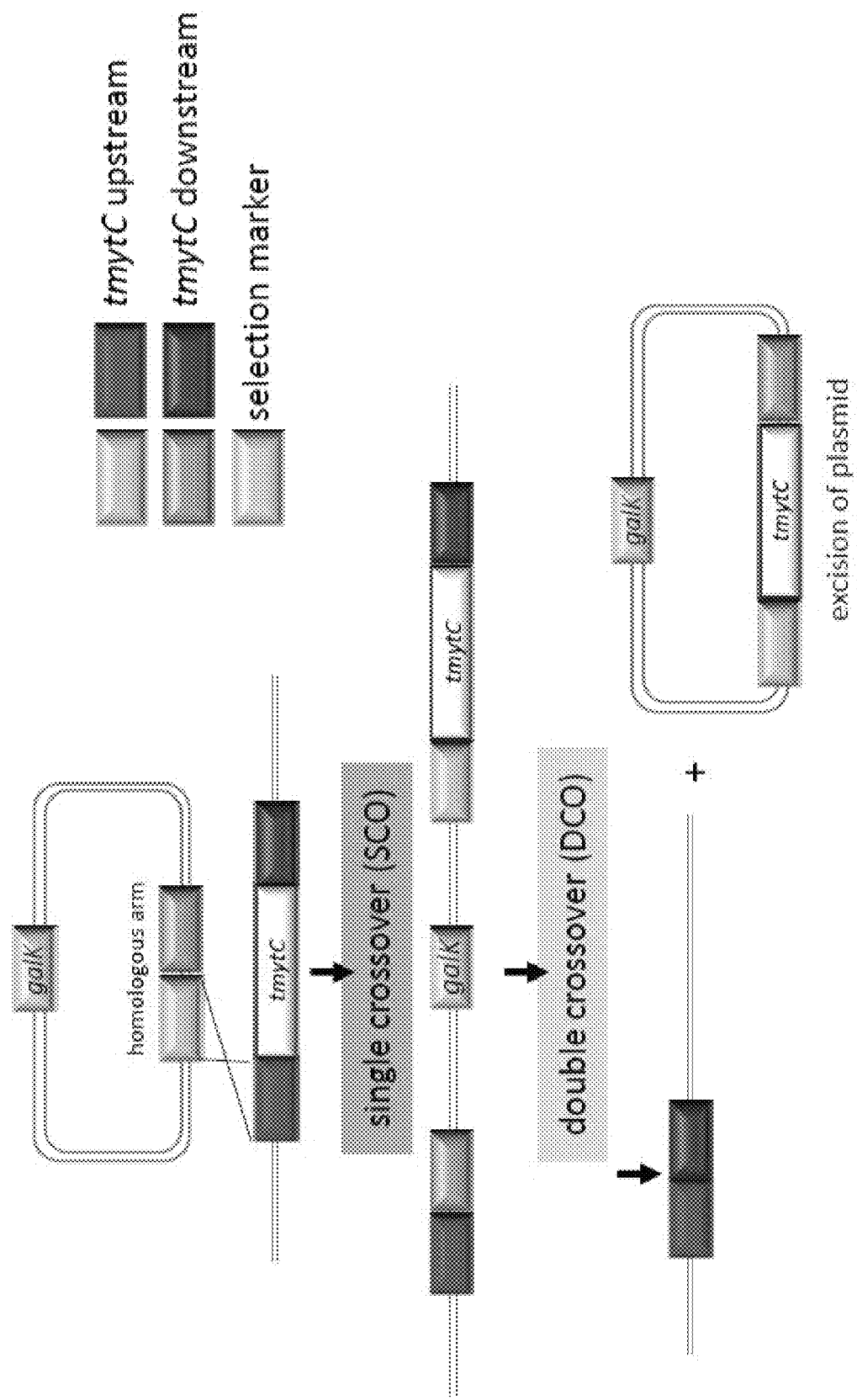

FIG. 10 Homologous recombination of tmytC using a knock-out construct.

Figure 11A:
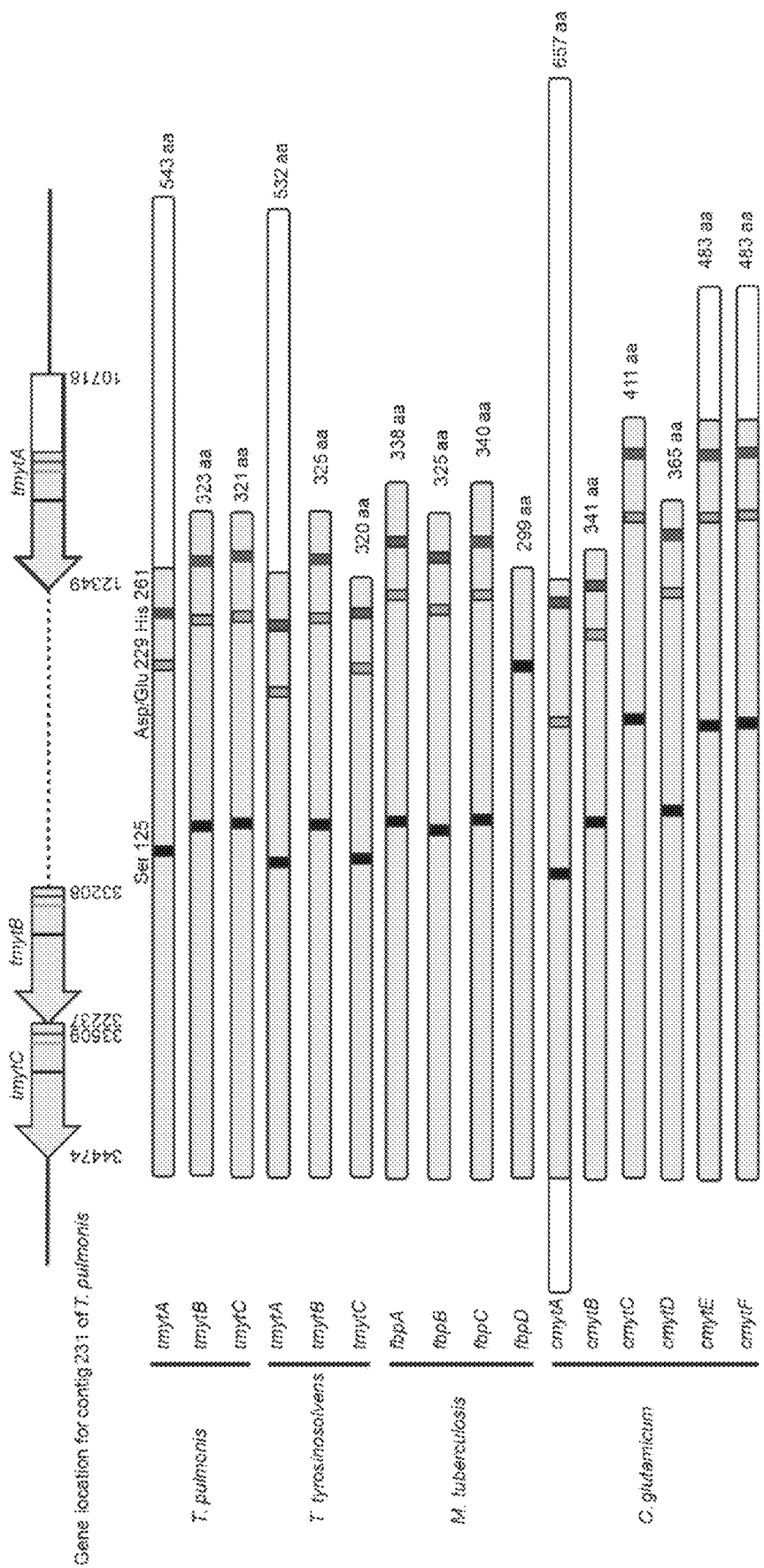
Figure 11B:
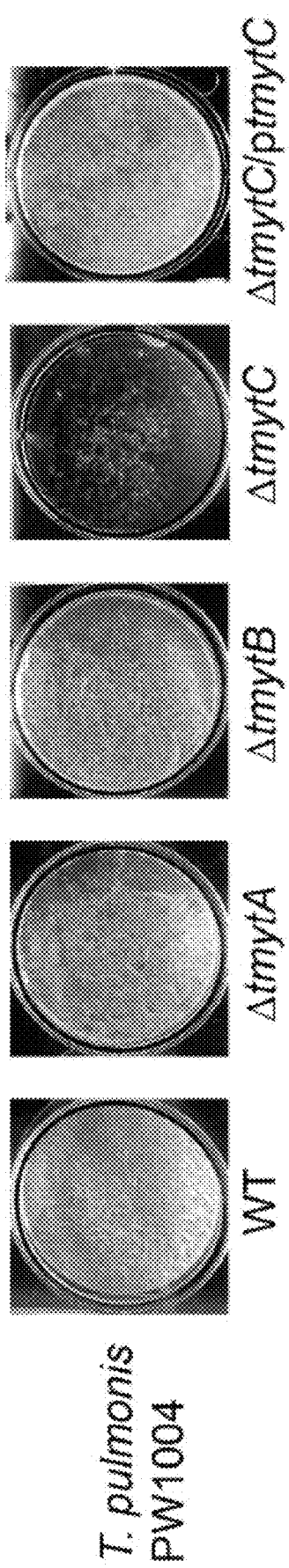
Figure 11C:
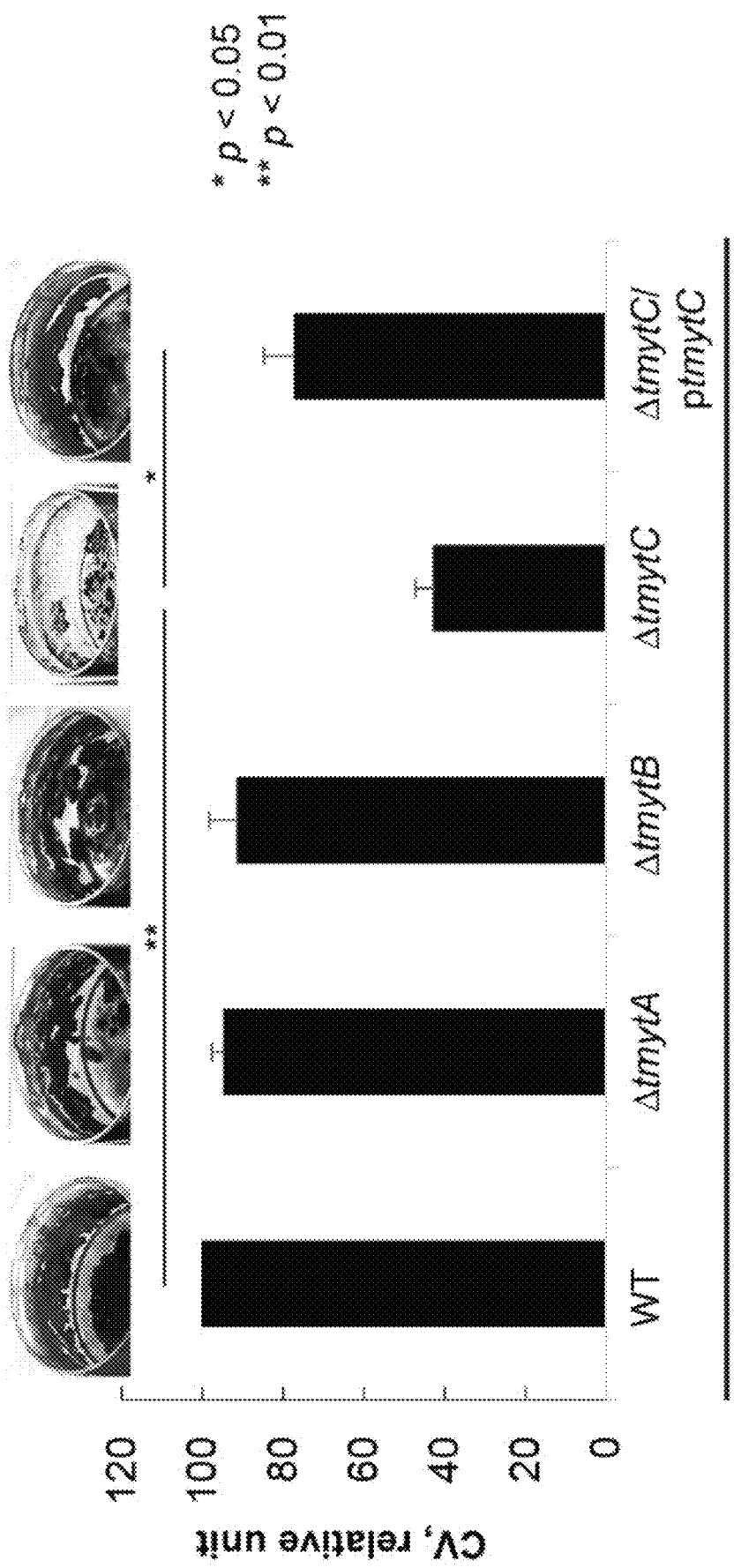
Figure 11D:
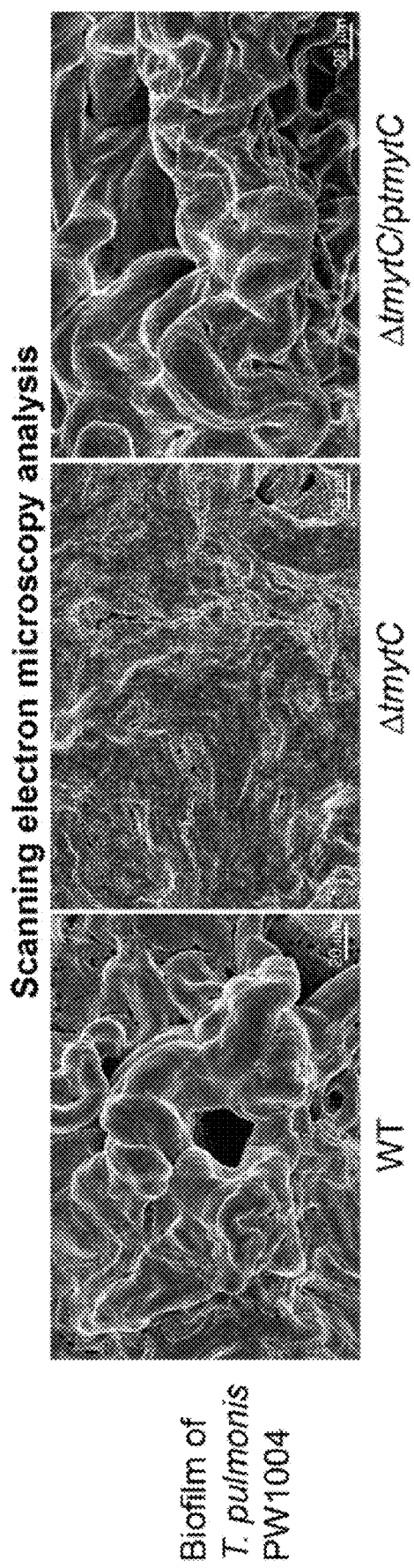
Figure 11E:
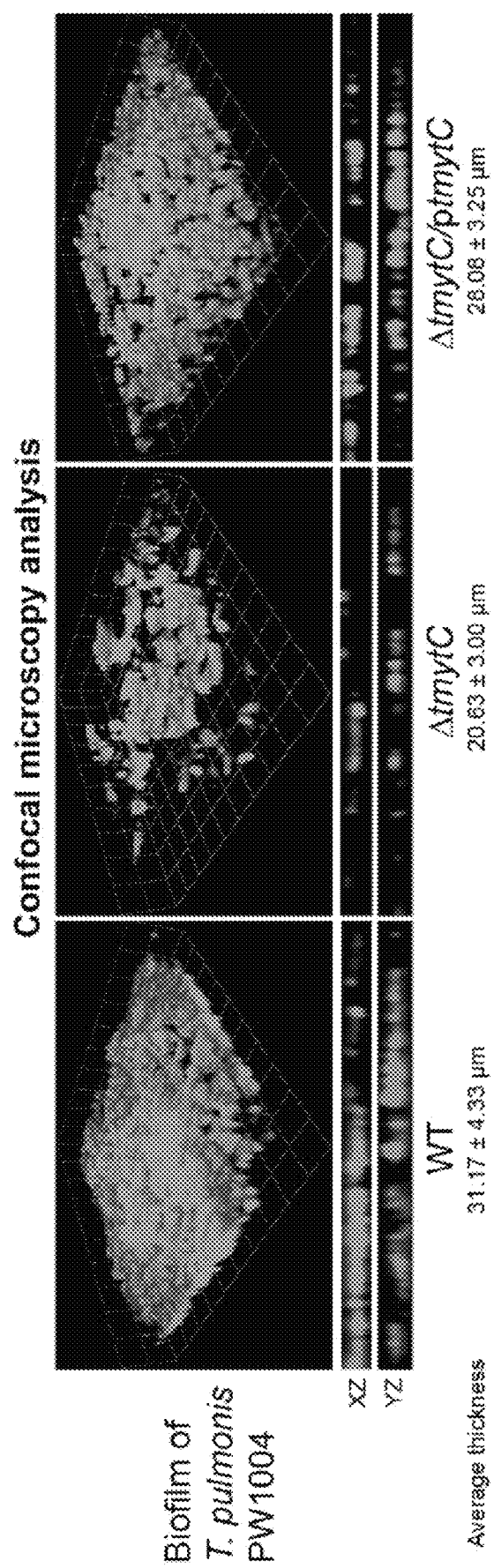

FIGS. 11A-E Characterization of the 3 tmyt homologs in *Tsukamurella*. FIG. 11A: Locations of the tmytA, tmytB, and tmytC gene in the genome of *T. pulmonis*-PW1004 are indicated. Alignment of the tmyt homologs identified in *T. pulmonis*-PW1004, *T. tyrosinosolvens*-PW899, *M. tuberculosis* (GenBank accession numbers NP_218321, NP_216402, YP_177694 and YP_178017) and *C. glutamicum* (GenBank accession numbers AAAP23202-AAAP232007). The catalytic triad formed by functional residues Ser125, Asp/Glu229, and His261, which are important for mycolyltransferase activity, are indicated by black, gray, and dark gray boxes, respectively. FIG. 11B: Biofilm formed by the PW1004-WT and its derivative mutants when they were cultured under static conditions for 3 days. With the exception of the PW1004ΔtmytC, dense and confluent biofilm was formed as a floating pellicle at the air-liquid interface in PW1004ΔtmytA, PW1004ΔtmytB, PW1004-WT, and tmytC complemented mutant (PW1004ΔtmytC/ptmytC). FIG. 11C: Quantitation of the biofilm formed by the PW1004-WT and its derivative mutants using crystal violet staining method. The amount of biofilms was significantly reduced in PW1004ΔtmytC compared to the PW1004-WT (P<0.01) and complemented mutant (P<0.05). FIG. 11D: SEM and FIG. 11E: confocal microscopy analyses of *Tsukamurella* biofilms cultured under static conditions for 3 days. Representative SEM micrographs of the biofilm formed by the PW1004ΔtmytC was flattened and less structured compared to those formed by the PW1004-WT and complemented mutant. Likewise, biofilms were fixed and stained with SYTO 9 green fluorescent stain prior to confocal microscopy analysis. Representative micrographs comparing biofilm thickness of each *Tsukamurella* strain was measured in different points of each field. The means and standard deviations of 3 independent experiments are shown.

Figure 12:
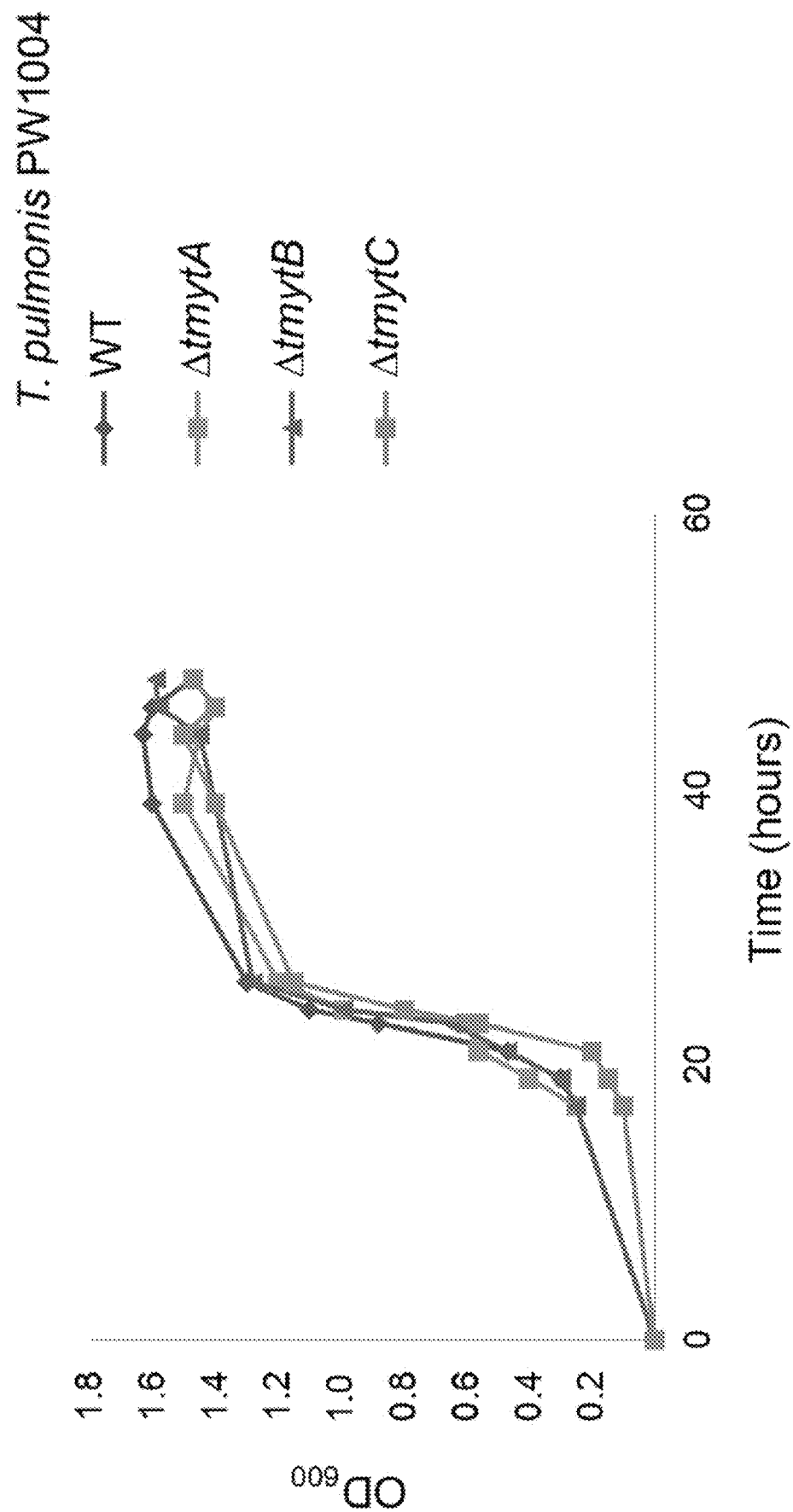

FIG. 12 Appearance of the liquid cultures of the PW1004-WT, tmytC knockout and complemented mutants after 48 h incubation at 37° C. in an aerobic environment. A ring of cells (boxed in yellow) adhering at the air-liquid interface was observed in the culture tubes of the PW1004-WT and PW1004ΔtmytC/ptmytC, but not those of PW1004ΔtmytC.

In contrast, a large cell pellet (boxed in green) was observed in the culture tube of PW1004ΔtmytC, suggesting its weaker adhesion to plastics.

Figure 13A:
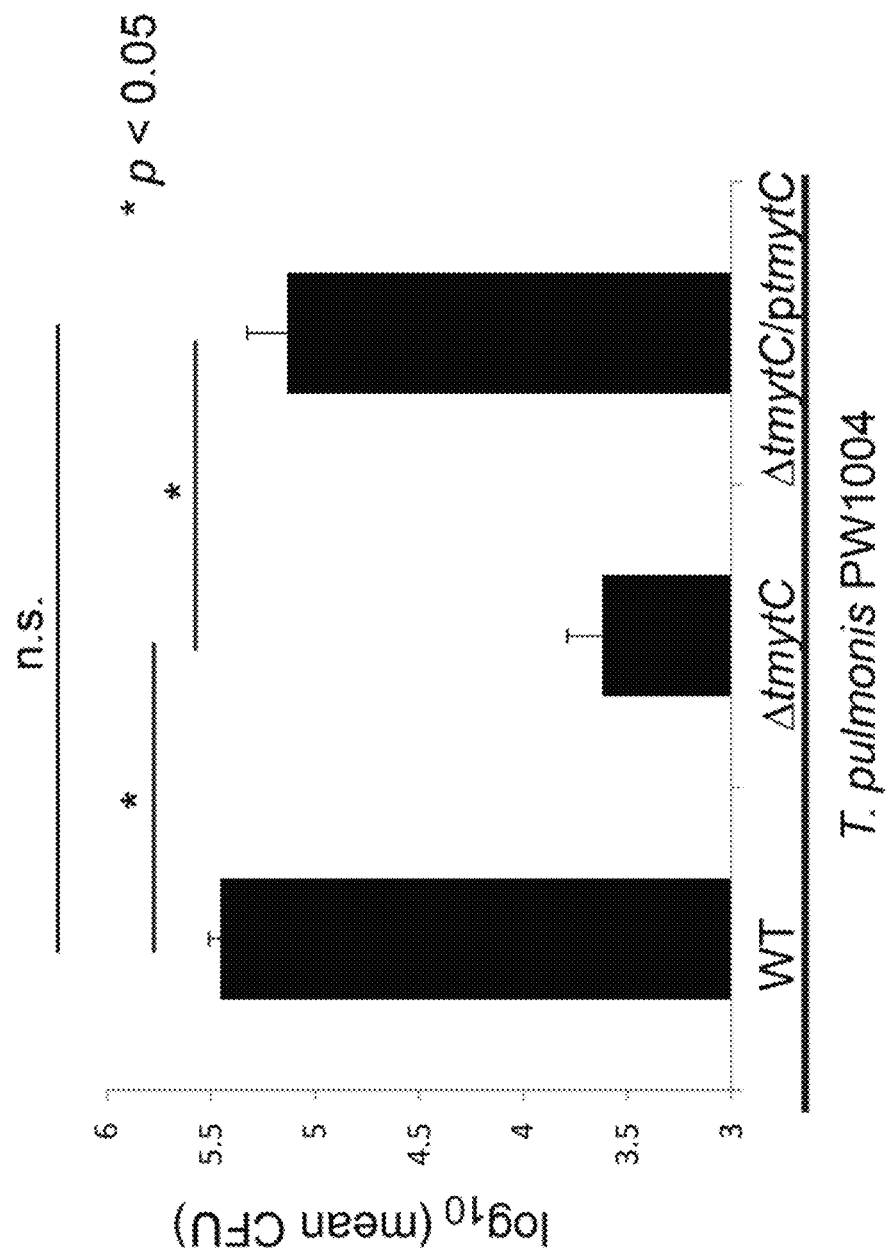
Figure 13B:
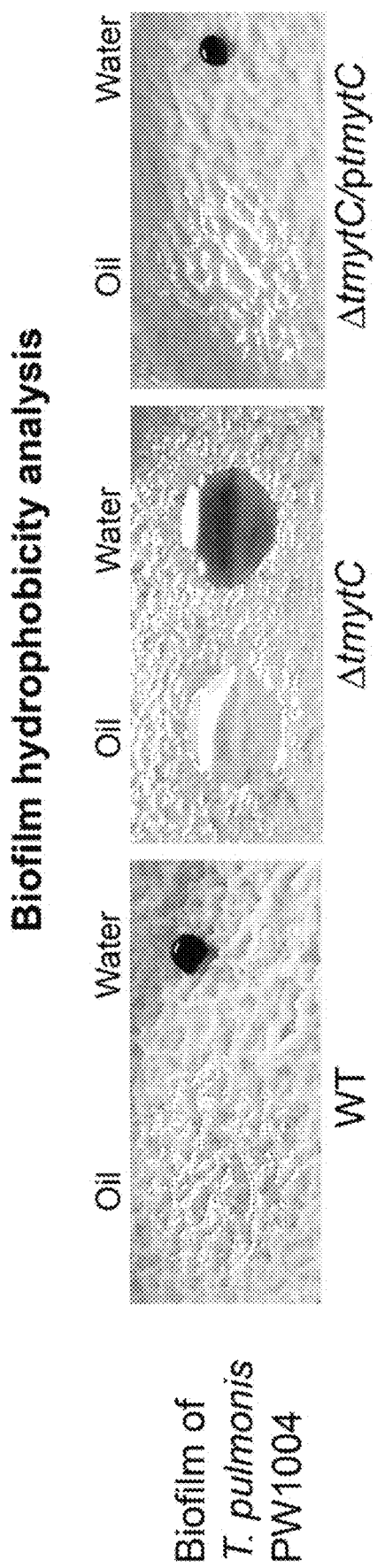

FIGS. 13A-B Altered adherence to contact lens, biofilm hydrophobicity, and PHMB susceptibility of the tmytC knockout mutant. FIG. 13A: Adherence of the wild-type and tymtC mutants to contact lenses in vitro as analyzed by CFU counting analysis. The number of bacteria recovered from the contact lenses inoculated with PW1004ΔtmytC was significantly lower compared to those inoculated with the PW1004-WT ($P<0.05$) and the PW1004ΔtmytC/ptmytC ($P<0.05$) mutants. Error bars indicated means±SEM of 3 independent experiments. FIG. 13B: The PW1004ΔtmytC surface was more hydrophilic compared to the PW1004-WT. Droplets of oil or water containing trypan blue were applied to the surface of the biofilm lawn. In the PW1004-WT and tymtC complemented mutant, the oil spread into a thin film over the surface, suggesting that the cell surface was hydrophobic in nature. In contrast, the water droplet continued to spread (i.e., more hydrophilic) and the oil droplet spread less (i.e., less hydrophobic) in the tymtC knockout mutant.

Figure 14B:
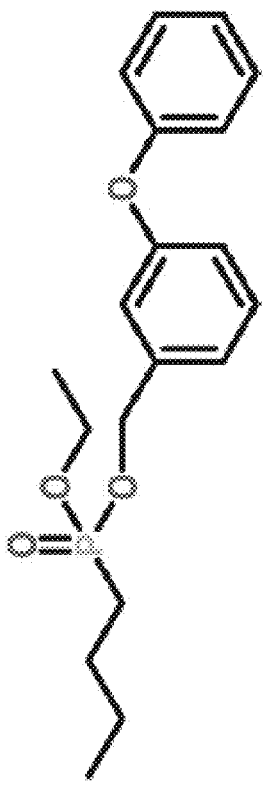
Figure 14B:
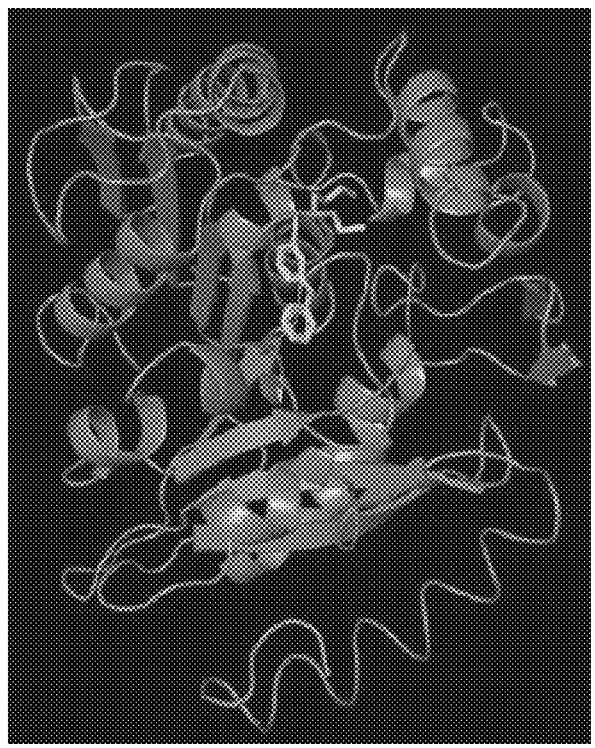
Figure 14C:
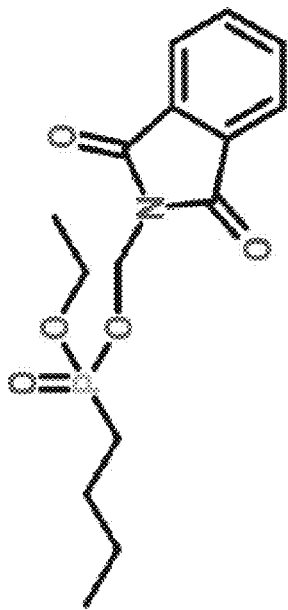
Figure 14C:
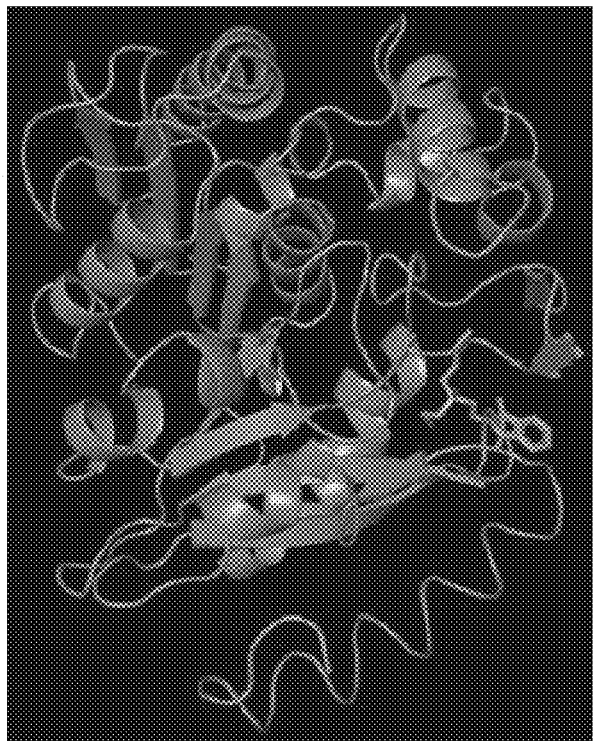
Figure 14D:
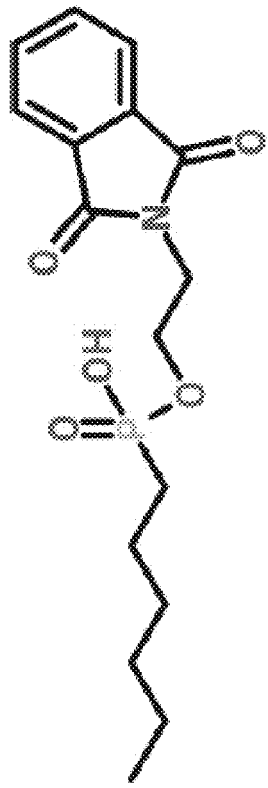
Figure 14D:
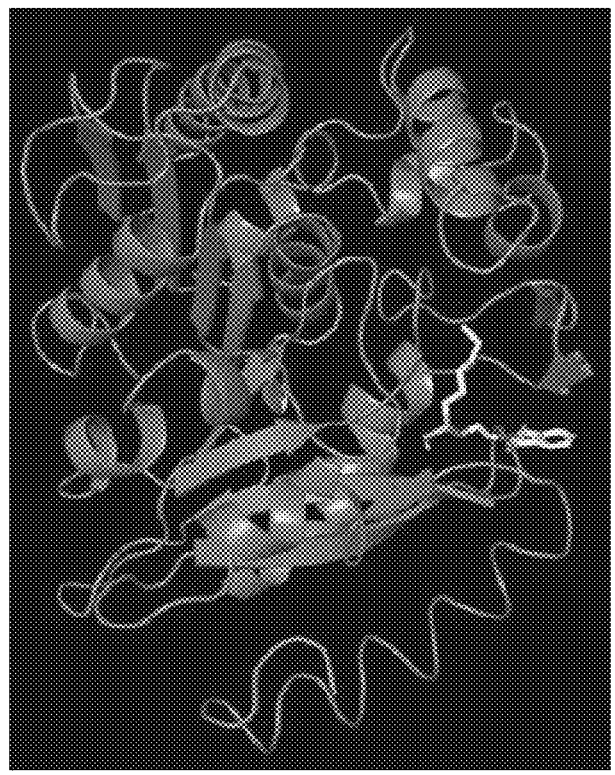
Figure 14E:
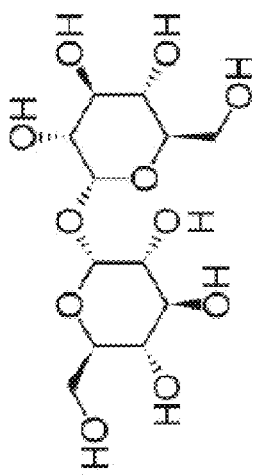
Figure 14E:
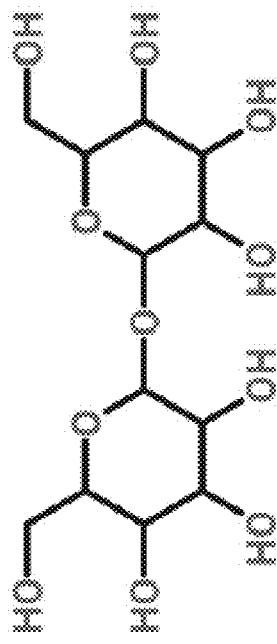
Figure 14E:
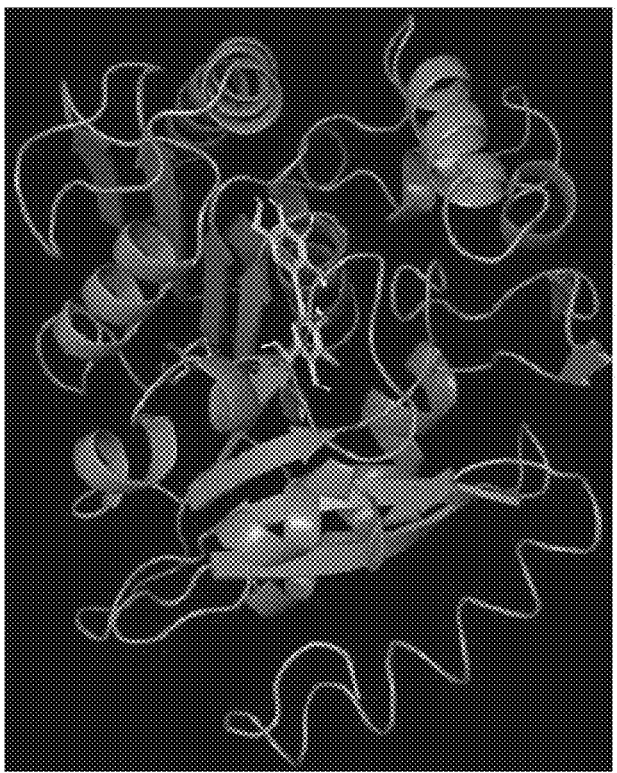
Figure 14F:
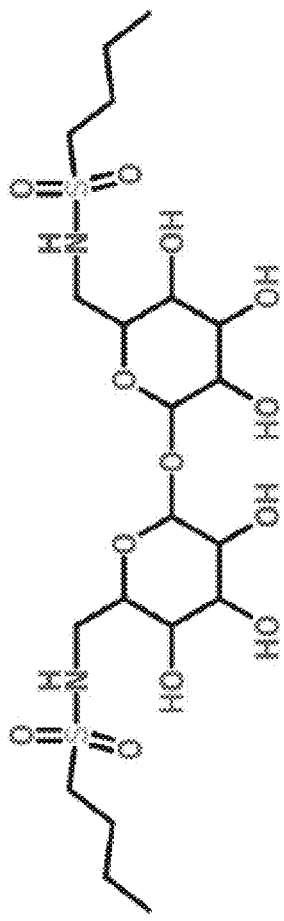
Figure 14F:
Figure 14G:
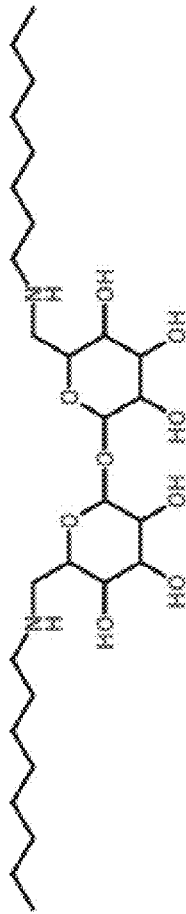
Figure 14G:
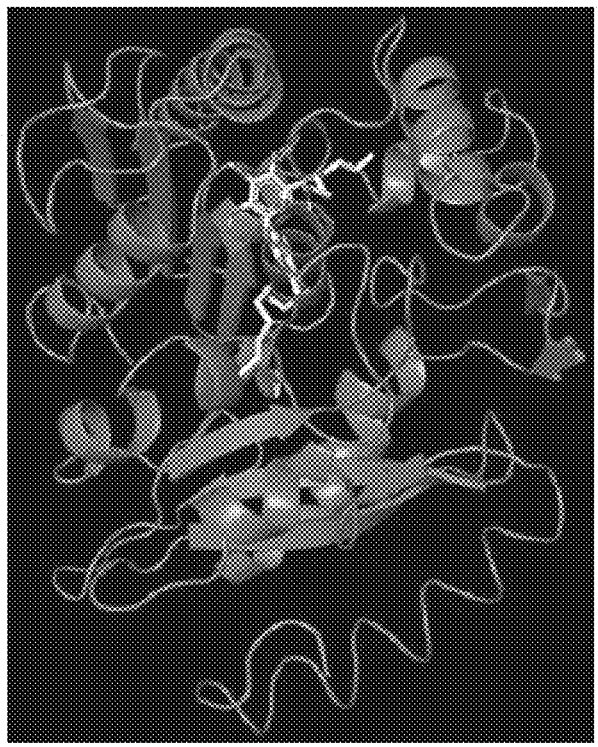
Figure 14H:
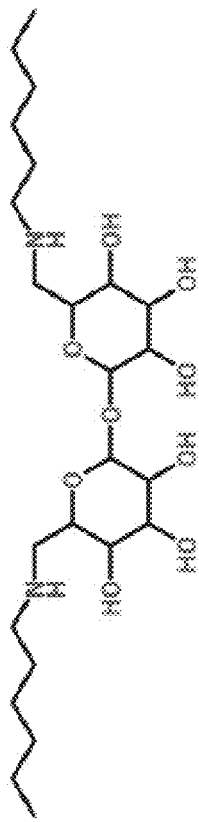
Figure 14H:
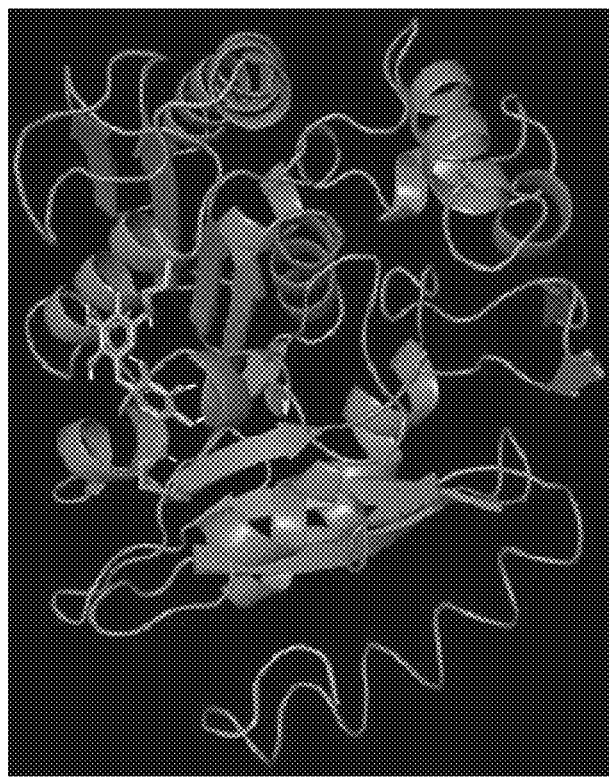

FIGS. 14A-K. Structural analysis of mode of binding between ligands and their analogs with *Tsukamurella* tmytC (blue). FIG. 14A: Phosphonate inhibitor 3*a*; FIG. 14B: phosphonate inhibitor 4*a*; FIG. 14C: phosphonate inhibitor 5*a*; FIG. 14D: phosphonate inhibitor 6*a*; FIG. 14E: trehalose; FIG. 14F: trehalose analog 11*a*; FIG. 14G: trehalose analog 15*a*; FIG. 14H: trehalose analog 18*a*; FIG. 14I: cyclipostins and cyclophostin analog CyC7β; FIG. 14J: cyclipostins and cyclophostin analog CyC8β; FIG. 14K: cyclipostins and cyclophostin analog CyC17.

Figure 15A:
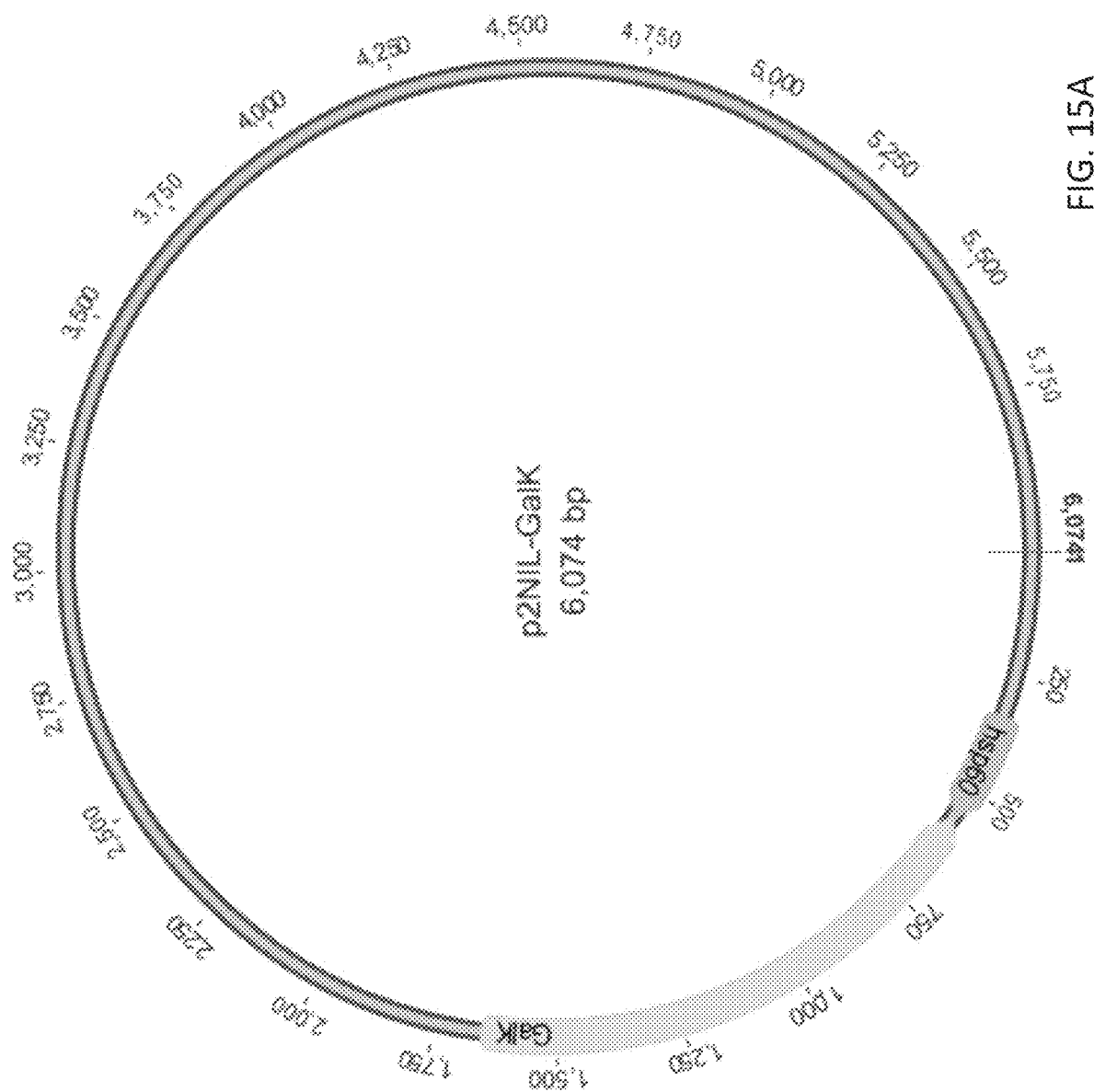

FIGS. 15A-D FIG. 15A: A map of one embodiment of a vector useful for the disclosure p2NIL-GALK vector. FIG. 15B: Nucleic acid sequence of p2NIL-GALK. FIG. 15C: Nucleic acid sequence of hsp60 promoter. FIG. 15D: Nucleic acid sequence of GalK.

Figure 16A:
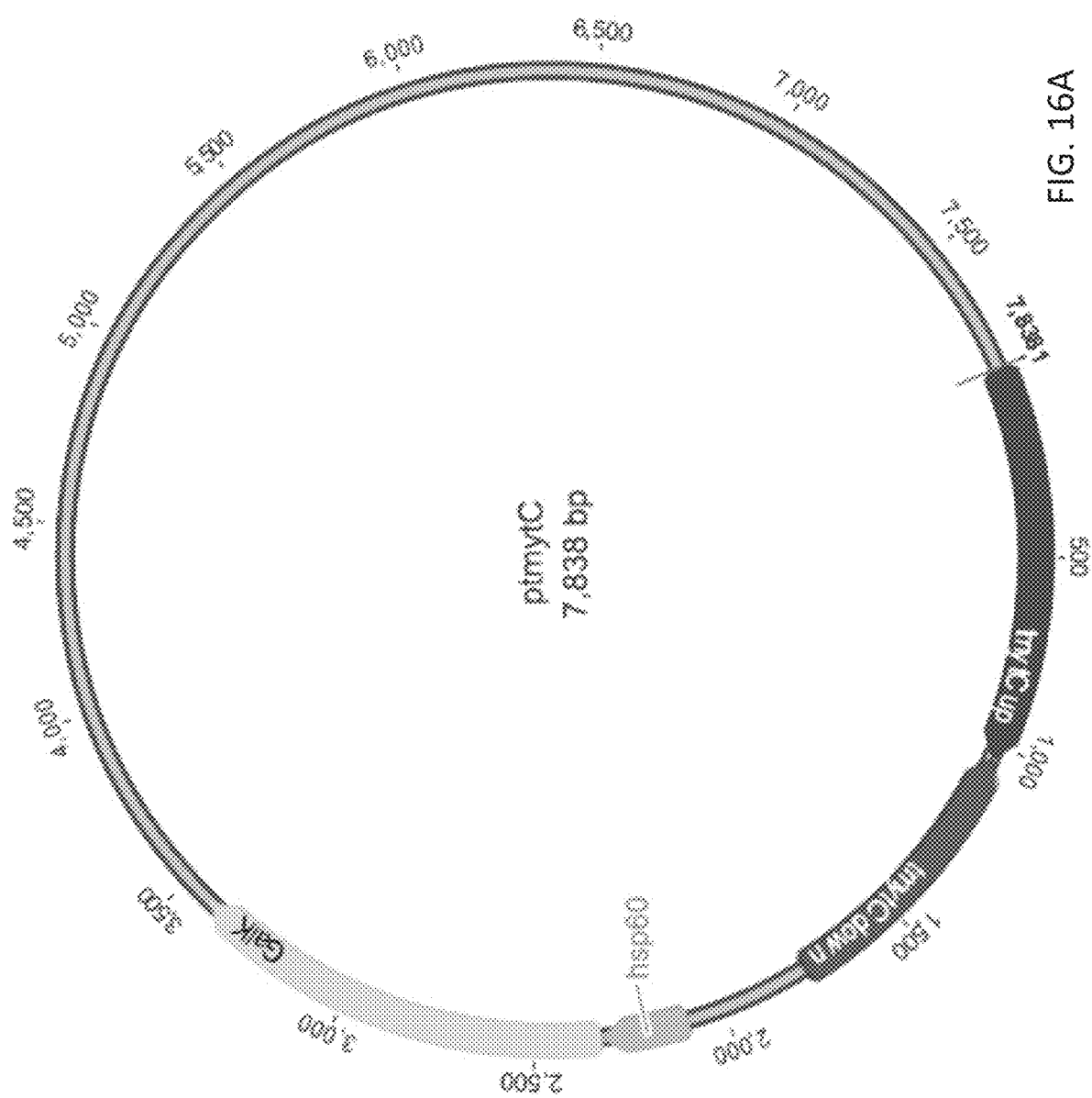

FIGS. 16A-B FIG. 16A: A map of one embodiment of the knock-out construct useful for the disclosure pΔtmytC. FIG. 16B: Nucleic acid sequence of pΔtmytC.

FIGS. 17A-B FIG. 17A: Nucleic acid sequence of the upstream region of tmytC in pΔtmytC. FIG. 17B: Nucleic acid sequence of a portion of the upstream region of tmytC.

FIGS. 18A-B FIG. 18A: Nucleic acid sequence of the downstream region of tmytC in pΔtmytC. FIG. 18B: Nucleic acid sequence of a portion of the downstream region of tmytC.

4.1 DEFINITIONS

As used herein, the term "about" refers to a range of +1-5% of the number that is being modified.

As used herein, the term "subject" or "patient" includes either a human or non-human animal, such as a mammal. By "subject" is meant any animal, including horses, dogs, cats, pigs, goats, rabbits, hamsters, monkeys, guinea pigs, rats, mice, lizards, snakes, sheep, cattle, fish, and birds. A human subject may be referred to as a patient.

As used herein the term "ocular surface" includes the wet-surfaced and glandular epithelia of the cornea, conjunctiva, lacrimal gland, accessory lacrimal glands, nasolacrimal duct and meibomian gland, and their apical and basal matrices, puncta and adjacent or related structures, including the eyelids linked as a functional system by both continuity of epithelia, by innervation, and the endocrine and immune systems.

The term "treat", "treating", or "treatment", with reference to a certain disease condition in a mammal, refers causing a desirable or beneficial effect in the subject having the disease condition. The desirable or beneficial effect may include reduced frequency or severity of one or more symptoms of the disease, or arrest or inhibition of further development of the disease, condition, or disorder. Some laboratory signs that the clinician may observe for response to treatment include normalization of tests.

As used herein, "prevention" means that an inoculum of an ocular pathogen introduced to an eye does not develop into a symptomatic ocular infection when the eye is treated with the ophthalmic composition (either before or after introduction of the inoculum), whereas an eye not treated with the ophthalmic composition develops a symptomatic ocular infection. Prevention may be, for example, following surgery, after birth for the newborn, or from accidental contact with contaminating materials.

The term "vector" refers to a nucleic acid molecule capable of transporting a foreign nucleic acid molecule. The foreign nucleic acid molecule is linked to the vector nucleic acid molecule by a recombinant technique, such as ligation or recombination. This allows the foreign nucleic acid molecule to be multiplied, selected, further manipulated or expressed in a host cell or organism. A vector can be a plasmid, phage, transposon, cosmid, chromosome, virus, or virion. One type of vectors can be integrated into the genome of a host cell upon introduction into the host cell, and thereby are replicated along with the host genome.

As used herein, "virulence" is a pathogen's or microbe's ability to infect or caused a diseases state in a host. Virulent is measured by either disease severity or a pathogen's infectivity.

As used herein, "homologous recombination" is the exchange of DNA strands of similar, substantially identical or homologous nucleotide sequence which is one mode of genome modification.

As used herein, "homologous recombination construct" is a vector that comprises at least one homologous region that flank a target gene.

As used herein, "5' flanking region" is a homologous sequence at the 5' or upstream region of a target gene.

As used herein, '3' flanking region" is a homologous sequence at the 3' or downstream region of a target gene.

The terms "ocular infection" refers to an infection caused by a microorganism or microorganisms in or around an eye or the eye structure which include the eyelids and lacrimal apparatus, the conjunctiva, the cornea, the uvea, the vitreous body, the retina, and the optic nerve. Ocular infections include bacterial ophthalmic infections, fungal ophthalmic infections and viral ophthalmic infections.

The terms "homologous" as used herein denotes a characteristic of a nucleic acid sequence, wherein a nucleic acid sequence has at least about 85 percent to about 95 percent sequence identity, at least about 95 percent sequence identity to about 100 percent sequence identity, as compared to a reference sequence. The percentage of sequence identity is calculated excluding small deletions or additions which total less than 25 percent of the reference sequence. The reference sequence may be a subset of a larger sequence, such as a portion of a gene or flanking sequence, or a repetitive portion of a chromosome. Homologous sequences could be determined by hybridization in an experimental setting which is defined herein as the formation of hybrids between a targeting polynucleotide (e.g., a polynucleotide of the invention which may include substitutions, deletion, and/or additions as compared to the predetermined target DNA sequence) and a predetermined target DNA, wherein the targeting polynucleotide preferentially hybridizes to the predetermined target DNA such that, for example, at least one discrete band can be identified on a Southern blot of DNA prepared from target cells that contain the target DNA sequence, and/or a targeting polynucleotide in an intact nucleus localizes to a discrete chromosomal location characteristic of a unique or repetitive sequence. It is evident that optimal hybridization conditions will vary depending upon the sequence composition and length(s) of the targeting polynucleotide(s) and target(s), and the experimental method selected by the practitioner. Various guidelines may be used to select appropriate hybridization conditions (see, Maniatis et al., Molecular Cloning: A Laboratory Manual (1989), 2nd Ed., Cold Spring Harbor, N.Y. and Berger and Kimmel, Methods in Enzymology, Volume 152, Guide to Molecular Cloning Techniques (1987), Academic Press, Inc., San Diego, Calif., which are incorporated herein by reference.

As used herein, "inhibitors" of tmytC refer to modulatory molecules or compounds that, e.g., bind to, partially or totally block activity, decrease, prevent, delay activation, inactivate, desensitize, or down regulate the activity or expression of tmytC protein. In a specific embodiment, an inhibitor specifically inhibits the tmytC described herein. Inhibitors can include siRNA or antisense RNA, genetically modified versions of tmytC protein, e.g., versions with altered activity, as well as naturally occurring and synthetic tmytC antagonists, antibodies, small chemical molecules and the like. TmytC inhibitors for use in the invention can be screened using methods are known in the art. Assays for identifying tmytC inhibitors can be performed in vitro or in vivo, e.g., in cells, or cell membranes, by applying test inhibitor compounds, and then determining the functional effects on activity.

In some embodiments, samples or assays comprising tmytC proteins that are treated with a potential inhibitor are compared to control samples without the inhibitor, to examine the effect on activity. Typically, control samples, e.g., cells, that have a wild type tmytC are assigned a relative protein activity value of 100%. Inhibition of tmytC is achieved when the activity value relative to the control is changed at least about 20%, at least about 50%, at least about 75-100%, or more.

5.0 DETAILED DESCRIPTION

*Tsukamurella* is a group of multi-drug resistant bacteria that is associated with various human infections. This previously lesser known group of bacteria has emerged in global scale in recent years and there are escalating cases of *Tsukamurella* infections reported in Europe, Asia, America and Africa. *Tsukamurella* species are commensal bacteria that are widespread in the environment and has been isolated from soil, arthropods, water, sludge foam and sponges. They are also opportunistic pathogens that can be spread through clinical instruments such as catheters. *Tsukamurella* is now increasingly recognized as a cause of bacterial conjunctivitis and keratitis. Moreover, our recent study, based on the largest number of *Tsukamurella* cases, showed that 40% of *Tsukamurella* isolates were recovered from ophthalmological specimens, much higher than that recovered from blood cultures. This indicates that ocular infections are the most important group of disease caused by *Tsukamurella*. Notably, cases of *Tsukamurella* keratitis and conjunctivitis have most probably been overlooked in the past because diphtheroidal gram-positive rods recovered from corneal scrapings and eye swabs were either regarded as contaminants or misidentified as other bacteria, such as atypical mycobacteria. In fact, the cause of many cases of conjunctivitis is unknown, likely due to the difficulty in identifying and relating these cases to *Tsukamurella* infection.

*Tsukamurella* keratitis is also associated with the wearing of contact lenses. As *Tsukamurella* is naturally found in the environment, even detected in drinking water supplies, there is a high risk of infection. However, we have found that common contact lens disinfecting solutions are ineffective against *Tsukamurella*. Moreover, previous studies have reported that *Tsukamurella* species are generally resistant to commonly used antibiotic eye drops prescribed for patients with bacterial ocular infections, such as chloramphenicol and tetracycline. Although some strains of *Tsukamurella* are susceptible to levofloxacin, another common antibiotic used in eye drops, we showed, using our rabbit keratitis model, that perforations with severe discharges accompanied by behavioral abnormalities were evident after treatment. There was an increased incidence of corneal perforation in patients after topical fluoroquinolone treatment. Hence, the prevention and therapeutic options for *Tsukamurella*-associated ocular infections are rather limited. Also, existing contact lens disinfecting solutions were not effective against many *Tsukamurella* species, such as *T. sinensis, T. hongkongensis, T. ocularis, T. hominis*, and *T. spumae*. and was unable to meet the ISO14729 stand-alone primary acceptance criteria for disinfecting solutions.

Provided herein is a method to reduce virulence of *Tsukamurella* comprising a step of decreasing the expression of tmytC gene wherein the reduction of the virulence is characterized by at least one of: (i) reduced biofilm formation; (ii) reduced adherence property; (iii) reduced polymorphonuclear leukocyte ("PMN") infiltration; (iv) reduced epithelial damage; and (v) reduced corneal bacterial loads.

Genome modification methods are well known in the art. In one embodiment, the expression of tmytC gene is decreased by a knock-out of the tmytC gene. In certain embodiments, the expression of tmytC gene is decreased to 0%-10%, 10%-30%, 30%-50%, 50%-70%, or 70%-90% of the tmytC gene expression as compared to a wild-type *Tsukamurella* that is without genome modification of the tmytC gene.

In one embodiment, the expression of tmytC gene is decreased by introducing a construct comprising CRISPR associated system Cas9 nuclease (CRISPR/Cas9).

In one embodiment, the expression of tmytC gene is decreased by introducing a homologous recombination construct comprising: (i) a vector comprising a promoter expressing a marker; (ii) a 5' flanking region of the tmytC gene; (iii) and a 3' flanking region of the tmytC gene.

Provided herein is a homologous recombination construct comprising: (i) a vector comprising a promoter expressing a marker; (ii) a 5' flanking region of the tmytC gene; (iii) and a 3' flanking region of the tmytC gene. In one embodiment, the promoter is a hsp60 promoter. In one embodiment, the marker is GalK. In one embodiment, the vector is p2NIL-GalK. In one embodiment, the 5' flanking region of the tmytC gene is about 200 bp-300 bp, 300 bp-500 bp, 500 bp-800 bp, 800 bp-1200 bp. In one embodiment, the 3' flanking region of the tmytC gene is about 200 bp-300 bp, 300 bp-500 bp, 500 bp-800 bp, 800 bp-1200 bp.

In one embodiment, the construct is pΔtmytC.

Provided herein is a modified *Tsukamurella* that does not express tmytC.

Provided herein is a method of treating an ocular bacterial infection in a subject, said method comprises a step of administering to the subject a homologous recombination construct comprising: (i) a vector comprising a promoter expressing a marker; (ii) a 5' flanking region of the tmytC gene; and (iii) a 3' flanking region of the tmytC gene.

In one embodiment, the ocular infection is caused by a multi-drug resistant *Tsukamurella*.

In one embodiment, the *Tsukamurella* infection is from *T. tyrosinosolvens, T. pulmonis, T. sinensis, T. hongkongensis, T. ocularis, T. hominis, T. spumae* or a combination thereof.

In one embodiment, the ocular infection is conjunctivitis, blepharitis and/or keratitis.

In one embodiment, the method provides at least a 3-log reduction in infection.

In one embodiment, the knock-out construct is pΔtmytC.

Provided herein is a method of treating or preventing ocular bacterial infection in a subject comprising a step of administering to the subject a composition comprising one or more tmytC inhibitors.

In one embodiment, the ocular bacterial infection is treated or prevented as characterized by at least one of: (i) reduced biofilm formation; (ii) reduced adherence property of the bacteria; (iii) reduced PMN infiltration; (iii) reduced epithelial damage; and (iv) reduced corneal bacterial loads.

In one embodiment, the ocular bacterial infection is treated or prevented by a combination therapy. In certain embodiments, the ocular infection may be treated with an anti-inflammatory agent. In certain embodiments, the anti-inflammatory agent comprises a steroidal anti-inflammatory or a non-steroidal anti-inflammatory agent or both. In certain embodiments, the anti-inflammatory agent comprises dexamethasone, diflurprednate, loteprednol, prednisolone acetate, ketotifen fumarate, diclofenac sodium, flurbiprofen sodium, ketorolac tromethamine, suprofen, celecoxib, naproxen, or rofecoxib, or a combination thereof.

In certain embodiments, an ophthalmic composition further comprises 0.0025%-0.08% of polyhexamethylene biguanide ("PHMB"), polyquaternium, myristamidopropyl dimethylamine or a combination thereof. In one embodiment, the bacterial infection is caused by a multi-drug resistant bacteria. In one embodiment, the bacterial infection is from *T. tyrosinosolvens, T. pulmonis, T. sinensis, T. hongkongensis, T. ocularis, T. hominis, T. spumae* or a combination thereof. In one embodiment, the bacterial infection is conjunctivitis and/or keratitis. In one embodiment, the method provides for at least a 3-log reduction in infection. The reduction in infection may be measured as disclosed in examples 6.1.2 and 6.4.9.

Provided herein is a method of preventing and treating ocular infection comprising a step of treating contact lens prior to wearing the contact lens by a subject with a composition comprising one or more tmytC inhibitors.

In one embodiment, the composition further comprises 0.0025%-0.08% of polyhexamethylene biguanide ("PHMB"), polyquaternium and/or myristamidopropyl dimethylamine or a combination thereof.

Provided herein is a pharmaceutical composition comprising one or more TmytC inhibitors; and optionally 0.0025%-0.08% of PHMB or myristamidopropyl dimethylamine or a combination thereof.

Also provided is an eye drop dispensing bottle comprising a composition for use in the treatment of prophylaxis of an ocular infection Provided herein is a construct with specific 5' ("upstream") and 3' ("downstream sequences") flanking region of the tmytC gene, which is a *Tsukamurella* mycolyltransferase. The construct allows for the specific deletion of the mycolyltransferase by homologous recombination. The resulting mycolyltransferase deletion mutant is a strain of *Tsukamurella* with greatly reduced virulence. Provided herein is a strain of *Tsukamurella* that does not express tmytC.

It was found that the adherence property of *Tsukamurella* to contact lens and abiotic surfaces, such as plastic ware, was significantly reduced in the deletion mutant. The ability to adhere is a key characteristic in biofilm formation, which is an essential factor in the pathogenesis of opportunistic bacteria. Hence, the loss of the ability to form biofilm reduces the ability of the pathogen to cause disease. Secondly, using the rabbit keratitis model, the keratitis symptoms in rabbits infected with the mycolyltransferase deletion mutant was less severe with less purulent discharge compared to those infected with wild type *Tsukamurella*. The rabbits infected with the deletion mutant also had a lower degree of PMN infiltration, reduced epithelial damage and significantly lower corneal bacterial loads, indicating greatly reduced virulence. Taken together, by knocking out *Tsukamurella* mycolyltransferase using the deletion construct, the virulence was significantly impacted.

Disclosed herein is a construct as a therapeutic strategy for the treatment of *Tsukamurella* keratitis that are important for specialists of different fields including clinicians, biochemists and chemists, ophthalmologists, opticians and scientists.

In one aspect, the disclosure provides a method to delete a target gene. In one aspect, the target gene is deleted through homologous recombination. In one aspect, the deletion of the target gene utilizes a homologous recombination construct. In one aspect, the construct comprises two homologous sequences having a length of 100-300, 300-500, 500-800, 800-1,000, 1,000-1,200 nucleotides. The construct comprises a promoter functionally linked to a marker, homologous sequences that are 5' flanking region region and 3' flanking region of the targeted gene. In one embodiment, the marker is galactokinase (GalK). Galactokinase is a key enzyme of galactose metabolism which phosphorylates D-galactose to generate galactose 1-phosphate. The enzyme can also convert 2-deoxy-D-galactose into 2-deoxygalactose-1-phosphate, which is not further metabolized and is toxic to the cell. This marker has been found to be more suitable for *Actinomyces* than other selectable makers. It is noted that one skilled in the art using the disclosure herein could use other recombinant techniques such as CRISPR to delete the target gene.

*Tsukamurella*, a group of multi-drug resistant, Gram-positive, aerobic and partially acid-fast bacteria, are emerging causes of bacterial conjunctivitis and keratitis. We developed a rabbit model of *Tsukamurella* keratitis to dissect its pathogenesis mechanisms and design preventive and treatment strategies. Four common contact lens solutions with the disinfectant, polyhexamethylene biguanide (PHMB), at concentrations 0.0001-0.00013% were ineffective in killing *Tsukamurella*, but increasing the concentration of PHMB to 0.0025% largely improved their antimicrobial efficacies against *Tsukamurella*. Moreover, 0.02% PHMB was highly effective in treating *Tsukamurella* keratitis in the rabbit model. Using genome sequence data followed by gene deletion and complementation studies, tmytC, encoding a mycolyltransferase, was shown to have an important role in causing *Tsukamurella* keratitis in the rabbit model. This is also the first report demonstrating the novel role of mycolyltransferase in causing ocular infections. Specific inhibitors targeting TmytC, alone or in combination with PHMB, could serve as an armamentarium for the treatment of *Tsukamurella* infections.

In certain embodiments, the bacterial infection is caused by a multi-drug resistant and gram-positive, aerobic and partially acid-fact bacteria. In one embodiment, the bacteria is *Tsukamurella*. In certain embodiments, the bacteria is *T. tyrosinosolvens*-PW899 and *T. pulmonis* PW1004.

In certain embodiments, the ocular infection is mediated by mycolyltransferase C ("tmytC"). In certain embodiments, the method further comprises a step of treating the subject with one or more TmytC inhibitors.

In certain embodiments, the method provides at least a 3-log reduction of an infection. In certain embodiments, the method provides a 2-log to 3-log reduction of an infection. In certain embodiments, the method provides a 3-log to 4-log reduction of an infection. In certain embodiments, the method provides a 4-log to 5-log reduction of an infection.

In certain embodiments, the ophthalmic composition further comprises 0.0025%-0.02% of PHMB. In certain embodiments, the composition comprises 0.0025%-0.005% of PHMB. In certain embodiments, the composition comprises 0.0025-0.003%, 0.003%-0.004%, 0.004%-0.005% of PHMB. In one embodiment, the composition comprises 0.0025% of PHMB. In one embodiment, the composition comprises 0.02% of PHMB. In certain embodiments, the composition comprises 0.02%-0.08% of PHMB. In certain embodiments, the composition comprises 0.02%-0.03%, 0.03-0.04%, 0.04-0.05%, 0.05-0.06%, 0.06-0.07%, 0.07-0.08%, 0.08-0.09%, 0.08-0.1% of PHMB. In certain embodiments, the composition comprises 0.0025%-0.08% of PHMB.

In certain embodiments, the composition is administered for 1-2 days, 2-3 days, 3-4 days, 4-5 days, 5-7 days to the subject.

In certain embodiments, the ocular disease or infection is of bacterial, mycobacterial, fungal, viral, or amoebal origin. In one embodiment, the infection is caused by *Acanthamoeba*.

In one embodiment, the composition does not contain levofloxacin.

In one embodiment, the composition is a contact lens solution.

5.1 Pharmaceutical Composition

Pharmaceutically acceptable carrier refers to a pharmaceutically acceptable material, formulation or vehicle, such as a liquid or solid filler, diluent, excipient, solvent or encapsulating material, involved in carrying or transporting the active compound from one organ or portion of the body, to another organ or portion of the body. Each carrier must be "acceptable" in the sense of being compatible with the other components of the composition (e.g., synthetic compound) and not injurious to the subject. Lyophilized compositions, which may be reconstituted and administered, are also within the scope of the present disclosure.

Ophthalmic composition may be formulated in any manner suitable for topical administration to an eye of a patient. Numerous suitable topical ophthalmic drug forms are well-known (see, e.g. Baranowski et al., The Scientific World Journal, Vol. 2014, Article ID 861904, incorporated herein by reference). The ophthalmic composition may further comprising an excipient that is a polyvinyl alcohol, polypropylene glycol, a carbomer, polycarbophil, a polyoxyethlene-polyoxypropylene block copolymer, hydroxypropyl cellulose, hydroxypropyl methyl cellulose, carboxymethyl cellulose, hydroxyethyl cellulose, hyaluronic acid, dextran, chondroitin sulfate, gellan gum, xanthan gum, guar gum, trehalose, tamarind seed polysaccharide, or a cyclodextrin, or any combinations of any two or more of the foregoing excipients.

Pharmaceutically acceptable carriers may be, for example, excipients, vehicles, diluents, and combinations thereof. For example, where the compositions are to be administered orally, they may be formulated as tablets, capsules, granules, powders, or syrups; or for parenteral administration, they may be formulated as injections (intramuscular, subcutaneous, intramedullary, intrathecal, intraventricular, intravenous, intravitreal), drop infusion preparations, or suppositories. For application by the ophthalmic mucous membrane route, they may be formulated as eye drops or eye ointments. These compositions can be prepared by conventional means, and, if desired, the active compound may be mixed with any conventional additive, such as an excipient, a binder, a disintegrating agent, a lubricant, a corrigent, a solubilizing agent, a suspension aid, an emulsifying agent, a coating agent, or combinations thereof.

It should be understood that the pharmaceutical compositions of the present disclosure can further include additional known therapeutic agents, drugs, modifications of the synthetic compounds into prodrugs, and the like for alleviating, mediating, preventing, and treating the diseases, disorders, and conditions described herein.

In one embodiment, the compositions are provided in an aqueous delivery system. Aqueous delivery systems are water-based systems, which can be instilled directly in the eye, or may be used to condition, store, or clean ophthalmic devices which are placed in the ocular environment. Examples of aqueous delivery systems can include one or more of the following: packing solutions, storing solutions, cleaning and care solutions, multipurpose solutions, conditioning solution and ophthalmic drops. The aqueous delivery systems may also include known components, such as one or more of emulsifiers, chelating agents, or stabilizers, surfactants, wetting agents, antioxidants, tonicity adjusting agents, preservatives, osmoprotection agents, combinations thereof, and the like. In certain embodiments, the compositions may be formulated as 0.01 to 2.0 percent by weight solutions in water at a pH of 4.5 to 8.0.

The packaging solution may be any water-based solution including that which is used for the storage of contact lenses. The compositions are dispersed in the packaging solution. Typical solutions include, without limitation, saline solutions, other buffered solutions, and deionized water. The preferred aqueous solution is saline solution containing salts including, without limitation, sodium chloride, sodium borate, sodium phosphate, sodium hydrogenphosphate, sodium dihydrogenphosphate, or the corresponding potassium salts of the same. These ingredients are generally combined to form buffered solutions that include an acid and its conjugate base, so that addition of acids and bases cause only a relatively small change in pH. The buffered solutions may additionally include citric acid, sodium citrate, sodium carbonate, sodium bicarbonate, acetic acid, sodium acetate, and the like and combinations thereof. Preferably, the solution is a borate buffered or phosphate buffered saline solution.

To form the packaging solution, at least one surfactant or emulsifier along with any additional ingredients are combined with the water-based solution, stirred, and dissolved or dispersed. The pH of the solution preferably is adjusted to about 6.2 to about 7.5. The lens to be stored in the packaging solution of the invention is immersed in the solution and the solution and lens placed in the package in which the lens is to be stored. Alternatively, the solution may be placed into the package and the lens then placed into the solution. Typically, the package is then sealed by any convenient method, such as by heat sealing, and undergoes a suitable sterilization procedure.

The surfactants suitable for use in the disclosure are of any suitable molecular weight, preferably about 200 to about 1,000,000, more preferably about 1000 to about 18,000. Useful surfactants have a hydrophile-lipophile balance ("HLB") of about 10 to about 30, preferably about 15 to about 25, more preferably about 15 to about 23.

Any of the known surfactants fitting the aforementioned criteria may be used provided that the surfactant is compatible, in terms of solubility, in the solution with which it is used. Thus, suitable surfactants include, without limitation, cationic, ionic, non-ionic surfactants, and combinations thereof. However, the use of a lens packaging solution containing cationic and ionic surfactants may cause eye irritation.

Suitable non-ionic surfactants include, without limitation, polyethylene glycol esters of fatty acids, such as polysorbate 20, 60 or 80, all available as TWEEN® surfactants, alkanolamides, amine oxides, ethoxylated alcohols and acids, and surfactants having one or more poly(oxyalkylene) chains, such as poloxamine surfactants (a surface-active agent that removes lipid and environmental debris from the lenses; polyalkoxylated block polymers of ethylene diamine) or poloxamer surfactants (any of a series of nonionic surfactants of the polyoxypropylene-polyoxyethylene copolymer type, used as surfactants, emulsifiers, stabilizers, and food additives), and the like, and combinations thereof.

The surfactant may be combined with any known active and carrier components useful for lens packaging solution or for a rewetting drop. Suitable active ingredients for lens packaging solutions include, without limitation, antibacterial agents, anti-dryness agents, such as polyvinyl alcohol, polyvinylpyrrolidone, and dextran, tonicity agents, and the like, and combinations thereof Suitable wetting agents, along with viscosity enhancers include, without limitation: methyl gluceth-20 (sold under the trade name, for example, Glucam E20), carboxymethylcellulose, dextran 70, gelatin, hydroxymethylcellulose, hydroxypropyl methylcellulose, hydroxypropylethylcellulose, hydroxypropyl cellulose, methylcellulose, PEG, propylene glycol, polyvinyl alcohol (PVA), polyvinylpyrrolidone (PVP), Carbomer, polymethylvinylethermaleic anhydride, hyaluronic acid, xanthan gum, and polyacrylic acid.

Suitable antioxidants used in this disclosure include, without limitation, hindered phenols, catechols, tocopherols, carotenoids, hyaluronic acid, lutein, or any species that can scavenge free radicals. Antioxidants are molecular species that inhibit oxidative damage of other chemicals through redox chemical reactions. These reactions typically transfer electrons for a molecule species to an oxidant molecule. These can include free radicals, which can cause chain reactions. In simplest terms, antioxidants are reducing agents. Examples of antioxidants include, without limitation: Vitamin E, Vitamin C, beta carotene (which is converted to Vitamin A), and peroxidases, and other agents which can inhibit the formation of free radicals, e.g., chelating agent, EDTA, diethylene triamine pentaacetic acid (DTPA), N, N-bis[carboxymethyl]glycine (NTA), and the like.

In some embodiments, Vitamin E is added to a composition. In one embodiment, the compositions are hydrolytically stable at neutral pH, and do not hydrolyze during storage in the pH neutral ophthalmic composition and sterile preparations. This means that the ophthalmic solutions and sterile preparations do not cause stinging when instilled in the eye. In some embodiments, the topical application of a composition comprising is an effective therapeutic strategy to decrease ocular surface infection. As discussed herein the infection of the ocular surface can be seen in, for example, both anterior segment/front of the eye conditions and back of the eye conditions. In one embodiment, the disclosed method improves the interaction between the lens and the tear film and/or the lids.

5.2 Effective Dose

A therapeutically effective amount of the composition disclosed herein is an amount effective to produce a clinically recognizable favorable change in the pathology of the disease or condition being treated. A therapeutically effective amount includes those effective to treat, reduce, alleviate, ameliorate, mitigate, eliminate or prevent one or more symptoms of the ocular conditions sought to be treated or the condition sought to be avoided or treated. One of skill in the art would readily be able to determine what is a therapeutically effective amount or an effective amount. Suitable dosages of the composition for use in the methods of the present disclosure will depend upon a number of factors including, for example, age and weight of an individual, severity of ocular disease, specific composition to be used, nature of a composition, route of administration and combinations thereof. Ultimately, a suitable dosage can be readily determined by one skilled in the art such as, for example, a physician, a veterinarian, a scientist, and other medical and research professionals. For example, one skilled in the art can begin with a low dosage that can be increased until reaching the desired treatment outcome or result.

Alternatively, one skilled in the art can begin with a high dosage that can be decreased until reaching a minimum dosage needed to achieve the desired treatment outcome or result.

In one particularly suitable embodiment, the composition is administered in a dosage ranging from about 0.1 µg to about 300 mg. In one particularly suitable embodiment, the composition is administered oral as a tablet or capsule once a day. Administration of an effective amount of the composition may be by a single dose, multiple doses, as part of a dosage regimen, and combinations thereof as determined by those skilled in the art for the relevant mechanism or process. The dosage regimen may vary depending on the symptoms, age and body weight of the subject, the nature and severity of the disorder to be treated or prevented, the route of administration and the form of the drug. In one embodiment, the composition is administered via intravitreal injection to the subject and is administered once a month. In another embodiment, the composition is administered via eye drop or eye ointment to the subject and is administered once a day. In yet another embodiment, the composition is administered via eye drop or eye ointment to the subject and is administered twice a day.

In certain embodiments, the compositions of the present disclosure may be administered topically on the eye. The dosage range may be about 0.001 mg to about 5.0 mg/per eye. In one aspect, the dosage for one eye may be about one drop of solution which corresponds to about 50 µl to about 80 µl of solution.

In certain embodiments, the composition may be topically applied by placing one to two drops, or more, in each eye 1 to 24 times daily. For example, the composition may be applied 1, 2, 3, 4 or 8, 12, 18 or 24 times a day, or more. In an embodiment, a composition of the present disclosure is topically applied by placing one to two drops in each eye once or twice daily.

In certain embodiments, the ophthalmic compositions can also be tested in a selected animal model.

5.3 Methods of Treatment

The disclosed composition can also be administered to a subject that has been identified in need thereof as described herein. The subject can be suffering or having ocular infections. One in skill in the art would know how to identify the subject in need of a treatment for ocular infections.

Provided herein is a treatment of an ocular infection when the ophthalmic composition is administered to an eye of a subject, or the prevention of an ocular infection when the ophthalmic composition is administered to an eye of a patient before or after the introduction of an inoculum of an ocular pathogen. The method disclosed herein is effective to treat or prevent infection following an ophthalmic surgery or an ophthalmic procedure.

The present disclosure can also be administered to a subject to mitigate at least one sign and/or symptom of ocular infection.

When the disclosed composition is loaded onto a contact lens for delivery to the eye during contact lens wear, the composition can be held on to the eye via the contact lens long enough to be delivered efficiently to the eye in order provide relief to individuals suffering from ocular infection.

In one aspect of the disclosure, a method is provided for administering a nucleic acid to a pathogen that causes ocular infection in a subject. An amount of a composition is administered to an eye of the subject where the pathogen is present. The composition comprises a vehicle that carries the homologous recombination construct to reduces the expression of a gene in the pathogen. These aspects and others which will be apparent to those of skill in the art upon reading the specification provide the art with a method of treating ocular disorders without causing appreciable damage to the eye.

In one embodiment, the homologous recombination construct is delivered to the bacteria at the site of bacterial infection where the construct is packaged into a bacteriophage. The phage attaches to a bacterium and injects the genetic material into the bacterial cytoplasm. One skilled in the art knows the genome-editing potential of bacteriophage as described in Pennisi E. 2020 Science doi:10.1126/science "Microbes-mystery-dna-helps-defeat-viruses-and-has-genome-editing-potential". The bacteriophage carrying the construct can be administered in the form of eye drops, contact lens solution or additive which may allow therapeutic and potential prophylactic uses of the phage against the bacteria. In one embodiment, the homologous recombination construct is delivered to the bacteria at the site of bacterial infection where the construct is packaged into a nanoparticle.

5.4 Genome Modification

Recent advances in genome engineering have enabled the manipulation and/or introduction of virtually any gene across a diverse range of cell types and organisms. In particular, the advent of site-specific designer nucleases has enabled site-specific genetic modifications by introducing targeted breaks into a host cell genome, i.e., genome editing. These nucleases include zinc finger nucleases (ZFNs), transcription activator-like effector nucleases (TALENs), and clustered regulatory interspaced short palindromic repeats CRISPR/Cas (CRISPR-associated)-based RNA-guided endonucleases. ZFNs have been utilized, inter alia, to modify target loci in crops (Wright et al., Plant J 44:693-705 (2005)), to improve mammalian cell culture lines expressing therapeutic antibodies (Malphettes et al., Biotechnol Bioeng 106(5):774-783 (2010)), and to edit the human genome to evoke resistance to HIV (Urnov et al., Nat Rev Genet 11(9):636-646 (2010)). Similarly, TALENs have been utilized to modify a variety of genomes, including those of crop plants (Li, et al., Nat. Biotechnol. 30: 390-392 (2012)), human, cattle, and mouse (Xu et al., Molecular Therapy Nucleic Acids 2, e112 (2013)). More recently, CRISPRs have been successfully utilized to edit the genomes of bacteria (e.g., Jiang et al., Nature Biotechnology 31(3):233-239 (2013); Qi et al., Cell, 5, 1173-1183 (2013); yeast (e.g., DiCarlo et al., Nucleic Acids Res., 7, 4336-4343 (2013)); zebrafish (e.g. Hwang et al., Nat. Biotechnol., 3, 227-229 (2013)); fruit flies (e.g., Gratz et al., Genetics, 194, 1029-1035 (2013)); human cells (e.g., Cong et al., Science 6121, 819-823, (2013); Mali et al., Science, 6121, 823-826 (2013); Cho et al., Nat. Biotechnol., 3, 230-232 (2013)); and plants (e.g., Jiang et al., Nucleic Acids Research 41(20):e188 (2013)); Belhaj et al., Plant Methods 9(39) (2013)).

In one embodiment, the treatment and prevention of the ocular infection may be carried out using various gene targeting methods. In one embodiment, bacterial genome disclosed herein is modified by homologous recombination or knock-out which is the exchange of homologous segments along a length of two nucleic acid molecules. In one embodiment, provided herein are methods of integrating exogenous nucleic acids in the form of a construct with a selectable marker into a selected target sites of a host cell genome. In certain embodiments, the methods comprise contacting the host cell genome, e.g. bacterial host cell genome, with a construct comprising an exogenous nucleic acid to undergo a homologous recombination and further comprises selecting a host cell that expresses the selectable marker. This results in the target gene being knocked-out or rendered not functional.

The methods and techniques of the present disclosure are generally performed according to methods well known in the art and as described in various general and more specific references that are cited and discussed throughout the present specification unless otherwise indicated. Such references include, e.g., Sambrook and Russell, Molecular Cloning, A Laboratory Approach, Cold Spring Harbor Press, Cold Spring Harbor, N.Y. (2001), Ausubel et al., Current Protocols in Molecular Biology, John Wiley & Sons, NY (2002), and Harlow and Lane Antibodies: A Laboratory Manual, Cold Spring Harbor Laboratory Press, Cold Spring Harbor, N.Y. (1990). Enzymatic reactions and purification techniques are performed according to manufacturer's specifications, as commonly accomplished in the art or as described herein. The nomenclatures used in connection with, and the laboratory procedures and techniques of, analytical chemistry, synthetic organic chemistry, and medicinal and pharmaceutical chemistry described herein are those well-known and commonly used in the art. Standard techniques are used for chemical syntheses, chemical analyses, pharmaceutical preparation, formulation, and delivery, and treatment of patients.

Various functions and advantages of these and other embodiments of the present disclosure will be more fully understood from the examples shown below. The examples are intended to illustrate the benefits of the present disclosure, but do not exemplify the full scope of the disclosure.

6. EXAMPLES

6.1 Results 6.1.1. Rabbit model of *Tsukamurella* keratitis. To understand the pathogenesis of *Tsukamurella* keratitis, we developed an eye infection model using New Zealand White (NZW) rabbits. We inoculated *T. pulmonis*-PW1004 at $10^6$ colony-forming units (CFUs)/cornea by direct intrastromal injection and the pathological changes of the infected rabbit eyes were monitored daily. At 24 hours (h) post-infection (PI), the rabbit corneas started to develop gross pathological signs of infection, including severe iritis, ocular discharge, corneal infiltrate, corneal erosions and dense corneal opacity, with increasing severity observed over time (FIG. 1A). On the other hand, we did not observe any pathological signs in control rabbits injected with plain culture medium only (Supplementary FIG. 1). At 24 h PI, pure cultures of *Tsukamurella* at 6.64±0.46 log CFU/cornea were recovered from the infected rabbits (FIG. 1B). Active infection was confirmed by the detection of *T. pulmonis*-PW1004 antigens by immunohistochemical staining using specific anti-*T. pulmonis* antibodies. Strong staining against *T. pulmonis* could be detected in corneal sections from rabbits infected with *T. pulmonis*-PW1004 (top, FIG. 1C) but not from the control rabbits (bottom, FIG. 1C). Specificity of the anti-*T. pulmonis* antibodies was verified by staining the corneal sections using mouse pre-immune control serum (middle, FIG. 1C). Large amount of inflammatory cell infiltration was observed with the hematoxylin counterstain in the corneal sections from the *T. pulmonis*-infected rabbits (top and middle, FIG. 1C). This was in line with the results of the myeloperoxidase (MPO) activity assay, which quantified tissue polymorphonuclear leukocyte (PMN) accumulation. MPO activities increased to 3.87±0.26 U/mg in the corneal homogenates from rabbits infected with *T. pulmonis*-PW1004 compared to those from rabbits of the control group (FIG. 1D). To fulfill the Koch's postulates, we used *T. pulmonis*-PW1004 recovered from the cornea of a rabbit to infect other rabbits using the same route of inoculation. Results consistently showed that the infected rabbit developed similar signs and symptoms of keratitis and histopathological changes at 24 h PI.

6.1.2 Antimicrobial efficacies of contact lens solutions against *Tsukamurella*. Contact lens wear is one of the leading risk factors for bacterial keratitis, and indeed some of the patients with *Tsukamurella* keratitis had histories of contact lens wear[5,11]. We attempted to examine the antimicrobial efficacies of contact lens solutions commonly available in the market against different clinically important *Tsukamurella* species (*T. tyrosinosolvens*, *T. pulmonis*, *T. sinensis*, *T. hongkongensis*, *T. ocularis*, *T. hominis*, and *T. spumae*) (Table 1), based on the test procedures described in the International Organization for Standardization (ISO) 14729 guidelines[13]. According to the guideline, the contact lens solution is considered effective if it can reduce the starting concentration of bacteria by 3-log at the minimum disinfecting time recommended by the manufacturer (Table 1). Results showed that the 4 tested contact lens solutions demonstrated good efficacies (>5-log reduction) against the control strain *P. aeruginosa* ATCC27853, but the solutions only achieved 0.27±0.16- to 1.34±0.01-log reductions for the *Tsukamurella* species (FIG. 2A). These results suggested that the formulation components of these contact lens solutions were not effective against *Tsukamurella* species and was unable to meet the ISO14729 stand-alone primary acceptance criteria for disinfecting solutions.

6.1.3 Antimicrobial efficacies of PHMB against *Tsukamurella*. PHMB is one of the main antibacterial agents commonly found in contact lens solutions and has been successfully used for the treatment of *Nocardia* and *Acanthamoeba keratitis*[14,15]. Three of the 4 contact lens solutions tested in the study also contained PHMB, with concentrations ranging from 0.0001 to 0.00013% (Table 1). We speculated that by increasing the amount of PHMB in these contact lens solutions, the efficacy of these solutions against *Tsukamurella* may be improved. Therefore, the in vitro susceptibility of *T. pulmonis*-PW1004 to a series of PHMB concentrations (0, 0.0005, 0.001, 0.0025, and 0.005%) was preliminary tested using the disk diffusion method. Zones of inhibition were evident at PHMB concentrations of 0.0025% and 0.005% (Table 2). This increased susceptibility of *Tsukamurella* to PHMB was further demonstrated using *T. pulmonis*-PW1004 and *T. tyrosinosolvens*-PW899. By performing in vitro susceptibility testing according to ISO14729, we found that 0.0025%, but not 0.0005% or 0.001%, of PHMB could achieve 3-log reductions in the 2 *Tsukamurella* species (FIG. 2B). However, bacterial numbers could not be further reduced by increasing the concentration to 0.005% (FIG. 2B). Therefore, antimicrobial efficacy of the 4 contact lens solutions against *Tsukamurella* was tested again by adjusting the final concentrations of PHMB to 0.0025%. Results showed that all the solutions were capable of achieving 3-log reductions for all tested *Tsukamurella* strains (FIG. 2C), suggesting that 0.0025% PHMB may be the optimal concentration against *Tsukamurella* in vitro.

6.1.4 Treatment of experimental *Tsukamurella* keratitis using PHMB or levofloxacin in rabbits. Chloramphenicol and levofloxacin are common eye drops prescribed for patients with bacterial ocular infections. Since *Tsukamurella* species are generally resistant to chloramphenicol[3,12], we attempted to study the treatment efficacy of 0.5% levofloxacin and 0.02% PHMB for *Tsukamurella* keratitis using the rabbit model. Twelve rabbits were divided into 3 groups, with each group containing 4 rabbits, and were infected intrastromally with *T. pulmonis*-PW1004 as described previously. Treatment was started at 24 h PI when the typical symptoms of keratitis, with stromal infiltrates on corneal surface, corneal neovascularization and opacity, and sticky yellowish-white discharges were evident. One group of rabbits was treated with sterile saline, while the other two groups were treated with 0.5% levofloxacin and 0.02% PHMB respectively, following the treatment regimens as described in previous studies[16,17]. For the rabbits treated with 0.5% levofloxacin, corneal perforations with severe discharges accompanied by behavioral abnormalities were evident after treatment for 2 days. The rabbits were sacrificed and the experiment discontinued. On the other hand, keratitis symptoms became less severe in rabbits after treatment with 0.02% PHMB for 3 days, with the gross appearance showing a lower degree of corneal neovascularization and opacity compared to control rabbits (FIG. 3A). Consistently, histological examination revealed a lower degree of stromal edema as well as capillary formation in the PHMB-treated rabbits (FIG. 3B). PMN infiltration was also less evident in this treatment group, in which the number of neutrophils was lower in the corneal stroma and the corneal epithelium (FIG. 3B). The number of bacteria recovered from rabbits treated with PHMB was significantly lower compared to the control rabbits treated with saline (3.58±0.49 log vs 1.05±0.07 log, P<0.01, FIG. 3C). Unlike the rabbits treated with levofloxacin, we did not observe corneal perforation in rabbits treated with PHMB throughout the whole course of treatment. These results suggest that topical application of 0.02% PMHB demonstrated good efficacy against *Tsukamurella* keratitis without apparent toxicity, making it a potential choice for the treatment of this infection.

6.1.5 Genome sequencing and analysis of *T. tyrosinosolvens*-PW899 and *T. pulmonis*-PW1004. The present rabbit model confirmed the causal relationship between *Tsukamurella* and keratitis, yet the pathogenesis of *Tsukamurella* remained unknown. We attempted to sequence *Tsukamurella* genomes to identify potential virulence factors associated with *Tsukamurella*-mediated ocular infections. The draft genomes of *T. tyrosinosolvens*-PW899 and *T. pulmonis*-PW1004, 2 strains previously isolated from patients with ocular infections[5,6], were sequenced and assembled (FIGS. 7A and 7B). Sequencing generated 11-15 million paired-end reads per strain (estimated 410-540× coverage). After de novo assembly, the draft genome of *T. tyrosinosolvens*-PW899 was 4.88 Mb in length distributed in 307 contigs (>500 bp), and that of *T. pulmonis*-PW1004 was 4.60 Mb in length distributed in 245 contigs (>500 bp) (GenBank accession numbers of *T. tyrosinosolvens*-PW899 and *T. pulmonis*-PW1004 are QPKD00000000 and QQQF00000000, respectively) (Table 3). All contigs generated were submitted to the RAST version 2.0 (Rapid Annotation using Subsystem Technology) annotation server, resulting in 4,558 protein-coding sequences (CDSs), 3 rRNA operons and 49 tRNA-encoding genes for *T. tyrosinosolvens*-PW899 and 4,241 CDSs, and 3 rRNA operons, and 47 tRNA-encoding genes for *T. pulmonis*-PW1004 (Table 3). Each CDS in the 2 genomes was further classified into different categories in Clusters of Orthologous Groups of proteins (COGs) (FIG. 7C) and subsystems in RAST (FIG. 7D) based on their predicted functional roles. Specifically, the two *Tsukamurella* genomes contained a number of putative genes that may be involved in pathogenesis (Table 4). Among these, 3 homologs of a gene encoding mycolyltransferase were identified in both genomes of *T. tyrosinosolvens*-PW899 and *T. pulmonis*-PW1004. Previous studies have shown that proteins which possess mycolyltransferase activities play significant roles in various important biological roles, in members of Corynebacteriales[18,19]. For this reason, we attempted to study the role of these homologs and in the pathogenesis of *Tsukamurella* keratitis.

The 3 mycolyltransferase-encoding homologs identified in both *Tsukamurella* genomes were designated as tmytA (*Tsukamurella* mycolyltransferase A), tmytB and tmytC respectively (FIG. 4). The size of the 3 mycolyltransferase homologs varied from 963 to 1,632 bp, as a result of the lack of a C-terminal region in tmytB and tmytC. Their N-terminal regions in *T. tyrosinosolvens*-PW899 and *T. pulmonis*-PW1004 shared 38.1-68.9% and 38.9-69.6% amino acid (aa) identities respectively (FIG. 4). Phylogenetically, they were most closely related to the mycolyltransferase of *Williamsia limnetica*, also a member of Corynebacteriales, sharing 44-45% aa identities. Detailed annotation of the gene sequences revealed the presence of critical aa residues Ser-125, Asp/Glu-229 and His-261 in their N-terminal regions, which forms a catalytic triad (FIG. 4). This is a typical feature of other characterized mycolyltransferases and is essential for mycolyltransferase activity[19-22]. To further characterize the functional role of the mycolyltransferase homologs in *Tsukamurella*, individual knockout mutant strains (PW1004ΔtmytA, PW1004ΔtmytB and PW1004ΔtmytC) were constructed respectively in *T. pulmonis*-PW1004.

6.1.6 Reduced virulence in tmytC knockout mutant in rabbits. We hypothesized that tmytC encoding protein is one of the major factors contributing to bacterial virulence in *Tsukamurella* keratitis. Therefore, we examined the importance of TmytC in the pathogenesis of *Tsukamurella* keratitis in vivo by inoculating rabbit corneas with PW1004-WT, PW1004ΔtmytC and PW1004ΔtmytC/ptmytC respectively via intrastromal injection. The keratitis symptoms in rabbits infected with PW1004ΔtmytC were less severe with less purulent discharge compared to those infected with PW1004-WT and PW1004ΔtmytC/ptmytC (FIG. 5A). On day 2 PI, the rabbits were sacrificed and their corneas harvested for histopathological studies and bacterial counts. Consistent to the gross appearance of the eyes (FIG. 5A), histopathological examination of the corneal tissues revealed a lower degree of polymorphonuclear leukocyte ("PMN") infiltration in rabbits infected with PW1004ΔtmytC as compared to PW1004-WT and PW1004ΔtmytC/ptmytC, where PMN infiltration was apparent in corneal stroma and stromal edema was prominent (FIG. 5B). In addition, PW1004-WT and PW1004ΔtmytC/ptmytC showed a disordered arrangement of the epithelial layer with focal loss of superficial epithelial cells, and shrinkage of the Bowman's membrane (FIG. 5B). Such damages were minimally apparent in PW1004ΔtmytC and absent in the normal corneal sections (FIG. 5B). Moreover, the corneal bacterial loads of PW1004-WT and PW1004ΔtmytC/ptmytC were significantly higher than that of PW1004ΔtmytC ($P<0.05$), which showed only about 5% recovery rate on day 2 PI (FIG. 5C). Taken together, these results suggested that TmytC contributes to the pathogenesis of *Tsukamurella* keratitis using in vivo rabbit model.

6.1.7 Identification of Mycolyltransferase Homologs.

The 3 mycolyltransferase-encoding homologs identified in both *Tsukamurella* genomes were designated as tmytA (*Tsukamurella* mycolyltransferase A), tmytB and tmytC respectively (FIG. 11A). The size of the 3 mycolyltransferase homologs varied from 963 to 1,632 bp, as a result of the lack of a C-terminal region in tmytB and tmytC. Their N-terminal regions in *T. tyrosinosolvens*-PW899 and *T. pulmonis*-PW1004 shared 38.1-68.9% and 38.9-69.6% amino acid (aa) identities respectively (FIG. 11A). Phylogenetically, they were most closely related to the mycolyltransferase of *Williamsia limnetica*, also a member of Corynebacteriales, sharing 44-45% aa identities. Detailed annotation of the gene sequences revealed the presence of critical aa residues Ser-125, Asp/Glu-229 and His-261 in their N-terminal regions, which forms a catalytic triad (FIG. 11A). This is a typical feature of other characterized mycolyltransferases and is essential for mycolyltransferase activity. To further characterize the functional role of the mycolyltransferase homologs in *Tsukamurella*, individual knockout mutant strains (PW1004ΔtmytA, PW1004ΔtmytB and PW1004ΔtmytC) were constructed respectively in *T. pulmonis*-PW1004. Biofilm phenotypes in vitro and virulence in vivo of each mutant strain were studied and compared to those of wild-type and/or complemented strains.

6.1.8 Characterization of Biofilm Phenotypes in Wild-Type PW1004 and the 3 tmyt Knockout Mutants Non-polar deletions of tmytA, tmytB, and tmytC respectively were successfully constructed in *T. pulmonis*-PW1004. We hypothesized that knockout of the tymt gene may impair biofilm formation in *Tsukamurella*. To investigate this, the wild-type and 3 tymt knockout mutants of *T. pulmonis*-PW1004 were cultured under static conditions to allow the formation of biofilms. Results showed that dense and confluent biofilms were formed as a floating pellicle at the air-liquid interface in PW1004ΔtmytA, PW1004ΔtmytB, and wild-type PW1004 (PW1004-WT), whereas less textured and reticulated biofilms were formed in PW1004ΔtmytC (FIG. 11B). Biofilm quantification using the crystal violet staining method showed that the amount of biofilms was significantly reduced in PW1004ΔtmytC compared to PW1004-WT (P<0.01), while PW1004ΔtmytA and PW1004ΔtmytB produced similar levels of biofilm as PW1004-WT (FIG. 11C). To rule out the possibility that knockout of tmyt genes may alter growth kinetics and hence biofilm formation, we measured the growth kinetics of the wild-type and knockout mutants and found that there was no significant difference between the growth rates of the wild-type and knockout mutants. To confirm the importance of TmytC in *T. pulmonis* biofilm formation, we transformed a TmytC expression plasmid (pNV18-tmytC) into PW1004ΔtmytC and studied the subsequent biofilm characteristics. Results showed that PW1004ΔtmytC complemented with TmytC (PW1004ΔtmytC/ptmytC) restored the biofilm phenotype with biofilm quantity levels similar to that of PW1004-WT (FIG. 11B, C). Independently, we performed a scanning electron microscopy (SEM) analysis to study the biofilm structure of WT, tmytC-knockout and complemented PW1004. Results showed that the biofilm formed by PW1004-WT was highly structured. Deletion of the tmytC gene, however, resulted in the formation of flatter and less structured biofilms (middle, FIG. 11D), whereas PW1004ΔtmytC/ptmytC complemented mutant displayed similar biofilm phenotypes as PW1004-WT. The results were further supported by confocal microscopy analysis, in which optical sectioning along the Z axis showed reduced biofilm formation with an average thickness of 20.63±3.00 m in PW1004ΔtmytC compared to those of 31.17±4.33 m and 28.08±3.25 m in the wild-type and complemented mutant, respectively ($P<0.001$), with no significant difference in the thickness of the biofilm formed between the wild-type and complemented mutant (FIG. 11E). Collectively, the results supported that deletion of tmytC gene, but not tmytA or tmytB genes, perturbed the biofilm-forming capacity of *T. pulmonis*-PW1004, suggesting that mycolyltransferase contributes significantly to biofilm formation in *T. pulmonis.*

6.1.9 Reduced Bacterial Adhesion on Contact Lens in tmytC Knockout Mutant

Adhesion ability is a key characteristic related to biofilm formation. Since there was an apparent change in the biofilm phenotypes and impaired biofilm formation capacity of PW1004ΔtmytC (FIG. 1B-E), we speculated that *Tsukamurella* adherence to abiotic materials, such as contact lenses, may also be altered. Therefore, the adhesion ability of PW1004-WT, PW1004ΔtmytC and PW1004ΔtmytC/ptmytC to contact lenses was determined quantitatively. Results showed that initially all three strains were able to form a thin layer of cells over the entire surface of the contact lens. However, after subsequent mechanical detachment, washing and re-culturing, the number of bacteria recovered from the contact lenses inoculated with PW1004ΔtmytC (3.62±0.17 log CFU) was significantly lower compared to those inoculated with PW1004-WT (5.46±0.05 log CFU) and PW1004ΔtmytC/ptmytC (5.13±0.19 log CFU), respectively ($P<0.05$) (FIG. 12A). Consistently, during the culturing process of the three bacterial strains, a ring of cells adhering to the air-liquid interface was observed in the culture tubes of PW1004-WT and PW1004ΔtmytC/ptmytC, but not PW1004ΔtmytC (FIG. 12). In contrast to PW1004-WT and PW1004ΔtmytC/ptmytC, a large cell pellet was observed at the bottom of the culture tube of PW1004ΔtmytC (FIG. 12), implicating its weaker adhesion to plastic tubes. Collectively, these results demonstrated that the tmytC knockout mutant possessed reduced adhesion ability to contact lenses and abiotic surface (i.e., plastic culture tube), suggesting that TmytC played a role in the adherence of *Tsukamurella* to abiotic surfaces in vitro.

6.1.10 Decreased Cell Surface Hydrophobicity in the tmytC Knockout Mutant

In addition to adhesion ability, cell surface hydrophobicity is another characteristic related to biofilm formation. The reduced adhesion ability previously observed for the PW1004ΔtmytC mutant (FIGS. 12 and 13A) prompted us to study the cell surface hydrophobicity in the wild-type and mutants using a visualization experiment as described previously. This experiment involves adding a drop of water or oil onto the biofilm culture. If the culture cell surface is hydrophobic in nature, the water will form a bead and the oil will spread over the surface, as observed for the wild-type strain (left, FIG. 13B). On the other hand, altered cell surface hydrophobicity was clearly shown in the PW1004ΔtmytC biofilm, in which the drop of water spread out more (i.e., more hydrophilic), while oil spread out less (i.e., less hydrophobic) (middle, FIG. 13B), compared to the wild-type. The biofilm hydrophobicity of the complemented mutant was restored to a comparable level as observed in the wild-type (right, FIG. 13B). These observations indicated that TmytC also contributed to the cell surface hydrophobicity of *T. pulmonis.*

6.1.11 Docking Analysis Study of *Tsukamurella* Mycolyltransferase tmytC with Ligands and their Analogs As disclosed herein is that tmytC, which encodes for a mycolyltransferase in *Tsukamurella*, plays an important role in the pathogenesis of *Tsukamurella* keratitis. Using a rabbit keratitis model, the virulence and survival of *Tsukamurella* was reduced when tmytC was deleted. Moreover, keratitis symptoms were less severe and bacterial loads were significantly lower compared to infection with wild-type *Tsukamurella*. tmytC is a target for the treatment of *Tsukamurella* keratitis. Substrate preference and/or spatial cellular localization of the mycolyltransferase is important in the pathogenesis of *Tsukamurella* keratitis. Structural and docking analysis studies were performed to screen for binding molecules of the mycolyltransferase and to design specific inhibitors to target this gene.

A variety of ligands and their analogs, that are known to or have potential to bind to mycolic acid containing bacteria, were chosen for their ability to bind to TmytC of *Tsukamurella* PW1004 using Phyre2 and AutoDockTools (Kelley et al. 2015 Nat Protoc 10(6):845-58. Morris et al. 2009 J. Computational Chemistry 2009, 16: 2785-91.) The ligands that exhibited the best binding capacities are presented in FIG. 14, including phosphonate inhibitor (FIG. 14A-D), trehalose (FIG. 14 E-H), and cyclipostins and cyclophostin (CyC) (FIG. 14 I-K). The binding capacity between the ligand and target was scored by their binding energy, where the lower the binding energy, the more favorable the binding. The binding capacity of phosphonate inhibitor analogs, specifically phosphonate inhibitor 6*a*, is most favorable, while CyC analogs also exhibited effective binding.

It is now shown that the phosphonate inhibitor and their analogs that favorably bind to tmytC. The knowledge of ligand-target binding is at the basis of rational drug design. Computer technology is valuable in the drug discovery process as it allows virtual screening of compounds in silico for their binding capacity which aid the compilation of a subset of best binding compounds which can be confirmed by further testing. It also allows novel compounds to be designed and optimized. Our results have provided candidate tmytC inhibitors molecules that can bind to TtmytC.

6.2 Discussion

We documented that *Tsukamurella* is an ocular pathogen by fulfilling the Koch's postulates using the NZW rabbit keratitis model. Although cases of ocular infections due to *Tsukamurella* have been increasingly identified in recent years[3,5,6,9-11], this group of bacteria has been relatively understudied. Our recent study based on the analysis of the largest number of *Tsukamurella* cases reported so far showed that they played a significant but previously underestimated role in ocular infections[11]. Thus, the availability of an animal model to confirm the causal relationship between *Tsukamurella* and ocular infections and to study its treatment strategies and pathogenesis mechanisms is of paramount importance. Similar to animal studies of other important ocular pathogens, such as *S. aureus* and *P. aeruginosa*[23], we demonstrated that the NZW rabbit is an excellent model for *Tsukamurella* keratitis. *T. pulmonis*-PW1004 was recovered in abundance and in pure culture from all rabbits infected with *Tsukamurella*, but the bacteria were not recovered in the control group (FIG. 1B). The rabbits with keratitis produced clinical features similar to those observed in patients with ocular infections (FIG. 1A). Histological examination further revealed marked pathological damage in corneal tissues of *Tsukamurella* inoculated rabbits but not in control rabbits (FIGS. 1C, 3B, 5B). When isolates of *T. pulmonis* recovered from rabbits were used to infect another group of healthy rabbits, it caused keratitis with the same clinical, pathological and histopathological characteristics, fulfilling the Koch's postulate. This animal model was used for downstream treatment and pathogenesis studies.

None of the 4 multi-purpose contact lens solutions with their original compositions were able to achieve the minimal antimicrobial efficacy against *Tsukamurella* according to ISO14729 regulations, but when PHMB was increased to a final concentration of 0.0025%, all these 4 contact lens solutions tested were able to meet the ISO14729 standard. Contact lens wear is a well-recognized risk factor of bacterial keratitis. In the present study, we found that all the 4 commonly used contact lens solutions tested exhibited poor efficacy in killing *Tsukamurella* (FIG. 2A). The original compositions of these 4 solutions contained 1 to 2 common antimicrobial agents used in contact lens solutions, including PHMB, polyquaternium and/or myristamidopropyl dimethylamine (Table 1). Among these antimicrobial agents, PHMB (0.0001-0.00013%) was present in 3 of the 4 solutions tested. PHMB is a polymeric biguanide with broad spectrum activities against both Gram-positive and Gram-negative bacteria. It has been widely used as an antimicrobial ingredient in contact lens solutions and environmental biocides[24,25]. Results showed that when the final concentration of PHMB was increased to 0.0025% in the contact lens solutions, their efficacies in killing *Tsukamurella* could meet the ISO standard (FIG. 2C).

PHMB is also a potential drug of choice for the treatment of *Tsukamurella* keratitis. *Tsukamurella* are generally resistant to commonly used topical antibiotics eye drops, such as tetracycline and chloramphenicol, but they are susceptible to levofloxacin[3,12]. Therefore, the therapeutic option for *Tsukamurella*-associated ocular infections is rather limited. Notably, despite the wide usage of PHMB, acquired resistance to PHMB has not been reported so far. Therefore, we studied the efficacy of PHMB and levofloxacin against *Tsukamurella* using our rabbit keratitis model. Corneal perforations with mild to severe discharges were observed in rabbits treated with levofloxacin, and the experiment of this treatment group was terminated.

This observation was in line with a previous study which reported an increased incidence of corneal perforation in patients after topical fluoroquinolone treatment[26]. Subsequent studies in animals also showed that topical levofloxacin could induce expression of matrix metalloproteinases in the cornea which may predispose patients to corneal perforation[27,28]. In contrast, corneal perforation was not observed in rabbits treated with PHMB, and there were marked improvement in clinical signs and histological features and significant reductions in *Tsukamurella* counts from rabbit corneas of this treatment group compared to those treated with normal saline (FIG. 3A, B, C). It was observed that the concentration of PHMB (0.02%) used in the present study caused no toxicity in rabbit corneal tissues. Given these promising results, the next phase of clinical trial is currently ongoing to investigate the efficacy, safety, and tolerability of 0.08% of PHMB for the treatment of *Acanthamoeba keratitis*[31]. Further studies can be carried out to determine the optimal concentration of PHMB in the treatment of *Tsukamurella* keratitis.

TmytC is a virulence factor of *Tsukamurella* as demonstrated using in vivo rabbit keratitis model. This is also the first report demonstrated the novel role of TmytC in causing ocular infections. In this study, genome sequencing and annotation of the two ocular isolates, *T. pulmonis*-PW1004 and *T. tyrosinosolvens*-PW899, revealed a number of genes that may be involved in pathogenesis (Table 4). Among these genes, both genomes contained 3 homologs of genes (tmytA, tmytB, and tmytC) encoding mycolyltransferase (FIG. 4). This enzyme functions by transferring one mycolate residue from trehalose monomycolate (TMM) to another molecule of TMM yielding trehalose 6,6'-dimycolate, which will then be processed by esterase to form free mycolic acids[20]. Our results clearly showed marked attenuated virulence and survival after knocking out of tmytC in *T. pulmonis*-PW1004 (FIGS. 5A, B, C). Taken together, the present results supported that TmytC is an important virulence factor for *Tsukamurella* keratitis. Specific inhibitors targeting TmytC, alone or in combination with other antibiotics such as PHMB, could serve as an armamentarium for the treatment of *Tsukamurella* infections.

6.3 Tables

TABLE 1

Contact lens solutions tested in the present study

| Commercial name (Manufacturer) | Active ingredients for disinfection | Manufacturer's recommended disinfection time |
|---|---|---|
| Biotrue Multi-Purpose Solution (Bausch + Lomb, USA) | PHMB 0.00013%, polyquaternium 0.0001% | 4 h |
| RENU Multi-Purpose Solution (Bausch + Lomb, USA) | PHMB 0.0001% | 4 h |

TABLE 1-continued Contact lens solutions tested in the present study

| Commercial name (Manufacturer) | Active ingredients for disinfection | Manufacturer's recommended disinfection time |
|---|---|---|
| COMPLETE Multi-Purpose Solution (Abott, USA) | PHMB 0.0001% | 6 h |
| OPTI-FREE RepleniSH (Alcon, USA) | POLYQUAD ® (polyquaternium) 0.001% and ALDOX (myristamidopropyl dimethylamine) 0.0005% | 6 h |

TABLE 2

Susceptibility of T. pulmonis-PW1004 to a series of PHMB concentrations

| PHMB concentration (%) | Zone of inhibition (mm) |
|---|---|
| 0 | 0 |
| 0.0005 | 0 |
| 0.001 | 0 |
| 0.0025 | 13 |
| 0.005 | 14 |

TABLE 3

Results of draft genome assembly of T. tyrosinosolvens-PW899 and T. pulmonis-PW1004

| Genome assembly data | T. tyrosinosolvens-PW899 | T. pulmonis-PW1004 |
|---|---|---|
| Genome size | 4.88 Mb | 4.60 Mb |
| G + C content | 71.0% | 70.9% |
| Total no. of contigs | 321 | 266 |
| No. of contigs (>500 bp) | 307 | 245 |
| No. of predicted protein-coding genes | 4,558 | 4,241 |
| No. of subsystems | 399 | 384 |
| No. of tRNAs | 49 | 47 |
| No. of rRNA operons | 3 | 3 |
| GenBank accession no. | QPKD00000000 | QQQF00000000 |

TABLE 4

Putative genes related to pathogenesis in T. tyrosinosolvens-PW899 and T. pulmonis-PW1004 respectively

| GenBank accession number of PW899 (PW1004) | Gene | Protein | Bacteria with the closest matching sequences to PW899 (PW1004) | Amino acid identities to PW899 (PW1004) | Pathways involved | References |
|---|---|---|---|---|---|---|
| RDB46325.1 (RDH10422.1) | tmytA | Mycolyltransferase | W. limnetica (W. limnetica) | 45% (45%) | Cell wall synthesis | Ojha et al.[19] |
| RDB46324.1 (RDH10421.1) | tmytB | Mycolyltransferase | W. limnetica (W. limnetica) | 44% (44%) | Cell wall synthesis | Ojha et al.[19] |
| RDB46325.1 (RDH10422.1) | tmytC | Mycolyltransferase | W. limnetica (W. limnetica) | 45% (45%) | Cell wall synthesis | Ojha et al.[19] |
| RDB46803.1 (RDH10071.1) | smeg1529 | Serine esterase | Mycolicibacterium aromaticivorans (M. aromaticivorans) | 44% (42%) | Cell wall synthesis | Ojha et al.[19] |
| RDB46314.1 (RDH10413.1) | pks16 | Putative polyketide synthase | Gordonia kroppenstedtii (G. kroppenstedtii) | 73% (72%) | Lipid synthesis | Ojha et al.[18] |
| RDB47756.1 (RDH09883.1) | fadD26 | Fatty-acid-CoA ligase | Gordonia aichiensis (G. aichiensis) | 75% (73%) | Lipid synthesis | Mohandas et al.[45] |
| RDB45407.1 (RDH12857.1) | papA5 | Phthiocerol/phthiodiolone dimycocerosyl transferase | Gordonia effuse (G. polyisoprenivorans) | 69% (62%) | Lipid synthesis | Mohandas et al.[45] |
| RDB49989.1 (RDH13721.1) | mmpL11 | Mycobacterial membrane protein large | Gordonia desulfuricans (G. desulfuricans) | 73% (73%) | Lipid synthesis | Wright et al.[46] |

TABLE 4-continued

Putative genes related to pathogenesis in *T. tyrosinosolvens*-PW899 and *T. pulmonis*-PW1004 respectively

| GenBank accession number of PW899 (PW1004) | Gene | Protein | Bacteria with the closest matching sequences to PW899 (PW1004) | Amino acid identities to PW899 (PW1004) | Pathways involved | References |
|---|---|---|---|---|---|---|
| RDB47405.1 (RDH10177.1) | groEL1 | Heat shock protein 1 | *Rhodococcus rhodochrous* (*R. rhodochrous*) | 75% (75%) | Mycolic acid synthesis | Ojha et al.[47] |
| RDB48772.1 (RDH09310.1) | mmaa4 | Methoxy mycolic acid synthase | *Mycobacterium avium* complex (*Rhodococcus zopfii*) | 64% (70%) | Mycolic acid synthesis | Sambandan et al.[48] |
| RDB45065.1 (RDH10897.1) | lsr2 | Leprosy serum reactive clone 2 | *Mycobacteroides abscessus* (*M. abscessus*) | 64% (67%) | Mycolic acid synthesis | Chen et al.[49] |

TABLE 5

Bacterial strains and plasmids used in this study

| Strains or plasmids | Genotype and descriptions | Source or reference |
|---|---|---|
| Strains | | |
| *E. coli* DH5α | F-φ80lacZΔM15 Δ(lacZYA-argF) U169 recA1 endA1 hsdR17 (rk–, mk+) gal-phoA supE44 λ-thi-1 gyrA96 relA1 | Invitrogen Invitrogen |
| *T. tyrosinosolvens* PW899 | Corneal scraping of a patient with keratitis | Woo et al.[5] |
| *T. tyrosinosolvens* PW1006 | Eye swab of a patient with conjunctivitis | Woo et al.[6] |
| *T. tyrosinosolvens* PW3869 | Eye swab of a patient with conjunctivitis | Teng et al.[11] |
| *T. tyrosinosolvens* PW3874 | Corneal scraping of a patient with corneal ulcer | Teng et al.[11] |
| *T. tyrosinosolvens* PW3876 | Corneal scraping of a patient with corneal ulcer | Teng et al.[11] |
| *T. tyrosinosolvens* PW4092 | Eye swab of a patient with conjunctivitis | Teng et al.[11] |
| *T. pulmonis* PW1004 | Eye swab of a patient with conjunctivitis | Woo et al.[6] |
| *T. pulmonis* PW3877 | Corneal scraping of a patient with corneal infiltrate | Teng et al.[11] |
| *T. pulmonis* PW3882 | Conjunctival scraping of a patient with conjunctivitis | Teng et al.[11] |
| *T. hongkongensis* HKU52$^T$ | Corneal scraping of a patient with keratitis | Teng et al.[9, 11] |
| *T. sinensis* HKU51$^T$ | Conjunctival swab of a patient with conjunctivitis | Teng et al.[9] |
| *T. sinensis* PW3895 | Right eye swab of a patient with eye redness | Teng et al.[11] |
| *T. ocularis* HKU63$^T$ | Eye swab of a patient with conjunctivitis | Teng et al.[10] |
| *T. ocularis* HKU64 | Eye swab of a patient with conjunctivitis | Teng et al.[10] |
| *T. hominis* HKU65$^T$ | Eye swab of a patient with conjunctivitis | Teng et al.[10] |
| *T. spumae* JCM 12608$^T$ | Foam of a activated sludge plant | Nam et al.[50] |
| *P. aeruginosa* ATCC27853 | Blood specimen from a patient | ATCC |
| PW1004 | PW1004 derivative with galK deletion, ΔgalK | Present study |
| PW1004ΔtmytA | PW1004 derivative with tmytA deletion, ΔgalK | Present study |
| PW1004ΔtmytB | PW1004 derivative with tmytB deletion, ΔgalK | Present study |
| PW1004ΔtmytC | PW1004 derivative with tmytC deletion, ΔgalK | Present study |
| Plasmids | | |
| pCR ®-XL-TOPO ® | Cloning vector, pUC ori kan | Invitrogen |
| p2NIL | Suicidal plasmid, oriE kan | Parish et al.[51] |
| pNV18 | *Tsukamurella*/*E. coli* shuttle vector, aph | Chiba et al.[44] |
| p2NIL-GalK | p2NIL expressing wild-type GalK under the control of the hsp60 promoter, kan | Present study |
| pCR-XL-tmytA | pCR-XL containing tmytA and flanking fragments, kan | Present study |
| pCR-XL-tmytB | pCR-XL containing tmytB and flanking fragments, kan | Present study |
| pCR-XL-tmytC | pCR-XL containing tmytC and flanking fragments, kan | Present study |
| pΔtmytA | p2NIL containing flanking fragments of tmytA, expressing GalK under the control of the hsp60 promoter, kan | Present study |
| pΔtmytB | p2NIL containing flanking fragments of tmytB, expressing GalK under the control of the hsp60 promoter, kan | Present study |
| pΔtmytC | p2NIL containing flanking fragments of tmytC, expressing GalK under the control of the hsp60 promoter, kan | Present study |
| ptmytC | pNV18 expressing ORF of tmytC under the control of the hsp60 promoter, aph, for TmytC protein expression | Present study |

TABLE 6

Primers used in this study

| Primers | Sequence (5' to 3')[a] | Restriction site | Sequence ID No. |
|---|---|---|---|
| Primers for mutagenesis of tmytA | | | |
| tmytA-UF-1 | GTGCCCGGCGCCGCTGA | | 1 |
| tmytA-DR-1 | TGATCTGCGCGACCGACCGGT | | 2 |
| tmytA-UF | <u>CCCAAGCTT</u>GTGCCCGGCGCCGCTGA | HindIII | 3 |
| tmytA-UR | <u>CCCAAGCTT</u>CATGGGAACAGTGTTACACGGGTGT | HindIII | 4 |
| tmytA-DF | <u>CGCGGATCC</u>GACGACCGGCCGGGGTT | BamHI | 5 |
| tmytA-DR | <u>CGCGGATCC</u>TGATCTGCGCGACCGACCGGT | BamHI | 6 |
| Inner-tmytA-F | GCGAGCGCGAGCCCGTG | | 7 |
| Inner-tmytA-R | GTGGCCGGCAGCGACGT | | 8 |
| Primers for mutagenesis of tmytB | | | |
| tmytB-UF-1 | GGCGGCGATGGTGCGAAGAGA | | 9 |
| tmytB-DR-1 | TGTGGGTGCCCACCGACGAGAAGT | | 10 |
| tmytB-UF | <u>CCCAAGCTT</u>GGCGGCGATGGTGCGAAGAGA | HindIII | 11 |
| tmytB-UR | <u>CCCAAGCTT</u>TCTTGGCCCAGCCGTTGCGCAT | HindIII | 12 |
| tmytB-DF | <u>CGCGGATCC</u>TGGGGCTACTGGCAGGATCA | BamHI | 13 |
| tmytB-DR | <u>CGCGGATCC</u>GGTGCCCACCGACGAGAAGT | BamHI | 14 |
| Inner-tmytB-F | ATTCGGACGGAAAAGCACCTGCTGTA | | 15 |
| Inner-tmytB-R | AGCCTTGTCACAGCCGTCACTCT | | 16 |
| Primers for mutagenesis of tmytC | | | |
| tmytC-UF-1 | GTCTGCGCGCCACCTGGGA | | 17 |
| tmytC-DR-1 | GCAGGCCCTTGGATCCGACGGT | | 18 |
| tmytC-UF | <u>CCCAAGCTT</u>GTCTCGCTGGTCGGCCTGTCG | HindIII | 19 |
| tmytC-UR | GGTCGCTCCCCCAGGCTGCTCGCATTGCT | | 20 |
| tmytC-DF | GCAGCCTGGGGGAGCGACCAGGTCTGGCAGATG | | 21 |
| tmytC-DR | <u>CCCAAGCTT</u>CAGGCCCTTGGATCCGACGGT | HindIII | 22 |
| Inner-tmytC-F | AGGAAACCGGGAGTGTCTGTAACGC | | 23 |
| Inner-tmytC-R | AGGGGCTCGTCGACGTCGGT | | 24 |
| Primers for expression of tmytC | | | |
| hsp60-F | <u>CCAAGCTT</u>ACGCTCGACTCCAATACGGGGGTT | HindlII | 25 |
| hsp60-R | GGCTGCTCGCATTCGATACCTCCTTTTGCGAAGTGATTCCT | | 26 |
| tmytC-F | GGAGGTATCGAATGCGAGCAGCCTGGGGTAAGC | | 27 |
| tmytC-R | CTAGTCTAGATCAGCTGTTGAACCAGCCGGTG | XbaI | 28 |

[a]Restriction sites in the primer sequences are in underlined.

6.4 Methods 6.4.1 Bacterial strains and growth conditions. The source of all *Tsukamurella* strains used in this study is detailed in Table 5. Of note, *T. pulmonis*-PW1004 was previously isolated from the serous discharge of a 69-year-old Chinese woman with conjunctivitis, while *T. tyrosinosolvens*-PW899 was previously isolated from the corneal scraping of an 87-year-old Chinese woman with keratitis (Table 5)[5,6]. Unless otherwise specified, frozen stock of all *Tsukamurella* isolates were grown on brain heart infusion (BHI) agar at 37° C. under aerobic conditions for 48 h. Isolated colonies were cultured in BHI at 37° C. After 2 days of incubation, the broth culture was subcultured in BHI and grown to $10^8$ CFU/ml. Growth phase and bacterial cell density were determined spectrophotometrically by measuring the optical density at 600 nm ($OD_{600}$).

To examine the growth kinetics of the PW1004-WT, tmytC knockout and complemented mutants, overnight bacterial cultures were diluted 1:50 into BHI broth and further cultured under aerobic conditions at 37° C. One milliliter of cell suspension was monitored at different time points by measuring the $OD_{600}$. Experiments were performed in triplicate and repeated 3 times.

6.4.2 Contact lens solutions. Four commercially available contact lens solutions, including Biotrue multi-purpose solution (Bausch+Lomb, USA), RENU multi-purpose solution (Bausch+Lomb, USA), COMPLETE multi-purpose solution (Abbott, USA), and OPTI-FREE RepleniSH (Alcon, USA), were evaluated in this study. To minimize lot-to-lot variation, 3 lots from each solution were pooled and tested. Details of ingredients and recommended disinfection time of each contact lens solution are listed in Table 1.

6.4.3 Draft genome sequencing and analysis. The draft genomes of the 2 Tsukamurella species, T. tyrosinosolvens-PW899 and T. pulmonis-PW1004, were determined by high-throughput sequencing. Genomic DNA was extracted from overnight cultures of each Tsukamurella strain grown on BHI agar by QIAGEN Genomic-tip 20/G kit according to the manufacturer's instructions (QIAGEN). Each DNA sample was sequenced by 151-bp Illumina Hi-Seq 1,500 paired-end reads with a mean library size of 350 bp. Sequencing errors were corrected by k-mer frequency spectrum analysis using SOAPec v2.0.1[32]. De novo assembly was performed using Velvet 1.2.10[33]. Prediction of protein coding regions and automatic functional annotation was performed using RAST (Rapid Annotations using Subsystem Technology) server version 2.0[34] and COGs[35]. Graphical circular maps of both genomes were performed with CGview[36]. This Whole Genome Shotgun project has been deposited in DDBJ/EMBL/GenBank under the accession numbers QPKD00000000; BioSample SAMN09691326 for T. tyrosinosolvens-PW899 and QQQF00000000; BioSample SAMN09691327 for T. pulmonis-PW1004.

6.4.4 Development of a rabbit model for Tsukamurella keratitis. Bacterial suspensions used to infect rabbits were prepared by culturing T. pulmonis-PW1004 in BHI for 48 h. Eight male NZW rabbits, 1.5-2.0 kg, were inoculated intrastromally as described previously[37]. Corneas of 4 rabbits were injected with approximately 10 µl (i.e., $10^6$ CFU) of T. pulmonis-PW1004 using a microliter syringe with a 30 G needle. Another 4 rabbit corneas were challenged with plain culture medium as the control. Rabbits were monitored daily for signs of disease. At 24 h PI, rabbit eyes were photographed, evaluated for pathology, and sacrificed. After euthanasia, the corneas of each rabbit were surgically removed for histopathological and immunohistochemical analyses and bacterial enumeration.

6.4.5 Treatment of experimental Tsukamurella keratitis. Efficacy of the two antibiotics, topical 0.5% Cravit® levofloxacin (Santen Pharmaceutical Company, Japan) and 0.02% PHMB (Lonza, Switzerland), for the treatment of Tsukamurella keratitis were evaluated, respectively. Tsukamurella keratitis was first established in 12 NZW rabbits (n=4 per group) using procedures as described above. Infection was allowed to proceed for 24 h before initiation of antibiotic therapy. These 12 NZW rabbits were divided into 3 topical treatment groups: (1) 0.5% levofloxacin, (2) 0.02% PHMB, and (3) saline. Treatment regimens of levofloxacin and PHMB were performed according to Fiscella et al. and Kowalski et al., respectively, with slight modifications[16,17].

For the first group of rabbits treated with levofloxacin (n=4), drops (50 µl) of levofloxacin were applied to the affected eyes hourly for 10 doses over 3 days. For the second group of rabbits treated with PHMB (n=4), drops (50 µl) of PHMB were applied to the affected eyes hourly for 8 doses over 3 days. Rabbits in the third control group (n=4) received the same regimen of sterile saline (0.85% NaCl) hourly for 10 doses over 3 days. In addition to these 3 treatment groups, two extra NZW rabbits without infection were used as controls (i.e., mock-infected and mock-treated rabbits), receiving the same regimen of saline for 3 days. One hour after the final instillation of the antibiotics and saline drops, rabbit eyes were photographed, evaluated for pathology, and sacrificed. The treatment efficacy was compared and evaluated by the quantitative culture and histopathological analysis of the infected corneas.

6.4.6 Quantification of Tsukamurella cells. To quantify the number of viable Tsukamurella in the cornea, the cornea harvested from each rabbit was cut into smaller pieces using a sterile scalpel. The corneal pieces were placed into a sterile tube containing 500 µl of PBS (pH 7.2). Each tissue was homogenized, and homogenates were serially diluted 10-fold in PBS (pH 7.2). One hundred microliters of each diluted sample was plated in triplicate on the BHI agar and incubated at 37° C. under aerobic conditions for 48 h. The number of bacteria was determined and expressed as CFU/cornea.

6.4.7 Histopathological and immunohistochemical analyses. To perform immunohistochemical staining on infected rabbit tissues, mice antiserum against T. pulmonis-PW1004 was produced by subcutaneously injecting 200 µl of heat-inactivated Tsukamurella cells (i.e., $10^7$ CFU) into 3 mice, using an equal volume of complete Freund's adjuvant (Sigma, USA) as described previously[38]. Incomplete Freund's adjuvant (Sigma, USA) was used in subsequent immunizations. Three inoculations per mouse were administered once every 2 weeks. Two weeks after the last immunization, 100 µl of blood was collected via the lateral saphenous vein of the mice to obtain the sera. Serum samples collected from a mock-infected mouse was used as the control antibody.

To examine the histopathology of corneal tissues of rabbits challenged with the PW1004-WT and its derivative mutants, excised infected eyes, including the cornea of challenged rabbits, were subjected to histopathological examination. Corneal tissues harvested from the rabbits were fixed in 10% neutral-buffered formalin, embedded in paraffin, and stained with hematoxylin and eosin (H&E) according to Fischer et al.[39].

Histopathological changes among different groups of rabbits were observed using an Olympus BX53 Digital Upright Microscope with DP80 microscope camera (Tokyo, Japan) and imaging system. Infected tissues from challenged rabbits were subject to immunohistochemical staining for Tsukamurella as described previously[38]. Tissue sections were deparaffinized and rehydrated, followed by blocking endogenous peroxidase with 0.3% $H_2O_2$ for 30 min, and then with 1% bovine serum albumin/PBS at room temperature for 30 min to minimize non-specific staining. The tissue sections were then pre-treated with streptavidin solution and biotin solution at room temperature for 15 min, respectively, to avoid high background signals due to the endogenous biotin or biotin-binding proteins in the tissues. The sections were incubated at 4° C. overnight with 1:4,000 dilution of mouse anti-T. pulmonis-PW1004 serum or pre-immune serum, followed by incubation of 30 min at room temperature with 1:500 dilution of biotin-conjugated goat anti-mouse immunoglobulin G (IgG), H&L chain (Abcam). Streptavidin/peroxidase complex reagent (Vector Laboratories) was then added and incubated at room temperature for 30 min. Sections were counterstained with hematoxylin. Tissues from sterile saline controls were included as negative controls. Color development was performed using 3,3'-diaminobenzidine and images captured with Nikon 80i imaging system and spot-advance computer software.

6.4.8 MPO assay. MPO is a marker enzyme for measuring PMN accumulation in tissue samples. Therefore, the number of infiltrating PMNs into the corneas of rabbits can be quantitated by measuring the amount of MPO activity in corneal homogenates. The assay involves a colorimetric reagent, o-dianisidine, which can react with the hypochlorite produced by the MPO reaction. Briefly, 20 µl of tissue homogenate was mixed with 180 µl of 50 mM potassium phosphate buffer (pH 6.0) containing 16.7 mg/ml o-dianisidine dihydrochloride and 0.0005% hydrogen peroxide[40]. The change in optical density at 460 nm was measured continuously for 10 min at room temperature with a microplate reader. One MPO unit of activity is equivalent to approximately 100,000 PMNs[41]. All experiments were performed in triplicate and repeated 3 times.

6.4.9 In vitro susceptibility of planktonic cultures of *Tsukamurella* against contact lens and PHMB solutions. A susceptibility test was performed following the procedures as described in FDA/ISO14729 stand-alone procedure for disinfecting products[13]. Briefly, 0.1 ml of 1×10$^8$ CFUs/ml bacterial suspension from 7 different *Tsukamurella* species was added into 10 ml each of the 4 commercial contact lens solutions, respectively, and the mixture was incubated at room temperature according to the manufacturer's recommended disinfection time (Table 1). After incubation, a 1-ml aliquot was withdrawn from each mixture and added to 9 ml of Dey-Engley neutralizing broth (Sigma, USA) for 15 min at room temperature for neutralization of the preservative. The mixture was then serially diluted, and 100 µl of each diluted sample was plated in triplicate on the BHI agar for sampling of viable bacteria. *P. aeruginosa* ATCC27853 was used as a control. The mean logarithmic reduction was calculated. According to the guideline, only a contact lens solution capable of reducing the viability of starting concentration of bacteria by 3-log is defined as satisfactory. All experiments were performed in triplicate and repeated 3 times along with the control strain.

Disk diffusion assay was initially used to determine the susceptibility of *T. pulmonis*-PW1004 against various concentrations of PHMB. Briefly, standard paper disks, 6 mm in diameter, impregnated with different dilutions of PHMB (0.0005%, 0.001%, 0.0025%, 0.005%) were placed onto BHI agar plates inoculated with overnight culture of a 0.5 McFarland standard prepared from *T. pulmonis*-PW1004, following standard procedures[15]. Paper disks soaked in 0.85% NaCl were used as the control. Zones of inhibition were measured after 48 h of incubation at 37° C. under aerobic conditions. Preliminary results showed that the 0.0025% of PHMB was the minimal concentration that achieved good efficacy against *T. pulmonis*-PW1004. Next, we re-examined the susceptibility of the 4 contact lens solutions against the 7 *Tsukamurella* species by adjusting the final concentration of PHMB to 0.0025%, following the procedures as described in the previous paragraph.

6.4.10 Construction of non-polar deletion mutant strains. Bacterial strains and plasmids used in this part of the study are listed in Table 5. The wild-type *T. pulmonis*-PW1004 was a clinical strain isolated from a patient in Hong Kong[6]. Unmarked, non-polar deletion of tmytA, tmytB, and tmytC were constructed respectively by homologous recombination using our newly developed suicide plasmid p2NIL-GalK (Table 5). Primers used for deletion mutagenesis are listed in Table 6. Suicide plasmid p2NIL-GalK and parent strain *T. pulmonis*-PW1004 were used for constructing in-frame deletion mutants by homologous recombination[42]. Primers tmytC-UF-1/DR-1 were used to amplify the wild-type tmytC gene (966 bp) and its upstream (1,031 bp) and downstream (733 bp) regions from genomic DNA of *T. pulmonis*-PW1004. Polymerase chain reaction (PCR) product was purified using QIAquick PCR purification kit (QIAGEN, USA) and cloned to pCR®-XL-TOPO® (Invitrogen, USA) to generate pCR-XL-tmytC. 5'- and 3'-flanking regions of tmyC gene were amplified by PCR from plasmid DNA of pCR-XL-tmytC, using primers tmytC-UF-HindIII/UR and tmytC-DF/DR-HindIII, respectively, and the individual PCR products were mixed to generate an in-frame deletion pattern of the tmytC gene by an overlapping PCR method. The overlapping amplicon containing the in-frame deletion pattern was cloned into p2NIL-GalK, resulting in the final construct of pΔtmytC, which was electro-transformed into *Escherichia coli* DH5α[43]. Transformants were first selected on BHI agar with 100 µg/ml kanamycin. After that, colonies with single recombination were further cultured on BHI agar (without antibiotics) and selected on BHI agar with 0.5% 2-deoxy-D-galactose (without antibiotics) to obtain the final double recombinants[42]. All 2-deoxy-D-galactose-resistant colonies were checked for kanamycin sensitivity and screened by primers tmytC-UF-1/DR-1. All mutants were confirmed by DNA sequencing using inner-tmytC-F/R primers.

6.4.11 Complementation of PW1004ΔtmytC. The coding region of tmytC gene, together with its ribosome-binding site, was amplified from chromosomal DNA of PW1004 using primer hsp60-F/R and tmytC-F/R and subcloned into expression shuttle vector pNV18[44], resulting in the final construct pNV18-tMytC. The complementation plasmid was transformed into PW1004ΔtmytC, and TmytC protein was constitutively expressed. A mutant strain transformed with empty plasmid pNV18 was used as a negative control.

6.4.12 Statistical Analysis. Unless stated otherwise, data generated were expressed as mean±standard error of the mean (SEM) from three independent experiments. Statistical comparison between different groups was performed by the unpaired Student's t-test. An asterisk indicates a significant difference (*, $p<0.05$; **, $p<0.01$; n.s., not significant).

The invention is not to be limited in scope by the specific embodiments described herein. Indeed, various modifications of the invention in addition to those described will become apparent to those skilled in the art from the foregoing description and accompanying figures. Such modifications are intended to fall within the scope of the appended claims.

All references cited herein are incorporated herein by reference in their entirety and for all purposes to the same extent as if each individual publication or patent or patent application was specifically and individually indicated to be incorporated by reference in its entirety for all purposes.

REFERENCES

1 Bouza, E. et al. *Tsukamurella*: a cause of catheter-related bloodstream infections. *European journal of clinical microbiology & infectious diseases: official publication of the European Society of Clinical Microbiology* 28, 203-210, doi:10.1007/s10096-008-0607-2 (2009).

2 Schwartz, M. A. et al. Central venous catheter-related bacteremia due to *Tsukamurella* species in the immunocompromised host: a case series and review of the literature. *Clinical infectious diseases: an official publication of the Infectious Diseases Society of America* 35, e72-77, doi:10.1086/342561 (2002).

3 Liu, C. Y. et al. Clinical characteristics of infections caused by *Tsukamurella* spp. and antimicrobial susceptibilities of the isolates. *International journal of antimicrobial agents* 38, 534-537, doi:10.1016/j.ijantimicag.2011.07.018 (2011).

4 Shaer, A. J. & Gadegbeku, C. A. *Tsukamurella* peritonitis associated with continuous ambulatory peritoneal dialysis. *Clinical nephrology* 56, 241-246 (2001).

5 Woo, P. C. et al. First report of *Tsukamurella* keratitis: association between *T. tyrosinosolvens* and *T. pulmonis* and ophthalmologic infections. *J Clin Microbiol* 47, 1953-1956, doi:10.1128/JCM.00424-09 (2009).

6 Woo, P. C., Ngan, A. H., Lau, S. K. & Yuen, K. Y. *Tsukamurella* conjunctivitis: a novel clinical syndrome. *J Clin Microbiol* 41, 3368-3371 (2003).

7 Almeida, D. R., Miller, D. & Alfonso, E. C. *Tsukamurella*: an emerging opportunistic ocular pathogen. *Canadian journal of ophthalmology. Journal canadien d'ophtalmologie* 45, 290-293, doi:10.3129/i09-252 (2010).

8 Tam, P. M., Young, A. L., Cheng, L., Congdon, N. & Lam, P. T. *Tsukamurella*: an unrecognized mimic of atypical mycobacterial keratitis? The first case report. *Cornea* 29, 362-364, doi:10.1097/ICO.0b013e3181ae2594 (2010).

9 Teng, J. L. et al. *Tsukamurella hongkongensis* sp. nov. and *Tsukamurella sinensis* sp. nov., isolated from patients with keratitis, catheter-related bacteraemia and conjunctivitis. *International journal of systematic and evolutionary microbiology* 66, 391-397, doi:10.1099/ijsem.0.000733 (2016).

Teng, J. L. L. et al. *Tsukamurella ocularis* sp. nov. and *Tsukamurella hominis* sp. nov., isolated from patients with conjunctivitis in Hong Kong. *International journal of systematic and evolutionary microbiology* 68, 810-818, doi:10.1099/ijsem.0.002589 (2018).

11 Teng, J. L. L. et al. MALDI-TOF MS for identification of *Tsukamurella* species: *Tsukamurella tyrosinosolvens* as the predominant species associated with ocular infections. *Emerg Microbes Infect* 7, 80, doi:10.1038/s41426-018-0083-4 (2018).

12 Chen, C. H., Lee, C. T. & Chang, T. C. *Tsukamurella tyrosinosolvens* bacteremia with coinfection of *Mycobacterium bovis* pneumonia: case report and literature review. *SpringerPlus* 5, 2033, doi:10.1186/s40064-016-3707-y (2016).

13 EN ISO 14729: Ophthalmic optics—Contact lens care products—Microbiological requirements and test methods for products and regimens for hygienic management of contact lenses. (2001).

14 Larkin, D. F., Kilvington, S. & Dart, J. K. Treatment of *Acanthamoeba* keratitis with polyhexamethylene biguanide. *Ophthalmology* 99, 185-191 (1992).

15 Lin, J. C., Ward, T. P., Belyea, D. A., McEvoy, P. & Kramer, K. K. Treatment of *Nocardia asteroides* keratitis with polyhexamethylene biguanide. *Ophthalmology* 104, 1306-1311 (1997).

16 Fiscella, R. G. et al. Polyhexamethylene biguanide (PHMB) in the treatment of experimental *Fusarium* keratomycosis. *Cornea* 16, 447-449 (1997).

17 Kowalski, R. P., Romanowski, E. G., Mah, F. S., Shanks, R. M. & Gordon, Y. J. Topical levofloxacin 1.5% overcomes in vitro resistance in rabbit keratitis models. *Acta ophthalmologica* 88, e120-125, doi:10.1111/j.1755-3768.2010.01897.x (2010).

18 Ojha, A. K. et al. Growth of *Mycobacterium tuberculosis* biofilms containing free mycolic acids and harbouring drug-tolerant bacteria. *Molecular microbiology* 69, 164-174, doi:10.1111/j.1365-2958.2008.06274.x (2008).

19 Ojha, A. K., Trivelli, X., Guerardel, Y., Kremer, L. & Hatfull, G. F. Enzymatic hydrolysis of trehalose dimycolate releases free mycolic acids during mycobacterial growth in biofilms. *The Journal of biological chemistry* 285, 17380-17389, doi:10.1074/jbc.M110.112813 (2010).

20 Belisle, J. T. et al. Role of the major antigen of *Mycobacterium tuberculosis* in cell wall biogenesis. *Science* 276, 1420-1422 (1997).

21 Puech, V., Bayan, N., Salim, K., Leblon, G. & Daffe, M. Characterization of the in vivo acceptors of the mycoloyl residues transferred by the corynebacterial PS1 and the related mycobacterial antigens 85. *Molecular microbiology* 35, 1026-1041 (2000).

22 Ramulu, H. G., Adindla, S. & Guruprasad, L. Analysis and modeling of mycolyl-transferases in the CMN group. *Bioinformation* 1, 161-169 (2006).

23 Marquart, M. E. Animal models of bacterial keratitis. *Journal of biomedicine & biotechnology* 2011, 680642, doi:10.1155/2011/680642 (2011).

24 Hildebrandt, C., Wagner, D., Kohlmann, T. & Kramer, A. In-vitro analysis of the microbicidal activity of 6 contact lens care solutions. *BMC infectious diseases* 12, 241, doi:10.1186/1471-2334-12-241 (2012).

Kusnetsov, J. M., Tulkki, A. I., Ahonen, H. E. & Martikainen, P. J. Efficacy of three prevention strategies against *legionella* in cooling water systems. *Journal of applied microbiology* 82, 763-768 (1997).

26 Mallari, P. L., McCarty, D. J., Daniell, M. & Taylor, H. Increased incidence of corneal perforation after topical fluoroquinolone treatment for microbial keratitis. *American journal of ophthalmology* 131, 131-133 (2001).

27 Reviglio, V. E., Hakim, M. A., Song, J. K. & O'Brien, T. P. Effect of topical fluoroquinolones on the expression of matrix metalloproteinases in the cornea. *BMC ophthalmology* 3, 10, doi:10.1186/1471-2415-3-10 (2003).

28 Wei, H. K. et al. Levofloxacin increases apoptosis of rat annulus fibrosus cells via the mechanism of upregulating MMP-2 and MMP-13. *International journal of clinical and experimental medicine* 8, 20198-20207 (2015).

29 Rivasi, F. et al. Cytologic diagnosis of *Acanthamoeba* keratitis. Report of a case with correlative study with indirect immunofluorescence and scanning electron microscopy. *Acta cytologica* 39, 821-826 (1995).

30 *Safety and Tolerability of Preservative-free Polyhexamethylene Biguanide (PHMB) Ophthalmic Solution in Healthy Subjects*, <https://ClinicalTrials.gov/show/NCT02506257> (2016).

31 *Polyhexamethylene Biguanide (PHMB) Ophthalmic Solution in Subjects Affected by Acanthamoeba Keratitis*, <https://clinicaltrials.gov/ct2/show/NCT03274895> (2017).

32 Luo, R. B. et al. SOAPdenovo2: an empirically improved memory-efficient short-read de novo assembler (vol 1, 18, 2012). *Gigascience* 4, doi:ARTN 30 10.1186/s13742-015-0069-2 (2015).

33 Zerbino, D. R. & Birney, E. Velvet: Algorithms for de novo short read assembly using de Bruijn graphs. *Genome research* 18, 821-829, doi:10.1101/gr.074492.107 (2008).

34 Aziz, R. K. et al. The RAST server: Rapid annotations using subsystems technology. *Bmc Genomics* 9, doi:Artn 75 10.1186/1471-2164-9-75 (2008).

35 Galperin, M. Y., Makarova, K. S., Wolf, Y. I. & Koonin, E. V. Expanded microbial genome coverage and improved protein family annotation in the COG database. *Nucleic acids research* 43, D261-269, doi:10.1093/nar/gku1223 (2015).

36 Stothard, P. & Wishart, D. S. Circular genome visualization and exploration using CGView. *Bioinformatics* 21, 537-539, doi:10.1093/bioinformatics/bti054 (2005).

37 Sanders, M. E., Norcross, E. W., Moore, Q. C., 3rd, Shafiee, A. & Marquart, M. E. Efficacy of besifloxacin in a rabbit model of methicillin-resistant *Staphylococcus aureus* keratitis. *Cornea* 28, 1055-1060, doi:10.1097/ICO.0b013e31819e34cb (2009).

38 Lau, S. K. et al. Identification of Novel Rosavirus Species That Infects Diverse Rodent Species and Causes Multisystemic Dissemination in Mouse Model. *PLoS pathogens* 12, e1005911, doi:10.1371/journal.ppat.1005911 (2016).

39 Fischer, A. H., Jacobson, K. A., Rose, J. & Zeller, R. Hematoxylin and eosin staining of tissue and cell sections. *CSH protocols* 2008, pdb prot4986, doi:10.1101/pdb.prot4986 (2008).

40 Williams, R. N., Paterson, C. A., Eakins, K. E. & Bhattacherjee, P. Quantification of ocular inflammation: evaluation of polymorphonuclear leucocyte infiltration by measuring myeloperoxidase activity. *Current eye research* 2, 465-470 (1982).

41 Girgis, D. O., Dajcs, J. J. & O'Callaghan, R. J. Phospholipase A2 activity in normal and *Staphylococcus aureus*-infected rabbit eyes. *Investigative ophthalmology & visual science* 44, 197-202, doi:10.1167/iovs.02-0548 (2003).

42 Mishra, A. et al. The *Actinomyces oris* type 2 fimbrial shaft FimA mediates co-aggregation with oral streptococci, adherence to red blood cells and biofilm development. *Molecular microbiology* 77, 841-854, doi:10.1111/j.1365-2958.2010.07252.x (2010).

43 Sharon L. Kendall, R. F. in *Mycobacteria Protocols* Vol. 465 (ed Amanda Claire Brown Tanya Parish) Ch. 20, 297-310 (Humana Press, Totowa, NJ, 2009).

44 Chiba, K. et al. Construction of a pair of practical *Nocardia-Escherichia coli* shuttle vectors. *Japanese journal of infectious diseases* 60, 45-47 (2007).

45 Mohandas, P. et al. Pleiotropic consequences of gene knockouts in the phthiocerol dimycocerosate and phenolic glycolipid biosynthetic gene cluster of the opportunistic human pathogen *Mycobacterium marinum*. *FEMS Microbiol Lett* 363, fnw016, doi:10.1093/femsle/fnw016 (2016).

46 Wright, C. C. et al. The *Mycobacterium tuberculosis* MmpL11 Cell Wall Lipid Transporter Is Important for Biofilm Formation, Intracellular Growth, and Nonreplicating Persistence. *Infection and immunity* 85, doi:10.1128/IAI.00131-17 (2017).

47 Ojha, A. et al. GroEL1: a dedicated chaperone involved in mycolic acid biosynthesis during biofilm formation in mycobacteria. *Cell* 123, 861-873, doi:10.1016/j.cell.2005.09.012 (2005).

48 Sambandan, D. et al. Keto-mycolic acid-dependent pellicle formation confers tolerance to drug-sensitive *Mycobacterium tuberculosis*. *mBio* 4, e00222-00213, doi:10.1128/mBio.00222-13 (2013).

49 Chen, J. M. et al. Roles of Lsr2 in colony morphology and biofilm formation of *Mycobacterium smegmatis*. *Journal of bacteriology* 188, 633-641, doi:10.1128/JB.188.2.633-641.2006 (2006).

50 Nam, S. W., Kim, W., Chun, J. & Goodfellow, M. *Tsukamurella pseudospumae* sp. nov., a novel actinomycete isolated from activated sludge foam. *International journal of systematic and evolutionary microbiology* 54, 1209-1212, doi:10.1099/ijs.0.02939-0 (2004).

51 Parish, T. & Stoker, N. G. Use of a flexible cassette method to generate a double unmarked *Mycobacterium tuberculosis* tlyA plcABC mutant by gene replacement. *Microbiology* 146 (Pt 8), 1969-1975, doi:10.1099/00221287-146-8-1969 (2000).

Lawrence A Kelley, Stefans Mezulis, Christopher M Yates, Mark N Wass, Michael J E Sternberg. The Phyre2 web portal for protein modeling, prediction and analysis. Nat Protoc 2015 June; 10(6):845-58.

Morris, G. M., Huey, R., Lindstrom, W., Sanner, M. F., Belew, R. K., Goodsell, D. S. and Olson, A. J. (2009) Autodock4 and AutoDockTools4: automated docking with selective receptor flexiblity. J. Computational Chemistry 2009, 16: 2785-91.

The foregoing description of the specific embodiments will so fully reveal the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of examples, and not limitation. It would be apparent to one skilled in the relevant art(s) that various changes in form and detail could be made therein without departing from the spirit and scope of the disclosure. Thus, the present disclosure should not be limited by any of the above-described exemplary embodiments but should be defined only in accordance with the following claims and their equivalents.

The invention claimed is:

1. A method of treating an ocular bacterial infection caused by *Tsukamurella* in a subject comprising a step of administering to an eye of the subject an ophthalmic composition comprising polyhexamethylene biguanide ("PHMB") at a concentration of at least 0.0025 wt %, and one or more tmytC inhibitor of the formula:

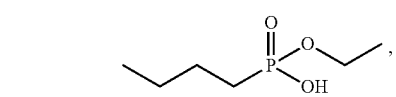

(3a)

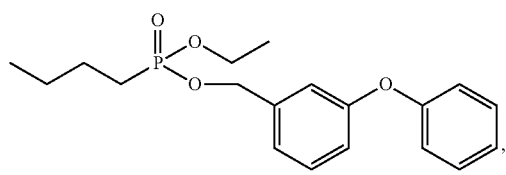

(4a)

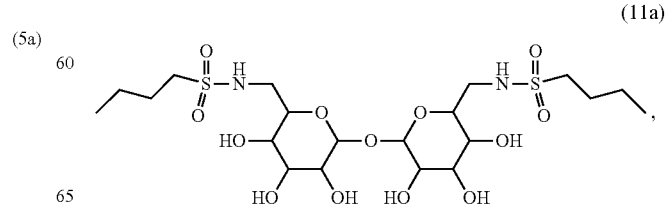

(5a)

-continued

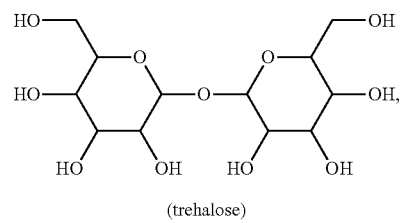

(6a)

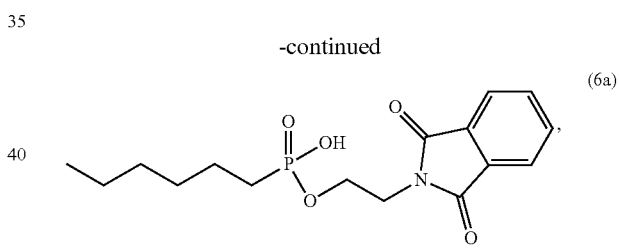

(trehalose)

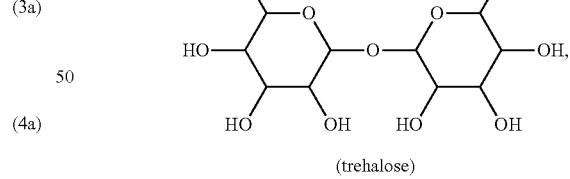

(11a)

2. The method of claim 1, wherein the ocular bacterial infection caused by *Tsukamurella* is treated as characterized by at least one of: (i) reduced biofilm formation; (ii) reduced adherence property of the bacteria; (iii) reduced PMN infiltration; (iii) reduced epithelial damage; and (iv) reduced corneal bacterial loads.

3. The method of claim 1, wherein the composition further comprises polyquaternium, myristamidoprojyl dimethylamine or a combination thereof.

4. The method of claim 1, wherein the bacterial infection is caused by a multi-drug resistant *Tsukamurella*.

5. The method of claim 1, wherein the bacterial infection is from *T. tyrosinosolvens*, *T. pulmonis*, *T. sinensis*, *T. hongkongensis*, *T. ocularis*, *T. hominis*, *T. spumae* or a combination thereof.

6. The method of claim 1, wherein the bacterial infection caused by *Tsukamurella* is conjunctivitis and/or keratitis.

7. The method of claim 1, wherein administering the composition is effective for at least a 3-log reduction in *Tsukamurella* concentration in a cornea of the subject compared to pre-treatment, wherein the reduction in *Tsukamurella* concentration is measured by comparing the number of *Tsukamurella* colony forming units (CFU) in a corneal scraping or eye swab of the subject before and after administering the compound.

8. A method of treating an ocular bacterial infection caused by *Tsukamurella* comprising a step of treating a contact lens prior to wearing the contact lens by a subject with a composition comprising polyhexamethylene biguanide ("PHMB") at a concentration of at least 0.0025 wt %, and one or more tmytC inhibitor of the formula:

-continued
(4a)
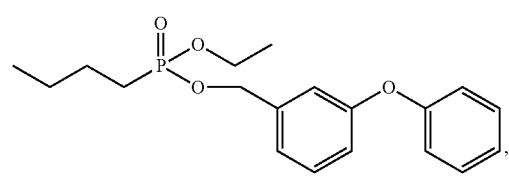
(5a)
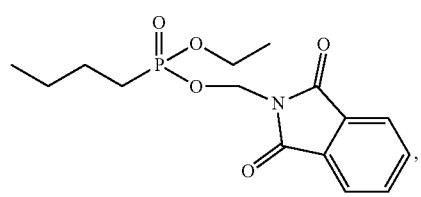
(6a)
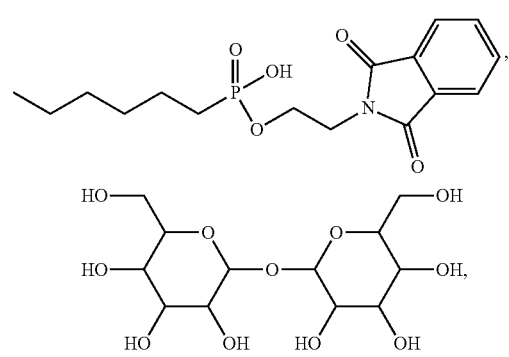
(trehalose)
(11a)
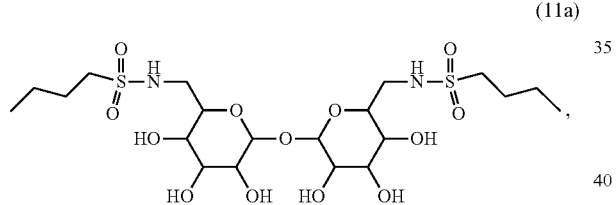
(15a)
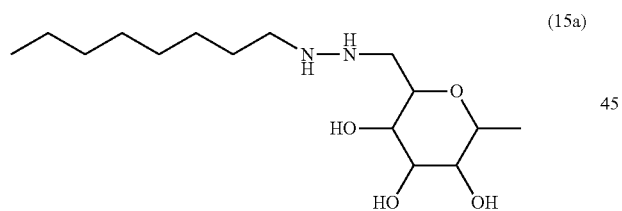
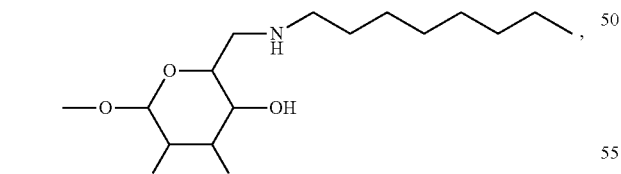
(18a)
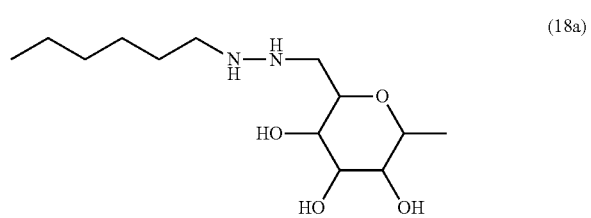
-continued
(CyC7β)
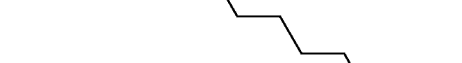
(CyC8β)
(CyC17)
9. The method of claim 8, wherein the composition further comprises polyquaternium, myristamidopropyl dimethylamine, or a combination thereof.

10. The method of claim 1, wherein the composition comprises 0.0025 wt %-0.08 wt % of polyhexamethylene biguanide ("PHMB").

11. The method of claim 8, wherein the composition comprises 0.0025 wt %-0.08 wt % of polyhexamethylene biguanide ("PHMB").

12. The method of claim 1, wherein the ophthalmic composition is in a form of an eye drop or an eye ointment.

\* \* \* \* \*